US012479825B2

(12) United States Patent
Han et al.

(10) Patent No.: US 12,479,825 B2
(45) Date of Patent: Nov. 25, 2025

(54) MELANOCORTIN SUBTYPE-2 RECEPTOR (MC2R) ANTAGONISTS AND USES THEREOF

(71) Applicant: Crinetics Pharmaceuticals, Inc., San Diego, CA (US)

(72) Inventors: Sangdon Han, San Diego, CA (US); Sun Hee Kim, San Diego, CA (US); Yunfei Zhu, San Diego, CA (US)

(73) Assignee: CRINETICS PHARMACEUTICALS, INC., San Diego, CA (US)

( * ) Notice: Subject to any disclaimer, the term of this patent is extended or adjusted under 35 U.S.C. 154(b) by 859 days.

(21) Appl. No.: 17/771,392

(22) PCT Filed: Oct. 30, 2020

(86) PCT No.: PCT/US2020/058202
§ 371 (c)(1),
(2) Date: Apr. 22, 2022

(87) PCT Pub. No.: WO2021/091788
PCT Pub. Date: May 14, 2021

(65) Prior Publication Data
US 2023/0015914 A1    Jan. 19, 2023

Related U.S. Application Data

(60) Provisional application No. 62/932,306, filed on Nov. 7, 2019.

(51) Int. Cl.
C07D 401/14 (2006.01)
C07D 453/02 (2006.01)

(52) U.S. Cl.
CPC ......... *C07D 401/14* (2013.01); *C07D 453/02* (2013.01)

(58) Field of Classification Search
None
See application file for complete search history.

(56) References Cited

U.S. PATENT DOCUMENTS

| | | | |
|---|---|---|---|
| 5,284,956 | A | 2/1994 | Buchecker et al. |
| 10,562,884 | B2 | 2/2020 | Han et al. |
| 10,604,507 | B2 | 3/2020 | Han et al. |
| 10,766,877 | B2 | 9/2020 | Han et al. |
| 10,981,894 | B2 | 4/2021 | Han et al. |
| 11,565,011 | B2 | 1/2023 | Birnie et al. |
| 2003/0158209 | A1 | 8/2003 | Dyck et al. |
| 2004/0053933 | A1 | 3/2004 | Pontillo et al. |
| 2004/0192676 | A1 | 9/2004 | Chen et al. |
| 2005/0119252 | A1 | 6/2005 | Tucci et al. |
| 2005/0192286 | A1 | 9/2005 | Tran et al. |
| 2010/0305122 | A1 | 12/2010 | Bruncko et al. |
| 2013/0184285 | A1 | 7/2013 | Brain et al. |
| 2019/0367481 | A1 | 12/2019 | Han et al. |
| 2021/0238164 | A1 | 8/2021 | Han et al. |
| 2023/0405157 | A1 | 12/2023 | Zhao et al. |
| 2024/0300920 | A1 | 9/2024 | Han et al. |

FOREIGN PATENT DOCUMENTS

| | | |
|---|---|---|
| EP | 1403251 A1 | 3/2004 |
| EP | 2448582 B1 | 4/2017 |
| EP | 3199156 A1 | 8/2017 |
| EP | 3480198 A1 | 5/2019 |
| JP | H02117659 A | 5/1990 |
| JP | 2881750 B2 | 4/1999 |
| JP | 2012500785 A | 1/2012 |
| JP | 2012501317 A | 1/2012 |
| JP | 2012532137 A | 12/2012 |
| JP | 2024009837 A | 1/2024 |
| WO | WO-9964002 A1 | 12/1999 |
| WO | WO-0074679 A1 | 12/2000 |
| WO | WO-03002538 A1 | 1/2003 |
| WO | WO-03009847 A1 | 2/2003 |
| WO | WO-03009850 A1 | 2/2003 |
| WO | WO-03031410 A1 | 4/2003 |
| WO | WO-03045918 A1 | 6/2003 |
| WO | WO-03068738 A1 | 8/2003 |
| WO | WO-03094918 A1 | 11/2003 |
| WO | WO-2004058735 A2 | 7/2004 |
| WO | WO-2004083209 A1 | 9/2004 |
| WO | WO-2005014563 A1 | 2/2005 |
| WO | WO-2005023260 A1 | 3/2005 |
| WO | WO-2005040109 A1 | 5/2005 |
| WO | WO-2005040136 A1 | 5/2005 |
| WO | WO-2005042516 A2 | 5/2005 |
| WO | WO-2006113704 A2 | 10/2006 |
| WO | WO-2007047496 A2 | 4/2007 |
| WO | WO-2007133108 A1 | 11/2007 |
| WO | WO-2010026124 A1 | 3/2010 |
| WO | WO-2012163354 A1 | 12/2012 |
| WO | WO-2015124868 A1 | 8/2015 |
| WO | WO-2019014460 A1 | 1/2019 |
| WO | WO-2019079373 A1 | 4/2019 |
| WO | WO-2019236699 A1 | 12/2019 |
| WO | WO-2021091788 A1 | 5/2021 |
| WO | WO-2021126693 A1 | 6/2021 |
| WO | WO-2021133563 A1 | 7/2021 |

OTHER PUBLICATIONS

Angelousi et al. ACTH action on the adrenals. [Updated Oct. 26, 2016]. In: Feingold KR, Anawalt B, Boyce A, et al., editors. Endotext [Internet]. South Dartmouth (MA): MDText.com, Inc.; 2000-. Available from: https://www.ncbi.nlm.nih.gov/books/NBK279118/.

(Continued)

*Primary Examiner* — Sarah Pihonak
*Assistant Examiner* — Donna M Nestor
(74) *Attorney, Agent, or Firm* — WILSON SONSINI GOODRICH & ROSATI

(57) ABSTRACT

Described herein are compounds that are melanocortin subtype-2 receptor (MC2R) modulators, methods of making such compounds, pharmaceutical compositions and medicaments comprising such compounds, and methods of using such compounds in the treatment of conditions, diseases, or disorders that would benefit from modulation of MC2R activity.

19 Claims, No Drawings

(56) References Cited

OTHER PUBLICATIONS

Ciato et al. Currently used and investigational drugs for Cushing's disease. Expert Opin Investig Drugs 26(1):75-84 (2016).
Clark et al. ACTH antagonists. Front. Endocrinol. 7:101 (2016a).
Creemers et al. Cushing's syndrome: an update on current pharmacotherapy and future directions. Expert Opin Pharmacother 16(12):1829-1844 (2015).
Kusnetzow et al. Discovery and Identification of Late Stage, Selective Nonpeptide ACTH Antagonists for the Treatment of Cushing's Disease, Ectopic ACTH Secreting Tumors, and Congenital Adrenal Hyperplasia. Poster # MON-176. ENDO Online 2020. Jun. 8-22, 2020.
Kusnetzow et al. Nonpeptide, Orally Bioavailable ACTH Antagonists: suppression of ACTH-induced Corticosterone Secretion and Adrenal Hypertrophy in Rats. Poster # SAT-364. ENDO 2019. Mar. 23-26, 2019; New Orleans.
Lacroix et al. Cushing's syndrome. Lancet 386(9996):913-927 (2015).
Malik et al. Adrenocorticotropic hormone (ACTH) responses require actions of the melanocortin-2 receptor accessory protein on the extracellular surface of the plasma membrane. J Biol Chem 290(46):27972-27985 (2015).
Markison et al. Effects of Nonpeptide Orally Bioavailable ACTH Antagonists on Adrenal Gland Size and Function in Rats. Crinetics Pharmaceuticals PowerPoint Presentation e-ECE 2020.
Newfield. ACTH receptor blockade: a novel approach to treat congenital adrenal hyperplasia, or Cushing's disease. Med Hypotheses 74(4):705-706 (2010).
Nguyen et al. In Vitro Pharmacological Characterization of CRN04894: The First Reported Oral, Selective Nonpeptide Melanocortin 2 Receptor Antagonist Evaluated in Phase 1 First-in-Human Clinical Trials. FASEB J 36(S1):Abstract (2022).
Nieman et al. Treatment of Cushing's Syndrome: An Endocrine Society Clinical Practice Guideline. J Clin Endocrinol Metab 100(8):2807-2831 (2015).
Nieman. Overview of the treatment of Cushing's syndrome. In: UpToDate (Oct. 30, 2019), Topic 174 Version 15.0. Waltham, MA: UpToDate Inc. https://www.uptodate.com/contents/overview-of-the-treatment-of-cushings-syndrome?csi=fd4b2565-633a-424b-becb-a44daecca8aa&source=contentShare. (Accessed May 20, 2020).
Nieman. Recent updates on the diagnosis and management of Cushing's syndrome. Endocrinol Metab (Seoul) 33(2):139-146 (2018).
Ramachandrappa et al. The melanocortin receptors and their accessory proteins. Front Endocrinol (Lausanne) 4:9 (2013).
Velentza et al. Novel MC2R antagonists decrease cortisol in primary human adrenal cortical cells and corticosterone in an in vivo model of hypercortisolism. Poster presented at 13th Annual Peptide Therapeutics Symposium; Oct. 25-26, 2018; La Jolla, CA.
Webb et al. Minireview: The Melanocortin 2 Receptor Accessory Proteins. Mol Endocrinol 24(3):475-484 (Mar. 2010).
Young et al. Management of endocrine disease: Cushing's syndrome due to ectopic ACTH secretion: an expert operational opinion. Eur J Endocrinol 182(4):R29-R58 (2020).
Arasasingham et al. Structure-activity relationship of (1-aryl-2-piperazinylethyl)piperazines: antagonists for the AGRP/melanocortin receptor binding. J Med Chem 46:9-11 (2003).
Berge et al. Pharmaceutical Salts. Journal of Pharmaceutical Sciences 66(1):1-19 (Jan. 1977).
Bundgaard. Design and Application of Prodrugs. Textbook of Drug Design and Development. Krosgaard-Larsen and Bundgaard. Chapter 5. pp. 113-191 (1991).
Bundgaard. Means to Enhance Penetration: Prodrugs as a Means to Improve the Delivery of Peptide Drugs. Advanced Drug Delivery Review 8:1-38 (1992).
Chen et al. Identification and characterization of pyrrolidine diastereoisomers as potent functional agonists and antagonists of the human melanocortin-4 receptor. Bioorg Med Chem Lett 18:129-136 (2008).
Chen et al. Pharmacological and pharmacokinetic characterization of 2-piperazine-a-isopropyl benzylamine derivatives as melanocortin-4 receptor antagonists. Bioorg Med Chem 16:5606-5618 (2008).
Gantz et al. The melanocortin system. Am. J. Physiol. Endocrinol. Metab. 284:E468-E474 (2003).
PCT/US2020/058202 International Search Report and Written Opinion dated Mar. 1, 2021.
Richardson et al. Synthesis and structure-activity relationships of novel arylpiperazines as potent and selective agonists of the melanocortin subtype-4 receptor. J Med Chem 47:744-755 (2004).
Science IP Report dated Mar. 29, 2018 (129 pgs).
Sebhat et al., Melanocortin subtype 4 receptor agonists: Structure-activity relationships about the 4-alkyl piperidine core. Bioorg. Med. Chem. Lett. 17:5720-5723 (2007).
Tian et al. Design, Synthesis, and Evaluation of Proline and Pyrrolidine Based Melanocortin Receptor Agonists. A Conformationally Restricted Dipeptide Mimic Approach. J Med Chem 49:4745-4761 (2006).
Tran et al. Syntheses of tetrahydrothiophenes and tetrahydrofurans and studies of their derivatives as melanocortin-4 receptor ligands. Bioorg Med Chem Lett 18:1124-1130 (2008).
Widder et al. Section III: Prodrugs Kinetics. Method in Enzymology. 112:309-396 (1985).
Co-Pending, U.S. Appl. No. 18/313,915, inventors Zhao, Jian et al., filed on May 8, 2023.
Co-Pending, U.S. Appl. No. 18/512,361, inventors Han, Sangdon et al., filed on Nov. 17, 2023.

MELANOCORTIN SUBTYPE-2 RECEPTOR (MC2R) ANTAGONISTS AND USES THEREOF

CROSS-REFERENCE TO RELATED APPLICATIONS

This application claims the benefit of U.S. Provisional Patent Application No. 62/932,306 filed on Nov. 7, 2019, which is herein incorporated by reference in its entirety.

FIELD OF THE INVENTION

Described herein are compounds that modulate the activity of one or more melanocortin receptors, methods of making such compounds, pharmaceutical compositions and medicaments comprising such compounds, and methods of using such compounds in the treatment of conditions, diseases, or disorders that would benefit from modulating melanocortin subtype-2 receptor (MC2R) activity.

BACKGROUND OF THE INVENTION

The melanocortin receptors form a family of G protein-coupled receptor (GPCRs) (MC1R, MC2R, MC3R, MC4R, and MC5R) that are selectively activated by different melanocortin peptides adrenocorticotropic hormone (ACTH), and the melanocortin peptides α-, β-, and γ-melanocyte-stimulating hormone (α-MSH, β-MSH, and γ-MSH) that are all derived proteolytically from proopiomelanocortin hormone, or POMC. ACTH is a 39 amino acid peptide that is the primary regulator of adrenal glucocorticoid synthesis and secretion and only has affinity for MC2R. As the central actor in this hypothalamic-pituitary-adrenal (HPA) axis, ACTH is secreted by the pituitary in response to stressful stimuli and acts at the adrenal gland to stimulate the synthesis and secretion of cortisol. Modulation of MC2R is attractive for the treatment of conditions, diseases, or disorders that would benefit from modulating melanocortin receptor activity.

SUMMARY OF THE INVENTION

Compounds described herein are melanocortin receptor modulator compounds. In some embodiments, compounds described herein modulate one or more of the subtype melanocortin receptor proteins. In some embodiments, compounds described herein modulate two or more of the subtype melanocortin receptor proteins. In some embodiments, compounds described herein modulate MC2R.

In one aspect, described herein is a compound of Formula (I), or a pharmaceutically acceptable salt, or solvate thereof:

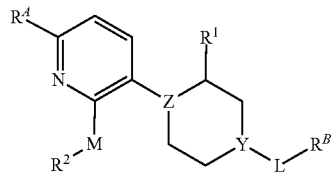

Formula (I)

wherein:
  $R^A$ is unsubstituted or substituted phenyl or unsubstituted or substituted monocyclic heteroaryl, wherein if $R^A$ is substituted then $R^A$ is substituted with $R^a$, $R^b$ and $R^c$;
  $R^a$, $R^b$ and $R^c$ are independently selected from the group consisting of hydrogen, halogen, $-OR^5$, $-CN$, $-N(R^5)_2$, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, unsubstituted or substituted $C_2$-$C_7$ heterocycloalkyl, unsubstituted or substituted phenyl, and unsubstituted or substituted monocyclic heteroaryl, wherein any substituted group of $R^a$, $R^b$ and $R^c$ is substituted with one or more $R^7$ groups;
  L is $-O-$, $-C(=O)-$, $-C(=O)NR^4-$, $-S-$, $-SO_2-$, $-S(=O)_2NR^4-$, 5-membered heterocycle, or a bond;
  M is $-O-$, $-C(=O)-$, $-C(=O)NR^4-$, $-S-$, $-SO_2-$, $-S(=O)_2NR^4-$, 5-membered heterocycle, or a bond;
  $R^B$ is unsubstituted or substituted carbocycle, unsubstituted or substituted heterocycle, unsubstituted or substituted $C_1$-$C_7$ alkyl, unsubstituted or substituted $C_1$-$C_7$ fluoroalkyl, or unsubstituted or substituted $C_1$-$C_6$ heteroalkyl, wherein if $R^B$ is substituted then $R^B$ is substituted with $R^d$, $R^e$ and $R^f$;
  or $R^B$ and $R^4$ are taken together with the nitrogen atom to which they are attached to form an unsubstituted or substituted 3- to 7-membered heterocycle, wherein if the 3- to 7-membered heterocycle is substituted then the 3- to 7-membered heterocycle is substituted with $R^d$, $R^e$ and $R^f$;
  $R^d$, $R^e$ and $R^f$ are independently selected from the group consisting of hydrogen, halogen, $-OR^5$, $-CN$, $-N(R^5)_2$, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, unsubstituted or substituted $C_2$-$C_7$ heterocycloalkyl, unsubstituted or substituted phenyl, and unsubstituted or substituted monocyclic heteroaryl, wherein any substituted group of $R^d$, $R^e$ and $R^f$ is substituted with one or more $R^7$ groups;
  Y is $CR^3$ or N; wherein when Y is N; L is $-C(=O)-$, $-C(=O)NR^4-$, $-SO_2-$, $-S(=O)_2NR^4-$, 5-membered heterocycle, or a bond;
  Z is $CR^3$ or N;
  $R^1$ is an unsubstituted or substituted $C_1$-$C_6$ alkyl or unsubstituted or substituted $C_3$-$C_6$ cycloalkyl, wherein if $R^1$ is substituted then $R^1$ is substituted with hydrogen, $-OR^6$, halogen, $-N(R^5)_2$, or $-CN$;
  $R^2$ is hydrogen, unsubstituted or substituted $C_1$-$C_6$ alkyl, unsubstituted or substituted monocyclic carbocycle, unsubstituted or substituted bridged carbocycle, unsubstituted or substituted spirocyclic carbocycle, unsubstituted or substituted monocyclic heterocycle, unsubstituted or substituted bridged heterocycle, unsubstituted or substituted spirocyclic heterocycle, unsubstituted or substituted $-(C_1$-$C_6$ alkyl)-carbocycle, or unsubstituted or substituted $-(C_1$-$C_6$ alkyl)-heterocycle, wherein any substituted group of $R^2$ is substituted with one or more halogen, unsubstituted or substituted $C_1$-$C_6$ alkyl, unsubstituted or substituted monocyclic heterocycle, $-N(R^5)_2$, $-OR^6$, $-CN$, $-CO_2R^6$, $-C(=O)N(R^5)_2$, $-SR^6$, $-S(=O)R^8$, $-S(=O)_2R^8$, $-NR^5C(=O)R^6$, $-NR^5SO_2R^8$, $-SO_2R^8$, or $-SO_2N(R^5)_2$;
  each $R^3$ is independently hydrogen, halogen, unsubstituted or substituted $C_1$-$C_6$ alkyl, unsubstituted or substituted $C_3$-$C_6$cycloalkyl, unsubstituted or substituted $C_1$-$C_6$fluoroalkyl, $-CN$, $-OR^6$, $-SR^6$, $-CO_2R^6$, $-C(=O)N(R^5)_2$, or $-N(R^5)_2$;

R$^4$ is hydrogen, substituted C$_1$-C$_6$ alkyl, unsubstituted or substituted C$_3$-C$_6$ cycloalkyl, unsubstituted or substituted C$_1$-C$_6$fluoroalkyl, unsubstituted or substituted aryl, or unsubstituted or substituted heteroaryl;

each R$^5$ is independently hydrogen, substituted C$_1$-C$_6$ alkyl, unsubstituted or substituted C$_3$-C$_6$ cycloalkyl, unsubstituted or substituted C$_1$-C$_6$fluoroalkyl, unsubstituted or substituted aryl, or unsubstituted or substituted heteroaryl;

or two R$^5$ on the same nitrogen atom are taken together with the nitrogen atom to which they are attached to form an unsubstituted or substituted 3- to 6-membered monocyclic heterocycle;

each R$^6$ is independently hydrogen, substituted C$_1$-C$_6$ alkyl, unsubstituted or substituted C$_3$-C$_6$ cycloalkyl, unsubstituted or substituted C$_1$-C$_6$fluoroalkyl, unsubstituted or substituted aryl, or unsubstituted or substituted heteroaryl;

each R$^7$ is independently hydrogen, halogen, unsubstituted or substituted C$_1$-C$_4$alkyl, unsubstituted or substituted C$_1$-C$_4$alkoxy, unsubstituted or substituted C$_1$-C$_4$fluoroalkyl, unsubstituted or substituted C$_1$-C$_4$fluoroalkoxy, unsubstituted or substituted monocyclic carbocycle, unsubstituted or substituted monocyclic heterocycle, —CN, —OH, —CO$_2$R$^6$, —CH$_2$CO$_2$R$^6$, —C(=O)N(R$^5$)$_2$, —C(=O)N(R$^5$)OR$^6$, —CH$_2$C(=O)N(R$^5$)$_2$, —N(R$^5$)$_2$, —CH$_2$N(R$^5$)$_2$, —C(R$^6$)$_2$N(R$^5$)$_2$, —NR$^5$C(=O)R$^6$, —CH$_2$NR$^5$C(=O)R$^6$, —NR$^5$C(=O)N(R$^6$)$_2$, —NR$^5$C(=O)N(R$^6$)$_2$, C(R$^6$)=N(R$^5$)—OR$^6$, —SR$^6$, —S(=O)R$^8$, —SO$_2$R$^8$, or —SO$_2$N(R$^5$)$_2$;

each R$^8$ is independently substituted C$_1$-C$_6$ alkyl, unsubstituted or substituted C$_3$-C$_6$ cycloalkyl, unsubstituted or substituted C$_1$-C$_6$fluoroalkyl, unsubstituted or substituted phenyl, or unsubstituted or substituted heteroaryl.

Also described herein is a pharmaceutical composition comprising a compound described herein, or a pharmaceutically acceptable salt, or solvate thereof, and at least one pharmaceutically acceptable excipient. In some embodiments, the pharmaceutical composition is formulated for administration to a mammal by intravenous administration, subcutaneous administration, oral administration, inhalation, nasal administration, dermal administration, or ophthalmic administration. In some embodiments, the pharmaceutical composition is formulated for administration to a mammal by oral administration. In some embodiments, the pharmaceutical composition is in the form of a tablet, a pill, a capsule, a liquid, a suspension, a gel, a dispersion, a solution, an emulsion, an ointment, or a lotion. In some embodiments, the pharmaceutical composition is in the form of a tablet, a pill, or a capsule.

In any of the aforementioned aspects are further embodiments in which the effective amount of the compound of Formula (I), or a pharmaceutically acceptable salt thereof, is: (a) systemically administered to the mammal; and/or (b) administered orally to the mammal; and/or (c) intravenously administered to the mammal; and/or (d) administered by inhalation; and/or (e) administered by nasal administration; or and/or (f) administered by injection to the mammal; and/or (g) administered topically to the mammal; and/or (h) administered by ophthalmic administration; and/or (i) administered rectally to the mammal; and/or (j) administered non-systemically or locally to the mammal.

In any of the aforementioned aspects are further embodiments comprising single administrations of the effective amount of the compound, including further embodiments in which the compound is administered once a day to the mammal or the compound is administered to the mammal multiple times over the span of one day. In some embodiments, the compound is administered on a continuous dosing schedule. In some embodiments, the compound is administered on a continuous daily dosing schedule.

In any of the embodiments disclosed herein, the mammal is a human.

In some embodiments, compounds provided herein are orally administered to a human.

Articles of manufacture, which include packaging material, a compound of Formula (I), or a pharmaceutically acceptable salt thereof, within the packaging material, and a label that indicates that the compound or composition, or pharmaceutically acceptable salt, tautomers, pharmaceutically acceptable N-oxide, pharmaceutically active metabolite, pharmaceutically acceptable prodrug, or pharmaceutically acceptable solvate thereof, is used for modulating one or more subtype melanocortin receptor proteins, or for the treatment, prevention or amelioration of one or more symptoms of a disease or condition that would benefit from modulating one or more subtype melanocortin receptor proteins, are provided.

Other objects, features and advantages of the compounds, methods and compositions described herein will become apparent from the following detailed description. It should be understood, however, that the detailed description and the specific examples, while indicating specific embodiments, are given by way of illustration only, since various changes and modifications within the spirit and scope of the instant disclosure will become apparent to those skilled in the art from this detailed description.

DETAILED DESCRIPTION OF THE INVENTION

Adrenocorticotropic hormone (ACTH) is a 39 amino acid peptide synthesized by anterior pituitary corticotrophic cells by proteolytic cleavage of the proopiomelanocortin hormone (POMC). ACTH is the primary regulator of adrenal glucocorticoid (GC; cortisol in humans and most other species; corticosterone in rodents) synthesis and secretion. As the central actor in this hypothalamic-pituitary-adrenal (HPA) axis, ACTH is secreted by the pituitary in response to stressful stimuli and acts at the adrenal gland to stimulate the synthesis and secretion of cortisol. This stimulation is mediated through a highly specific G protein-coupled receptor (GPCR) which is expressed almost uniquely in the adrenal cortex. The receptor is the melanocortin 2 receptor (MC2R), and, along with ACTH, is part of the larger melanocortin system.

The melanocortin system comprises a family of five GPCRs (MC1R, MC2R, MC3R, MC4R, and MC5R); their natural agonists, the melanocortin peptides α-, β-, and γ-melanocyte-stimulating hormone (α-MSH, β-MSH, and γ-MSH) and ACTH; and endogenous melanocortin antagonists agouti and agouti-related protein (AGRP). The melanocortin receptors (MCRs) have different selectivities for endogenous agonist and antagonist peptides and are expressed in diverse tissues where they serve varied and discreet physiological functions (Gantz, I. and T. M. Fong, *Am. J. Physiol. Endocrinol. Metab.*, 284: E468-E474, 2003).

It is possible to selectively modulate any one of the MCRs, or combinations thereof. In some embodiments, selectively modulating any one of the MCRs relative to the other MCRs, or combinations thereof, is useful in a variety of clinical applications. In some embodiments, selectively modulating any one of the MCRs relative to the other MCRs, or combinations thereof, reduces unwanted side effects in a variety of clinical applications. In one aspect, compounds described herein are antagonists of MC2R. In some embodiments, compounds described herein are selective antagonists for MC2R relative or other MCRs.

MC2R is a highly selective receptor for ACTH. Although ACTH can activate all five MCRs, at physiological levels, the sensitivity of the other receptors is not high enough to be activated, and ACTH selectively activates MC2R. Importantly, the other naturally occurring agonists α-MSH, R-MSH, and γ-MSH have no affinity for MC2R (Gantz, I. and T. M. Fong, *Am. J. Physiol. Endocrinol. Metab.*, 284: E468-E474, 2003). The major function of MC2R is to stimulate the fasciculata cells of the adrenal cortex to synthesize and secret cortisol. MC2R requires the GPCR accessory protein MRAP (melanocortin 2 receptor protein) to be successfully secreted to the cell surface and as well as to function. MRAP is a small protein with a single transmembrane domain that forms an antiparallel homodimer in stable complex with MC2R and is necessary for both cell surface expression of MC2R and its ability to bind ACTH. MRAP can bind to any of the MCRs and affect their activities, but is only essential for MC2R activity. Binding of ACTH to the MC2R/MRAP complex on adrenal cortical cells activates $G_S$ to elevate intracellular cAMP levels which in turn stimulates cortisol synthesis and secretion by regulating multiple steps in the steroidogenic pathway.

Cushing's syndrome is a rare disorder characterized by chronic, excess glucocorticoid exposure. Clinical signs of Cushing's syndrome include growth of fat pads (collarbone, back of neck, face and trunk), excessive sweating, dilation of capillaries, thinning of the skin, muscle weakness, hirsutism, depression/anxiety, hypertension, osteoporosis, insulin resistance, hyperglycemia, heart disease, and a range of other metabolic disturbances resulting in high morbidity. If inadequately controlled in its severe forms, Cushing's syndrome is associated with high mortality. Although glucocorticoid excess can sometimes be ACTH independent, for example from excessive autonomous secretion of cortisol from a hyperfunctioning adrenal adenoma, carcinoma, or steroid abuse, about 60-80% of all cases are ACTH dependent Cushing's syndrome, known as Cushing's disease. Cushing's disease is caused by microadenomas of pituitary corticotropic cells that secrete excess ACTH. Corticotroph adenomas are small, usually slow growing, benign tumors that normally come to clinical attention as a result of the effects of glucocorticoid excess, rather than because of the physical effects of an expanding tumor. First line treatments for Cushing's disease are surgical and involve removal of either the ACTH-secreting tumor in the pituitary or the adrenal glands themselves. As surgery is often unsuccessful, contraindicated, or delayed, medical therapy for these patients becomes necessary. Current treatment options include inhibitors of steroid synthesis enzymes that can prevent the production of cortisol and improve symptoms, but these treatments also induce a host of unwanted side effects due to the accumulation of other steroid products. In one aspect, an MC2R antagonist is used in the treatment of Cushing's syndrome. In some embodiments, an MC2R antagonist is used in the treatment of Cushing's disease. In some embodiments, glucocorticoid excess is ACTH independent. In some embodiments, glucocorticoid excess is ACTH dependent.

Ectopic ACTH syndrome, or ectopic Cushing's syndrome or disease, is essentially the same as Cushing's disease, except that the underlying tumor expressing ACTH is outside the pituitary gland. In some embodiments, the tumors are small carcinoid tumors that occur anywhere in the lungs or gastrointestinal tract. In some embodiments, an MC2R antagonist is used in the treatment of ectopic ACTH syndrome.

Congenital adrenal hyperplasia (CAH) is characterized by a reduction or loss of cortisol synthesis and excessive ACTH and corticotropin-releasing hormone. CAH can result from a variety of genetic defects in the adrenal steroidal biosynthesis pathway. In some embodiments, CAH is due to a mutation in 21β-hydroxylase. The lack of cortisol removes the negative feedback to the pituitary which leads to excessive ACTH secretion. The resulting excessive adrenal stimulation causes overproduction of steroid precursors which also have negative consequences (e.g., hyperandrogenism). Administration of replacement glucocorticoids typically does not adequately suppress ACTH without also causing Cushing's-like symptoms. In some embodiments, an MC2R antagonist is used in the treatment of CAH.

In addition to Cushing's disease and CAH it has also been hypothesized that there might be a role for an MC2R antagonist in the treatment of depressive illness and septic shock. In some embodiments, an MC2R antagonist is used in the treatment of depressive illness. In some embodiments, an MC2R antagonist is used in the treatment of septic shock.

In some embodiments, compounds described herein are amenable to administration to a mammal in need of treatment with an MC2R antagonist.

Compounds

Compounds of Formula (A) or Formula (I), including pharmaceutically acceptable salts, prodrugs, active metabolites and pharmaceutically acceptable solvates thereof, are melanocortin receptor modulators. In some embodiments, the compounds of Formula (A) or Formula (I), including pharmaceutically acceptable salts, prodrugs, active metabolites and pharmaceutically acceptable solvates thereof, are MC2R modulators. In some embodiments, the MC2R modulators are MC2R antagonists.

Provided in one aspect is a compound of Formula (A), or a pharmaceutically acceptable salt, or solvate thereof:

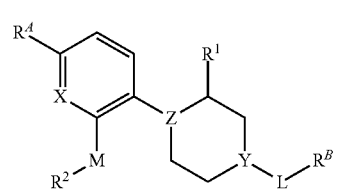

Formula (A)

wherein:
  $R^A$ is —CF$_3$, unsubstituted or substituted phenyl, or unsubstituted or substituted monocyclic heteroaryl, wherein if $R^A$ is substituted then $R^A$ is substituted with $R^a$, $R^b$ and $R^c$;
  $R^a$, $R^b$ and $R^c$ are independently selected from the group consisting of hydrogen, halogen, —OR$^6$, —CN, —N(R$^5$)$_2$, unsubstituted or substituted C$_1$-C$_6$ alkyl, unsubstituted or substituted C$_1$-C$_6$ fluoroalkyl, unsubstituted or substituted C$_1$-C$_6$ heteroalkyl, unsubstituted or substituted C$_3$-C$_6$ cycloalkyl, unsubstituted or substituted C$_2$-C$_7$ heterocycloalkyl, unsubstituted or substituted phenyl, and unsubstituted or substituted monocyclic heteroaryl, wherein any substituted group of $R^a$, $R^b$ and $R^c$ is substituted with one or more $R^7$ groups;

L is —O—, —C(=O)—, —C(=O)NR$^4$—, —S—, —SO$_2$—, —S(=O)$_2$NR$^4$—, 5-membered heterocycle, or a bond;

M is —O—, —C(=O)—, —C(=O)NR$^4$—, —S—, —SO$_2$—, —S(=O)$_2$NR$^4$—, 5-membered heterocycle, or a bond;

R$^B$ is unsubstituted or substituted carbocycle, unsubstituted or substituted heterocycle, unsubstituted or substituted C$_1$-C$_7$ alkyl, unsubstituted or substituted C$_1$-C$_7$ fluoroalkyl, or unsubstituted or substituted C$_1$-C$_6$ heteroalkyl, wherein if R$^B$ is substituted then R$^B$ is substituted with R$^d$, R$^e$ and R$^f$;

or R$^B$ and R$^4$ are taken together with the nitrogen atom to which they are attached to form an unsubstituted or substituted 3- to 7-membered heterocycle, wherein if the 3- to 7-membered heterocycle is substituted then the 3- to 7-membered heterocycle is substituted with R$^d$, R$^e$ and R$^f$;

R$^d$, R$^e$ and R$^f$ are independently selected from the group consisting of hydrogen, halogen, —OR$^6$, —CN, —N(R$^5$)$_2$, unsubstituted or substituted C$_1$-C$_6$ alkyl, unsubstituted or substituted C$_1$-C$_6$ fluoroalkyl, unsubstituted or substituted C$_1$-C$_6$ heteroalkyl, unsubstituted or substituted C$_3$-C$_6$ cycloalkyl, unsubstituted or substituted C$_2$-C$_7$ heterocycloalkyl, unsubstituted or substituted phenyl, and unsubstituted or substituted monocyclic heteroaryl, wherein any substituted group of R$^d$, R$^e$ and R$^f$ is substituted with one or more R$^7$ groups;

X is CR$^3$ or N;
Y is CR$^3$ or N;
Z is CR$^3$ or N;

R$^1$ is hydrogen, an unsubstituted or substituted C$_1$-C$_6$ alkyl or unsubstituted or substituted C$_3$-C$_6$ cycloalkyl, wherein if R$^1$ is substituted then R$^1$ is substituted with hydrogen, —OR$^6$, halogen, —N(R$^5$)$_2$, or —CN;

R$^2$ is hydrogen, unsubstituted or substituted C$_1$-C$_6$ alkyl, unsubstituted or substituted monocyclic carbocycle, unsubstituted or substituted bridged carbocycle, unsubstituted or substituted spirocyclic carbocycle, unsubstituted or substituted monocyclic heterocycle, unsubstituted or substituted bridged heterocycle, unsubstituted or substituted spirocyclic heterocycle, unsubstituted or substituted —(C$_1$-C$_6$ alkyl)-carbocycle, or unsubstituted or substituted —(C$_1$-C$_6$ alkyl)-heterocycle, wherein any substituted group of R$^2$ is substituted with one or more halogen, unsubstituted or substituted C$_1$-C$_6$ alkyl, unsubstituted or substituted monocyclic heterocycle, —N(R$^5$)$_2$, —OR$^6$, —CN, —CO$_2$R$^6$, —C(=O)N(R$^5$)$_2$, —SR$^6$, —S(=O)R$^8$, —S(=O)$_2$R$^8$, —NR$^5$C(=O)R$^6$, —NR$^5$SO$_2$R$^8$, —SO$_2$R$^8$, or —SO$_2$N(R$^5$)$_2$;

each R$^3$ is independently hydrogen, halogen, unsubstituted or substituted C$_1$-C$_6$ alkyl, unsubstituted or substituted C$_3$-C$_6$cycloalkyl, unsubstituted or substituted C$_1$-C$_6$fluoroalkyl, —CN, —OR$^6$, —SR$^6$, —CO$_2$R$^6$, —C(=O)N(R$^5$)$_2$, or —N(R$^5$)$_2$;

R$^4$ is hydrogen, substituted C$_1$-C$_6$ alkyl, unsubstituted or substituted C$_3$-C$_6$ cycloalkyl, unsubstituted or substituted C$_1$-C$_6$fluoroalkyl, unsubstituted or substituted aryl, or unsubstituted or substituted heteroaryl;

each R$^5$ is independently hydrogen, substituted C$_1$-C$_6$ alkyl, unsubstituted or substituted C$_3$-C$_6$ cycloalkyl, unsubstituted or substituted C$_1$-C$_6$fluoroalkyl, unsubstituted or substituted aryl, or unsubstituted or substituted heteroaryl;

or two R$^5$ on the same nitrogen atom are taken together with the nitrogen atom to which they are attached to form an unsubstituted or substituted 3- to 6-membered monocyclic heterocycle;

each R$^6$ is independently hydrogen, substituted C$_1$-C$_6$ alkyl, unsubstituted or substituted C$_3$-C$_6$ cycloalkyl, unsubstituted or substituted C$_1$-C$_6$fluoroalkyl, unsubstituted or substituted aryl, or unsubstituted or substituted heteroaryl;

each R$^7$ is independently hydrogen, halogen, unsubstituted or substituted C$_1$-C$_4$alkyl, unsubstituted or substituted C$_1$-C$_4$alkoxy, unsubstituted or substituted C$_1$-C$_4$fluoroalkyl, unsubstituted or substituted C$_1$-C$_4$fluoroalkoxy, unsubstituted or substituted monocyclic carbocycle, unsubstituted or substituted monocyclic heterocycle, —CN, —OH, —CO$_2$R$^6$, —CH$_2$CO$_2$R$^6$, —C(=O)N(R$^5$)$_2$, —C(=O)N(R$^5$)OR$^6$, —CH$_2$C(=O)N(R$^5$)$_2$, —N(R$^5$)$_2$, —CH$_2$N(R$^5$)$_2$, —C(R$^6$)$_2$N(R$^5$)$_2$, —NR$^5$C(=O)R$^6$, —CH$_2$NR$^5$C(=O)R$^6$, —NR$^5$C(=O)N(R$^6$)$_2$, —NR$^5$C(=O)N(R$^6$)$_2$, —C(R$^6$)=N(R$^5$)—OR$^6$, —SR$^6$, —S(=O)R$^8$, —SO$_2$R$^8$, or —SO$_2$N(R$^5$)$_2$;

each R$^8$ is independently substituted C$_1$-C$_6$ alkyl, unsubstituted or substituted C$_3$-C$_6$ cycloalkyl, unsubstituted or substituted C$_1$-C$_6$fluoroalkyl, unsubstituted or substituted phenyl, or unsubstituted or substituted heteroaryl.

In some embodiments, at least one of L and M is —O—.

In some embodiments, X is CR$^3$. In some embodiments, X is CR$^3$; and R$^3$ is hydrogen, halogen, unsubstituted or substituted C$_1$-C$_6$ alkyl, unsubstituted or substituted C$_1$-C$_6$fluoroalkyl, —CN, or —OR$^8$. In some embodiments, X is CR$^3$; and R$^3$ is hydrogen, halogen, or unsubstituted or substituted C$_1$-C$_6$ alkyl. In some embodiments, X is CR$^3$; and R$^3$ is hydrogen or halogen. In some embodiments, X is CR$^3$; and R$^3$ is hydrogen or fluorine. In some embodiments, X is CH or CF. In some embodiments, X is CH. In some embodiments, X is CF.

In some embodiments, X is N.

In some embodiments, R$^1$ is —H, —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)(CH$_2$CH$_3$), —C(CH$_3$)$_3$, —CH$_2$OH, —CH$_2$CN, —CH$_2$F, —CHF$_2$, —CF$_3$, —CH$_2$CH$_2$OH, —CH$_2$CH$_2$CN, —CH$_2$CH$_2$F, —CH$_2$CHF$_2$, —CH$_2$CF$_3$, —CH$_2$OCH$_3$, —CH$_2$CH$_2$OCH$_3$, —CH$_2$NH$_2$, —CH$_2$NHCH$_3$, —CH$_2$N(CH$_3$)$_2$, —CH$_2$CH$_2$NH$_2$, —CH$_2$CH$_2$NHCH$_3$, —CH$_2$CH$_2$N(CH$_3$)$_2$, cyclopropyl, cyclobutyl, cyclopentyl, or cyclohexyl. In some embodiments, R$^1$ is —H, —CH$_3$, —CH$_2$CH$_3$, or —CH$_2$CH$_2$CH$_3$. In some embodiments, R$^1$ is —H.

In some embodiments, R$^1$ is an unsubstituted or substituted C$_1$-C$_6$ alkyl or unsubstituted or substituted C$_3$-C$_6$ cycloalkyl, wherein if R$^1$ is substituted then R$^1$ is substituted with hydrogen, —OR$^6$, halogen, —N(R$^5$)$_2$, or —CN.

In some embodiments, R$^A$ is —CF$_3$, unsubstituted or substituted phenyl, unsubstituted or substituted monocyclic 6-membered heteroaryl, unsubstituted or substituted monocyclic 5-membered heteroaryl, wherein if R$^A$ is substituted then R$^A$ is substituted with R$^a$, R$^b$ and R$^c$.

In some embodiments, R$^A$ is —CF$_3$, unsubstituted or substituted phenyl, unsubstituted or substituted pyridinyl, unsubstituted or substituted pyrimidinyl, unsubstituted or substituted pyrazinyl, unsubstituted or substituted pyridazinyl, unsubstituted or substituted triazinyl, unsubstituted or substituted furanyl, unsubstituted or substituted thienyl, unsubstituted or substituted pyrrolyl, unsubstituted or substituted oxazolyl, unsubstituted or substituted thiazolyl, unsubstituted or substituted imidazolyl, unsubstituted or substituted pyrazolyl, unsubstituted or substituted triazolyl, unsubstituted or substituted tetrazolyl, unsubstituted or substituted isoxazolyl, unsubstituted or substituted isothiazolyl, unsubstituted or substituted oxadiazolyl, or unsubstituted or substituted thiadiazolyl; wherein if $R^A$ is substituted then $R^A$ is substituted with $R^a$, $R^b$ and $R^c$.

In some embodiments, $R^A$ is —$CF_3$, unsubstituted or substituted phenyl, unsubstituted or substituted pyridinyl, unsubstituted or substituted pyrimidinyl, unsubstituted or substituted pyrazinyl, or unsubstituted or substituted pyridazinyl; wherein if $R^A$ is substituted then $R^A$ is substituted with $R^a$, $R^b$ and $R^c$.

In some embodiments, $R^A$ is —$CF_3$, unsubstituted or substituted phenyl, or unsubstituted or substituted pyridinyl, wherein if $R^A$ is substituted then $R^A$ is substituted with $R^a$, $R^b$ and $R^c$.

In some embodiments, $R^A$ is unsubstituted or substituted phenyl or unsubstituted or substituted monocyclic heteroaryl, wherein if $R^A$ is substituted then $R^A$ is substituted with $R^a$, $R^b$ and $R^c$.

In some embodiments, $R^A$ is unsubstituted or substituted phenyl or unsubstituted or substituted monocyclic heteroaryl, wherein if $R^A$ is substituted then $R^A$ is substituted with $R^a$, $R^b$ and $R^c$; X is N; and $R^1$ is an unsubstituted or substituted $C_1$-$C_6$ alkyl or unsubstituted or substituted $C_3$-$C_6$ cycloalkyl, wherein if $R^1$ is substituted then $R^1$ is substituted with hydrogen, —$OR^6$, halogen, —$N(R^5)_2$, or —CN.

In some embodiments, the compound has the structure of Formula (I), or a pharmaceutically acceptable salt, or solvate thereof.

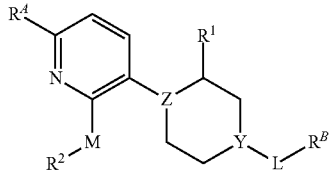

Formula (I)

wherein:
$R^A$ is unsubstituted or substituted phenyl or unsubstituted or substituted monocyclic heteroaryl, wherein if $R^A$ is substituted then $R^A$ is substituted with $R^a$, $R^b$ and $R^c$;
$R^a$, $R^b$ and $R^c$ are independently selected from the group consisting of hydrogen, halogen, —$OR^5$, —CN, —$N(R^5)_2$, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, unsubstituted or substituted $C_2$-$C_7$ heterocycloalkyl, unsubstituted or substituted phenyl, and unsubstituted or substituted monocyclic heteroaryl, wherein any substituted group of $R^a$, $R^b$ and $R^c$ is substituted with one or more $R^7$ groups;
L is —O—, —C(=O)—, —C(=O)$NR^4$—, —S—, —$SO_2$—, —S(=O)$_2NR^4$—, 5-membered heterocycle, or a bond;
M is —O—, —C(=O)—, —C(=O)$NR^4$—, —S—, —$SO_2$—, —S(=O)$_2NR^4$—, 5-membered heterocycle, or a bond;
$R^B$ is unsubstituted or substituted carbocycle, unsubstituted or substituted heterocycle, unsubstituted or substituted $C_1$-$C_7$ alkyl, unsubstituted or substituted $C_1$-$C_7$ fluoroalkyl, or unsubstituted or substituted $C_1$-$C_6$ heteroalkyl, wherein if $R^B$ is substituted then $R^B$ is substituted with $R^d$, $R^e$ and $R^f$;
or $R^B$ and $R^4$ are taken together with the nitrogen atom to which they are attached to form an unsubstituted or substituted 3- to 7-membered heterocycle, wherein if the 3- to 7-membered heterocycle is substituted then the 3- to 7-membered heterocycle is substituted with $R^d$, $R^e$ and $R^f$;
$R^d$, $R^e$ and $R^f$ are independently selected from the group consisting of hydrogen, halogen, —$OR^5$, —CN, —$N(R^5)_2$, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, unsubstituted or substituted $C_2$-$C_7$ heterocycloalkyl, unsubstituted or substituted phenyl, and unsubstituted or substituted monocyclic heteroaryl, wherein any substituted group of $R^d$, $R^e$ and $R^f$ is substituted with one or more $R^7$ groups;
Y is $CR^3$ or N;
Z is $CR^3$ or N;
$R^1$ is an unsubstituted or substituted $C_1$-$C_6$ alkyl or unsubstituted or substituted $C_3$-$C_6$ cycloalkyl, wherein if $R^1$ is substituted then $R^1$ is substituted with hydrogen, —$OR^6$, halogen, —$N(R^5)_2$, or —CN;
$R^2$ is hydrogen, unsubstituted or substituted $C_1$-$C_6$ alkyl, unsubstituted or substituted monocyclic carbocycle, unsubstituted or substituted bridged carbocycle, unsubstituted or substituted spirocyclic carbocycle, unsubstituted or substituted monocyclic heterocycle, unsubstituted or substituted bridged heterocycle, unsubstituted or substituted spirocyclic heterocycle, unsubstituted or substituted —($C_1$-$C_6$ alkyl)-carbocycle, or unsubstituted or substituted —($C_1$-$C_6$ alkyl)-heterocycle, wherein any substituted group of $R^2$ is substituted with one or more halogen, unsubstituted or substituted $C_1$-$C_6$ alkyl, unsubstituted or substituted monocyclic heterocycle, —$N(R^5)_2$, —$OR^6$, —CN, —$CO_2R^6$, —C(=O)$N(R^5)_2$, —$SR^6$, —S(=O)$R^8$, —S(=O)$_2R^8$, —$NR^5$C(=O)$R^6$, —$NR^5SO_2R^8$, —$SO_2R^8$, or —$SO_2N(R^5)_2$;
each $R^3$ is independently hydrogen, halogen, unsubstituted or substituted $C_1$-$C_6$ alkyl, unsubstituted or substituted $C_3$-$C_6$ cycloalkyl, unsubstituted or substituted $C_1$-$C_6$ fluoroalkyl, —CN, —$OR^6$, —$SR^6$, —$CO_2R^6$, —C(=O)$N(R^5)_2$, or —$N(R^5)_2$;
$R^4$ is hydrogen, substituted $C_1$-$C_6$ alkyl, unsubstituted or substituted $C_3$-$C_6$ cycloalkyl, unsubstituted or substituted $C_1$-$C_6$ fluoroalkyl, unsubstituted or substituted aryl, or unsubstituted or substituted heteroaryl;
each $R^5$ is independently hydrogen, substituted $C_1$-$C_6$ alkyl, unsubstituted or substituted $C_3$-$C_6$ cycloalkyl, unsubstituted or substituted $C_1$-$C_6$fluoroalkyl, unsubstituted or substituted aryl, or unsubstituted or substituted heteroaryl;
or two $R^5$ on the same nitrogen atom are taken together with the nitrogen atom to which they are attached to form an unsubstituted or substituted 3- to 6-membered monocyclic heterocycle;
each $R^6$ is independently hydrogen, substituted $C_1$-$C_6$ alkyl, unsubstituted or substituted $C_3$-$C_6$ cycloalkyl, unsubstituted or substituted $C_1$-$C_6$fluoroalkyl, unsubstituted or substituted aryl, or unsubstituted or substituted heteroaryl;
each $R^7$ is independently hydrogen, halogen, unsubstituted or substituted $C_1$-$C_4$alkyl, unsubstituted or substituted $C_1$-$C_4$alkoxy, unsubstituted or substituted $C_1$-$C_4$fluoroalkyl, unsubstituted or substituted $C_1$-$C_4$fluoroalkoxy, unsubstituted or substituted monocyclic carbocycle, unsubstituted or substituted monocyclic heterocycle, —CN, —OH, —$CO_2R^6$, —$CH_2CO_2R^6$, —C(=O)N($R^5$)$_2$, —C(=O)N($R^5$)$OR^6$, —$CH_2$C(=O)N($R^5$)$_2$, —N($R^5$)$_2$, —$CH_2$N($R^5$)$_2$, —C($R^6$)$_2$N($R^5$)$_2$, —$NR^5$C(=O)$R^6$, —$CH_2NR^5$C(=O)$R^6$, —$NR^5$C(=O)N($R^6$)$_2$, —$NR^5$C(=O)N($R^6$)$_2$, C($R^6$)=N($R^5$)—$OR^6$, —$SR^6$, —S(=O)$R^8$, —$SO_2R^8$, or —$SO_2$N($R^5$)$_2$;

each $R^8$ is independently substituted $C_1$-$C_6$ alkyl, unsubstituted or substituted $C_3$-$C_6$ cycloalkyl, unsubstituted or substituted $C_1$-$C_6$fluoroalkyl, unsubstituted or substituted phenyl, or unsubstituted or substituted heteroaryl.

In some embodiments, L is —O—, —C(=O)—, —C(=O)$NR^4$—, —S—, —$SO_2$—, —S(=O)$_2NR^4$—, or 5-membered heterocycle. In some embodiments, L is —O—, —C(=O)—, —C(=O)$NR^4$—, —S—, —$SO_2$—, —S(=O)$_2NR^4$—, 5-membered heteroaryl, or a bond. In some embodiments, L is —O—, —C(=O)—, —C(=O)$NR^4$—, —S—, —$SO_2$—, —S(=O)$_2NR^4$—, or 5-membered heteroaryl.

In some embodiments, L is —O—, —C(=O)—, —S—, —$SO_2$—, 5-membered heteroaryl, or a bond. In some embodiments, L is —O—, —C(=O)—, 5-membered heteroaryl, or a bond. In some embodiments, L is —O— or 5-membered heteroaryl. In some embodiments, L is —O—, —C(=O)—, furanyl, thienyl, pyrrolyl, oxazolyl, thiazolyl, imidazolyl, pyrazolyl, triazolyl, isoxazolyl, isothiazolyl, oxadiazolyl, thiadiazolyl, or a bond. In some embodiments, L is —O—, furanyl, thienyl, pyrrolyl, oxazolyl, thiazolyl, imidazolyl, pyrazolyl, triazolyl, isoxazolyl, isothiazolyl, oxadiazolyl, or thiadiazolyl. In some embodiments, L is —O—, —C(=O)—, imidazolyl, oxadiazolyl, or a bond. In some embodiments, L is —O—, imidazolyl, or oxadiazolyl.

In some embodiments, L is —O—, —S— or —$SO_2$—. In some embodiments, L is —S— or —$SO_2$—. In some embodiments, L is —S—. In some embodiments, L is —$SO_2$—. In some embodiments, L is —O—.

In some embodiments, L is —C(=O)—.

In some embodiments, L is —C(=O)$NR^4$— or —S(=O)$_2$ $NR^4$—. In some embodiments, L is —C(=O)$NR^4$—. In some embodiments, L is —S(=O)$_2NR^4$—.

In some embodiments, L is 5-membered heterocycle. In some embodiments, L is 5-membered heteroaryl. In some embodiments, L is furanyl, thienyl, pyrrolyl, oxazolyl, thiazolyl, imidazolyl, pyrazolyl, triazolyl, isoxazolyl, isothiazolyl, oxadiazolyl, or thiadiazolyl. In some embodiments, L is imidazolyl or oxadiazolyl.

In some embodiments, L is a bond.

In some embodiments, when M is —C(=O)$NR^4$—, and Z and Y are each N, L is not —C(=O)—, $SO_2$, —C(=O)$NR^4$—, or a bond. In some embodiments, when M is —C(=O)$NR^4$—, and Z and Y are each N, L is —O—, —S—, —S(=O)$_2NR^4$—, or 5-membered heterocycle. In some embodiments, when M is —C(=O)$NR^4$—, and Z and Y are each N, L is —O—, —S—, —S(=O)$_2NR^4$—, or 5-membered heteroaryl. In some embodiments, when M is —C(=O)$NR^4$—, and Z and Y are each N, L is —O— or —S—. In some embodiments, when M is —C(=O)$NR^4$—, and Z and Y are each N, L is —O—. In some embodiments, when M is —C(=O)$NR^4$—, and Z and Y are each N, L is —S—. In some embodiments, when M is —C(=O)$NR^4$—, and Z and Y are each N, L is —S(=O)$_2NR^4$—. In some embodiments, when M is —C(=O)$NR^4$—, and Z and Y are each N, L is 5-membered heterocycle. In some embodiments, when M is —C(=O)$NR^4$—, and Z and Y are each N, L is 5-membered heteroaryl.

In some embodiments, M is —O—, —C(=O)—, —C(=O)$NR^4$—, —S—, —$SO_2$—, —S(=O)$_2NR^4$—, or 5-membered heterocycle. In some embodiments, M is —O—, —C(=O)—, —C(=O)$NR^4$—, —S—, —$SO_2$—, —S(=O)$_2NR^4$—, 5-membered heteroaryl, or a bond. In some embodiments, M is —O—, —C(=O)—, —C(=O)$NR^4$—, —S—, —$SO_2$—, —S(=O)$_2NR^4$—, or 5-membered heteroaryl.

In some embodiments, M is —O—, —C(=O)$NR^4$—, —S—, —$SO_2$—, —S(=O)$_2NR^4$—, 5-membered heteroaryl, or a bond. In some embodiments, M is —O—, —C(=O)$NR^4$—, —S—, —$SO_2$—, —S(=O)$_2NR^4$—, or 5-membered heteroaryl. In some embodiments, M is —S—, —$SO_2$—, —S(=O)$_2NR^4$—, 5-membered heteroaryl, or a bond. In some embodiments, M is —S—, —$SO_2$—, —S(=O)$_2NR^4$—, furanyl, thienyl, pyrrolyl, oxazolyl, thiazolyl, imidazolyl, pyrazolyl, triazolyl, isoxazolyl, isothiazolyl, oxadiazolyl, thiadiazolyl, or a bond. In some embodiments, M is —S—, —$SO_2$—, —S(=O)$_2NR^4$—, oxazolyl, imidazolyl, triazolyl, or a bond.

In some embodiments, M is —O—, —S— or —$SO_2$—. In some embodiments, M is —S— or —$SO_2$—. In some embodiments, M is —S—. In some embodiments, M is —$SO_2$—. In some embodiments, M is —O—.

In some embodiments, M is —C(=O)—.

In some embodiments, M is —C(=O)$NR^4$— or —S(=O)$_2NR^4$—. In some embodiments, M is —C(=O)$NR^4$—. In some embodiments, M is —S(=O)$_2NR^4$—.

In some embodiments, M is 5-membered heterocycle. In some embodiments, M is 5-membered heteroaryl. In some embodiments, M is furanyl, thienyl, pyrrolyl, oxazolyl, thiazolyl, imidazolyl, pyrazolyl, triazolyl, isoxazolyl, isothiazolyl, oxadiazolyl, or thiadiazolyl. In some embodiments, M is oxazolyl, imidazolyl, or triazolyl.

In some embodiments, M is a bond.

In some embodiments, at least one of L and M is —O—. In some embodiments, L is —O—. In some embodiments, M is —O—.

In some embodiments, L is —O—, —C(=O)—, —S—, —$SO_2$—, 5-membered heteroaryl, or a bond; and M is —O—, —C(=O)$NR^4$—, —S—, —$SO_2$—, —S(=O)$_2$$NR^4$—, 5-membered heteroaryl, or a bond.

In some embodiments, L is —O—, —C(=O)—, 5-membered heteroaryl, or a bond; and M is —O—. In some embodiments, L is —O—, —C(=O)—, furanyl, thienyl, pyrrolyl, oxazolyl, thiazolyl, imidazolyl, pyrazolyl, triazolyl, isoxazolyl, isothiazolyl, oxadiazolyl, thiadiazolyl, or a bond; and M is —O—. In some embodiments, L is —O—, —C(=O)—, imidazolyl, oxadiazolyl, or a bond; and M is —O—.

In some embodiments, L is —C(=O)—; and M is —O—. In some embodiments, L is —C(=O)—; M is —O—; Y is N; and Z is N.

In some embodiments, L is —O— or 5-membered heteroaryl; and M is —O—. In some embodiments, L is —O—, imidazolyl, or oxadiazolyl; and M is —O—. In some embodiments, L is —O— or 5-membered heteroaryl; M is —O—; Y is $CR^3$; and Z is N. In some embodiments, L is —O—, imidazolyl, or oxadiazolyl; M is —O—; Y is $CR^3$; and Z is N.

In some embodiments, L is a bond; and M is —O—. In some embodiments, L is a bond; M is —O—; Y is N; and Z is $CR^3$.

In some embodiments, L is —O—; and M is —C(=O)NR⁴—. In some embodiments, L is —O—; M is —C(=O)NR⁴—; Y is CR³; and Z is N.

In some embodiments, L is —C(=O)—; and M is —S—, —SO₂—, —S(=O)₂NR⁴—, 5-membered heteroaryl, or a bond. In some embodiments, L is —C(=O)—; and M is —S—, —SO₂—, —S(=O)₂NR⁴—, furanyl, thienyl, pyrrolyl, oxazolyl, thiazolyl, imidazolyl, pyrazolyl, triazolyl, isoxazolyl, isothiazolyl, oxadiazolyl, thiadiazolyl, or a bond. In some embodiments, L is —C(=O)—; and M is —S—, —SO₂—, —S(=O)₂NR⁴—, oxazolyl, imidazolyl, triazolyl, or a bond. In some embodiments, L is —C(=O)—; M is —S—, —SO₂—, —S(=O)₂NR⁴—, 5-membered heteroaryl, or a bond; Y is N; and Z is N. In some embodiments, L is —C(=O)—; M is —S—, —SO₂—, —S(=O)₂NR⁴—, furanyl, thienyl, pyrrolyl, oxazolyl, thiazolyl, imidazolyl, pyrazolyl, triazolyl, isoxazolyl, isothiazolyl, oxadiazolyl, thiadiazolyl, or a bond; Y is N; and Z is N. In some embodiments, L is —C(=O)—; M is —S—, —SO₂—, —S(=O)₂NR⁴—, oxazolyl, imidazolyl, triazolyl, or a bond; Y is N; and Z is N.

In some embodiments, L is —S— or —SO₂—; and M is —C(=O)NR⁴—. In some embodiments, L is —S— or —SO₂—; M is —C(=O)NR⁴—; Y is CR³; and Z is N.

In some embodiments, Y is N. In some embodiments, Y is CR³. In some embodiments, when Y is N; L is —C(=O)—, —C(=O)NR⁴—, —SO₂—, —S(=O)₂NR⁴—, 5-membered heterocycle, or a bond. In some embodiments, when Y is N; L is —C(=O)—, —SO₂—, 5-membered heterocycle, or a bond. In some embodiments, when Y is N; L is —C(=O)— or a bond. In some embodiments, when Y is N; L is —C(=O)—. In some embodiments, when Y is N; L is a bond.

In some embodiments, Z is N. In some embodiments, Z is CR³.

In some embodiments, Y is N; and Z is N. In some embodiments, Y is CR³; and Z is N. In some embodiments, Y is N; and Z is CR³. In some embodiments, Y is CR³; and Z is CR³.

In some embodiments, each R³ is independently hydrogen, halogen, unsubstituted or substituted $C_1$-$C_6$ alkyl, unsubstituted or substituted $C_1$-$C_6$fluoroalkyl, —CN, or —OR⁸. In some embodiments, each R³ is independently hydrogen, unsubstituted or substituted $C_1$-$C_6$ alkyl, unsubstituted or substituted $C_1$-$C_6$fluoroalkyl, —CN, or —OR⁸. In some embodiments, each R³ is independently hydrogen, halogen, unsubstituted or substituted $C_1$-$C_6$ alkyl, or unsubstituted or substituted $C_1$-$C_6$fluoroalkyl. In some embodiments, each R³ is independently hydrogen, unsubstituted or substituted $C_1$-$C_6$ alkyl, or unsubstituted or substituted $C_1$-$C_6$fluoroalkyl. In some embodiments, each R³ is independently hydrogen, halogen, or unsubstituted or substituted $C_1$-$C_6$ alkyl. In some embodiments, each R³ is independently hydrogen or unsubstituted or substituted $C_1$-$C_6$ alkyl. In some embodiments, each R³ is independently hydrogen or halogen. In some embodiments, each R³ is independently hydrogen or fluorine. In some embodiments, each R³ is hydrogen.

In some embodiments, R⁴ is unsubstituted or substituted phenyl, unsubstituted or substituted monocyclic 6-membered heteroaryl, unsubstituted or substituted monocyclic 5-membered heteroaryl, wherein if R⁴ is substituted then R⁴ is substituted with Rᵃ, Rᵇ and Rᶜ.

In some embodiments, R⁴ is unsubstituted or substituted phenyl, unsubstituted or substituted pyridinyl, unsubstituted or substituted pyrimidinyl, unsubstituted or substituted pyrazinyl, unsubstituted or substituted pyridazinyl, unsubstituted or substituted triazinyl, unsubstituted or substituted furanyl, unsubstituted or substituted thienyl, unsubstituted or substituted pyrrolyl, unsubstituted or substituted oxazolyl, unsubstituted or substituted thiazolyl, unsubstituted or substituted imidazolyl, unsubstituted or substituted pyrazolyl, unsubstituted or substituted triazolyl, unsubstituted or substituted tetrazolyl, unsubstituted or substituted isoxazolyl, unsubstituted or substituted isothiazolyl, unsubstituted or substituted oxadiazolyl, or unsubstituted or substituted thiadiazolyl; wherein if R⁴ is substituted then R⁴ is substituted with Rᵃ, Rᵇ and Rᶜ.

In some embodiments, R⁴ is unsubstituted or substituted phenyl, unsubstituted or substituted pyridinyl, unsubstituted or substituted pyrimidinyl, unsubstituted or substituted pyrazinyl, or unsubstituted or substituted pyridazinyl; wherein if R⁴ is substituted then R⁴ is substituted with Rᵃ, Rᵇ and Rᶜ.

In some embodiments, R⁴ is unsubstituted or substituted phenyl, or unsubstituted or substituted pyridinyl, wherein if R⁴ is substituted then R⁴ is substituted with Rᵃ, Rᵇ and Rᶜ.

In some embodiments, R⁴ is

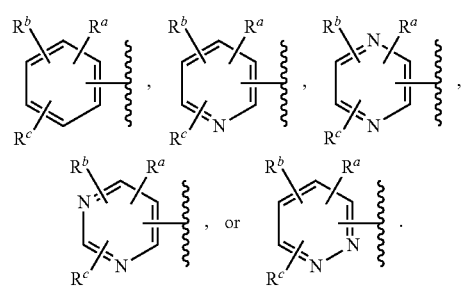

In some embodiments, R⁴ is

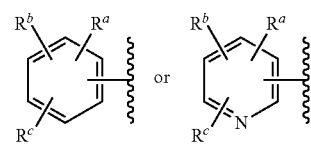

In some embodiments, R⁴ is

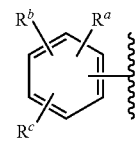

In some embodiments, R⁴ is

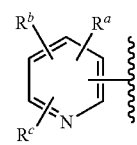

In some embodiments, $R^A$ is

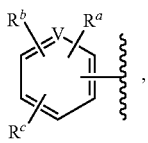, where V is CH or N.

In some embodiments, $R^A$ is

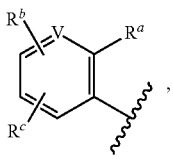, where V is CH or N. In some embodiments, $R^A$ is

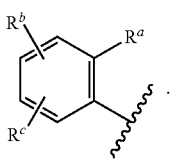.

In some embodiments, $R^A$ is

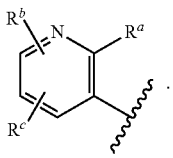.

In some embodiments, the compound has the structure of Formula (A2), or a pharmaceutically acceptable salt, or solvate thereof:

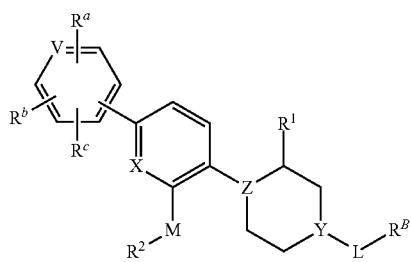

Formula (A2)

wherein V is CH or N; and X is $CR^3$ or N.

In some embodiments, the compound has the structure of Formula (A2a), or a pharmaceutically acceptable salt, or solvate thereof:

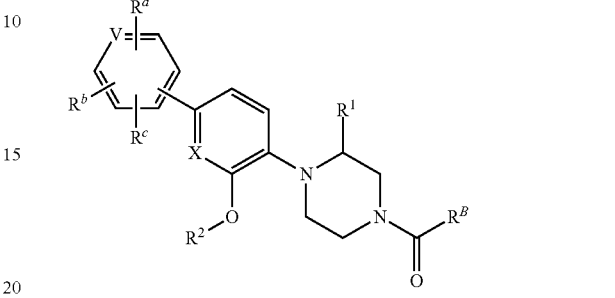

Formula (A2a)

wherein V is CH or N.

In some embodiments, the compound has the structure of Formula (A2b), or a pharmaceutically acceptable salt, or solvate thereof:

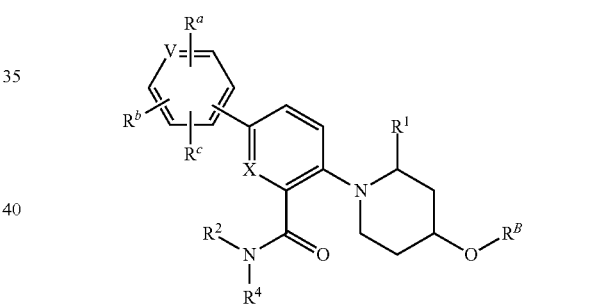

Formula (A2b)

wherein V is CH or N.

In some embodiments, the compound has the structure of Formula (II), or a pharmaceutically acceptable salt, or solvate thereof:

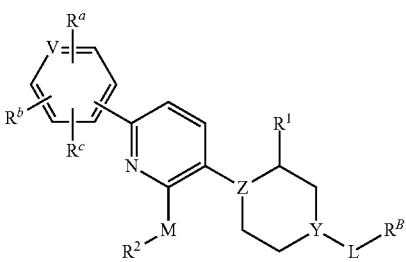

Formula (II)

wherein V is CH or N.

In some embodiments, the compound has the structure of Formula (IIa), or a pharmaceutically acceptable salt, or solvate thereof:

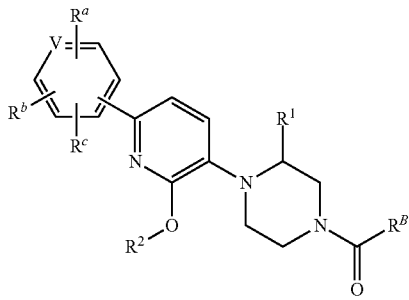

Formula (IIa)

wherein V is CH or N.

In some embodiments, the compound has the structure of Formula (IIb), or a pharmaceutically acceptable salt, or solvate thereof:

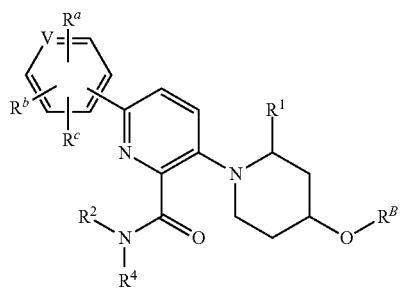

Formula (IIb)

wherein V is CH or N.

In some embodiments, the compound has the structure of Formula (IIc), or a pharmaceutically acceptable salt, or solvate thereof:

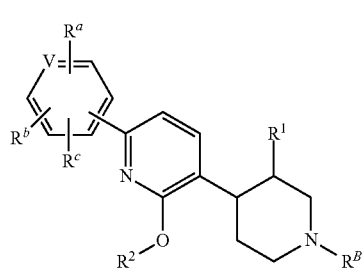

Formula (IIc)

wherein V is CH or N.

In some embodiments, the compound has the structure of Formula (IId), or a pharmaceutically acceptable salt, or solvate thereof:

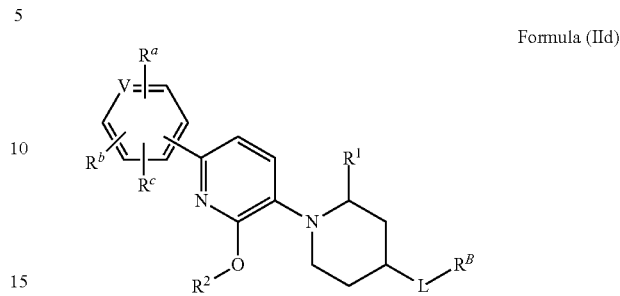

Formula (IId)

wherein V is CH or N; and
L is —O— or 5-membered heteroaryl.

In some embodiments, the compound has the structure of Formula (IIe), or a pharmaceutically acceptable salt, or solvate thereof:

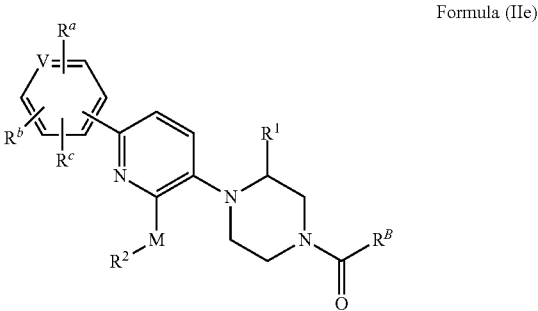

Formula (IIe)

wherein V is CH or N; and
M is —S—, —SO$_2$—, —S(=O)$_2$NR$^4$—, 5-membered heteroaryl, or a bond.

In some embodiments, the compound has the structure of Formula (IIf), or a pharmaceutically acceptable salt, or solvate thereof:

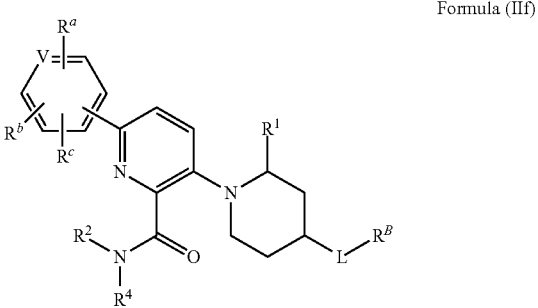

Formula (IIf)

wherein V is CH or N; and
L is —S— or —SO$_2$—.

In some embodiments, R$^B$ is an unsubstituted or substituted monocyclic carbocycle, unsubstituted or substituted bicyclic carbocycle, unsubstituted or substituted polycyclic carbocycle, unsubstituted or substituted monocyclic heterocycle, unsubstituted or substituted bicyclic heterocycle, unsubstituted or substituted polycyclic heterocycle, wherein if R$^B$ is substituted then R$^B$ is substituted with R$^d$, R$^e$ and R$^f$.

In some embodiments, $R^B$ is an unsubstituted or substituted monocyclic carbocycle, unsubstituted or substituted bridged carbocycle, unsubstituted or substituted spiro carbocycle, unsubstituted or substituted monocyclic heterocycle, unsubstituted or substituted bridged heterocycle, unsubstituted or substituted spiro heterocycle, wherein if $R^B$ is substituted then $R^B$ is substituted with $R^d$, $R^e$ and $R^f$.

In some embodiments, $R^B$ is an unsubstituted or substituted phenyl, unsubstituted or substituted naphthyl, unsubstituted or substituted monocyclic 6-membered heteroaryl, unsubstituted or substituted monocyclic 5-membered heteroaryl, unsubstituted or substituted bicyclic heteroaryl, monocyclic $C_3$-$C_8$cycloalkyl, unsubstituted or substituted bridged $C_5$-$C_{10}$cycloalkyl, unsubstituted or substituted spiro $C_5$-$C_{10}$cycloalkyl, unsubstituted or substituted monocyclic $C_2$-$C_8$heterocycloalkyl, unsubstituted or substituted bridged $C_5$-$C_{10}$heterocycloalkyl, or unsubstituted or substituted spiro $C_5$-$C_{10}$heterocycloalkyl, wherein if $R^B$ is substituted then $R^B$ is substituted with $R^d$, $R^e$ and $R^f$.

In some embodiments, $R^B$ is an unsubstituted or substituted carbocycle that is an unsubstituted or substituted phenyl, unsubstituted or substituted naphthyl, unsubstituted or substituted indanyl, unsubstituted or substituted indenyl, unsubstituted or substituted tetrahyodronaphthyl, unsubstituted or substituted cyclopropyl, unsubstituted or substituted cyclobutyl, unsubstituted or substituted cyclopentyl, unsubstituted or substituted cyclopentenyl, unsubstituted or substituted cyclohexyl, unsubstituted or substituted cyclohexenyl, unsubstituted or substituted cycloheptyl, unsubstituted or substituted cyclooctyl, unsubstituted or substituted spiro[2.2]pentyl, unsubstituted or substituted spiro[3.3]heptyl, unsubstituted or substituted spiro[3.5]nonyl, unsubstituted or substituted spiro[4.4]nonyl, unsubstituted or substituted spiro[4.5]decyl, unsubstituted or substituted norbornyl, unsubstituted or substituted norbornenyl, unsubstituted or substituted bicyclo[1.1.1]pentyl, unsubstituted or substituted adamantyl, or unsubstituted or substituted decalinyl.

In some embodiments, $R^B$ is an unsubstituted or substituted furanyl, unsubstituted or substituted thienyl, unsubstituted or substituted pyrrolyl, unsubstituted or substituted oxazolyl, unsubstituted or substituted thiazolyl, unsubstituted or substituted imidazolyl, unsubstituted or substituted pyrazolyl, unsubstituted or substituted triazolyl, unsubstituted or substituted tetrazolyl, unsubstituted or substituted isoxazolyl, unsubstituted or substituted isothiazolyl, unsubstituted or substituted oxadiazolyl, unsubstituted or substituted thiadiazolyl, unsubstituted or substituted pyridinyl, unsubstituted or substituted pyrimidinyl, unsubstituted or substituted pyrazinyl, unsubstituted or substituted pyridazinyl, unsubstituted or substituted triazinyl, unsubstituted or substituted quinolinyl, unsubstituted or substituted isoquinolinyl, unsubstituted or substituted cinnolinyl, unsubstituted or substituted phthalazinyl, unsubstituted or substituted quinazolinyl, unsubstituted or substituted quinoxalinyl, unsubstituted or substituted naphthyridinyl, unsubstituted or substituted pteridinyl, unsubstituted or substituted indolizinyl, unsubstituted or substituted azaindolizinyl, unsubstituted or substituted indolyl, unsubstituted or substituted azaindolyl, unsubstituted or substituted indazolyl, unsubstituted or substituted azaindazolyl, unsubstituted or substituted benzimidazolyl, unsubstituted or substituted azabenzimidazolyl, unsubstituted or substituted benzotriazolyl, unsubstituted or substituted azabenzotriazolyl, unsubstituted or substituted benzoxazolyl, unsubstituted or substituted azabenzoxazolyl, unsubstituted or substituted benzisoxazolyl, unsubstituted or substituted azabenzisoxazolyl, unsubstituted or substituted benzofuranyl, unsubstituted or substituted azabenzofuranyl, unsubstituted or substituted benzothienyl, unsubstituted or substituted azabenzothienyl, unsubstituted or substituted benzothiazolyl, unsubstituted or substituted azabenzothiazolyl, or unsubstituted or substituted purinyl. In some embodiments, $R^B$ is an unsubstituted or substituted indolyl, wherein if $R^B$ is substituted then $R^B$ is substituted with $R^d$, $R^e$ and R.

In some embodiments, $R^B$ is an unsubstituted or substituted aziridinyl, unsubstituted or substituted azetidinyl, unsubstituted or substituted oxetanyl, unsubstituted or substituted thietanyl, unsubstituted or substituted pyrrolidinyl, unsubstituted or substituted tetrahydrofuranyl, unsubstituted or substituted tetrahydrothienyl, unsubstituted or substituted oxazolidinonyl, unsubstituted or substituted tetrahydropyranyl, unsubstituted or substituted piperidinyl, unsubstituted or substituted morpholinyl, unsubstituted or substituted thiomorpholinyl, unsubstituted or substituted piperazinyl, unsubstituted or substituted homopiperidinyl, unsubstituted or substituted oxepanyl, unsubstituted or substituted thiepanyl, unsubstituted or substituted oxazepinyl, unsubstituted or substituted diazepinyl, unsubstituted or substituted thiazepinyl, unsubstituted or substituted azaspiro[3.3]heptanyl, unsubstituted or substituted azaspiro[3.4]octanyl, unsubstituted or substituted azaspiro[3.4]octanyl, or unsubstituted or substituted azaspiro[4.4]nonyl.

In some embodiments, $R^B$ is unsubstituted or substituted phenyl, unsubstituted or substituted pyridinyl, unsubstituted or substituted pyrimidinyl, unsubstituted or substituted pyrazinyl, or unsubstituted or substituted pyridazinyl, wherein if $R^B$ is substituted then $R^B$ is substituted with $R^d$, $R^e$ and $R^f$.

In some embodiments, $R^B$ is unsubstituted or substituted cyclopropyl, unsubstituted or substituted cyclobutyl, unsubstituted or substituted cyclopentyl, unsubstituted or substituted cyclopentenyl, or unsubstituted or substituted cyclohexyl, wherein if $R^B$ is substituted then $R^B$ is substituted with $R^d$, $R^e$ and $R^f$. In some embodiments, $R^B$ is unsubstituted or substituted cyclobutyl, wherein if $R^B$ is substituted then $R^B$ is substituted with $R^d$, $R^e$ and $R^f$.

In some embodiments, $R^B$ is an unsubstituted or substituted aziridinyl, unsubstituted or substituted azetidinyl, unsubstituted or substituted oxetanyl, unsubstituted or substituted thietanyl, unsubstituted or substituted pyrrolidinyl, unsubstituted or substituted tetrahydrofuranyl, unsubstituted or substituted tetrahydrothienyl, unsubstituted or substituted oxazolidinonyl, unsubstituted or substituted tetrahydropyranyl, unsubstituted or substituted piperidinyl, unsubstituted or substituted morpholinyl, unsubstituted or substituted thiomorpholinyl, or unsubstituted or substituted piperazinyl, wherein if $R^B$ is substituted then $R^B$ is substituted with $R^d$, $R^e$ and $R^f$. In some embodiments, $R^B$ is an unsubstituted or substituted aziridinyl, unsubstituted or substituted azetidinyl, unsubstituted or substituted pyrrolidinyl, unsubstituted or substituted piperidinyl, unsubstituted or substituted morpholinyl, unsubstituted or substituted thiomorpholinyl, or unsubstituted or substituted piperazinyl, wherein if $R^B$ is substituted then $R^B$ is substituted with $R^d$, $R^e$ and $R^f$. In some embodiments, $R^B$ is an unsubstituted or substituted pyrrolidinyl, wherein if $R^B$ is substituted then $R^B$ is substituted with $R^d$, $R^e$ and $R^f$.

In some embodiments, $R^B$ is

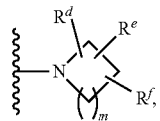

where m is 0, 1, 2, or 3. In some embodiments, m is 2 or 3. In some embodiments, m is 0. In some embodiments, m is 1. In some embodiments, m is 2. In some embodiments, m is 3.

In some embodiments, $R^B$ is unsubstituted or substituted phenyl, or unsubstituted or substituted pyridinyl, wherein if $R^B$ is substituted then $R^B$ is substituted with $R^d$, R and $R^f$.

In some embodiments, $R^B$ is

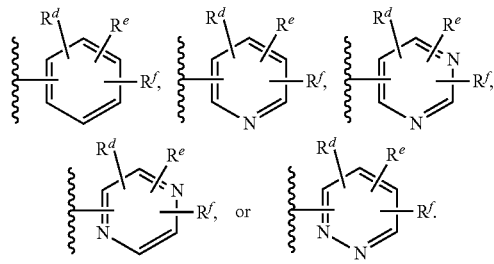

In some embodiments, $R^B$ is

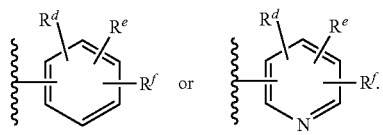

In some embodiments, $R^B$ is

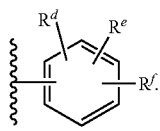

In some embodiments, $R^B$ is N

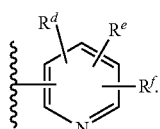

In some embodiments, $R^B$ is

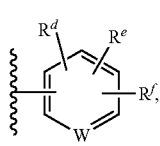

where W is CH or N. In some embodiments, $R^B$ is

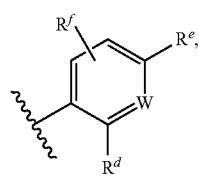

where W is CH or N.

In some embodiments, the compound has the structure of Formula (A3), or a pharmaceutically acceptable salt, or solvate thereof.

Formula (A3)

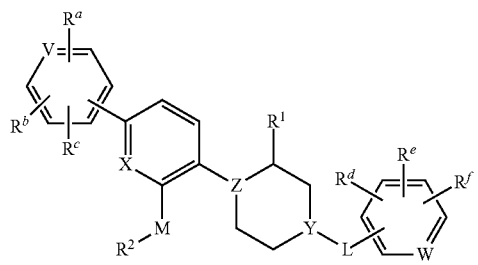

wherein V is CH or N; and W is CH or N.

In some embodiments, the compound has the structure of Formula (A3a), or a pharmaceutically acceptable salt, or solvate thereof:

Formula (A3a)

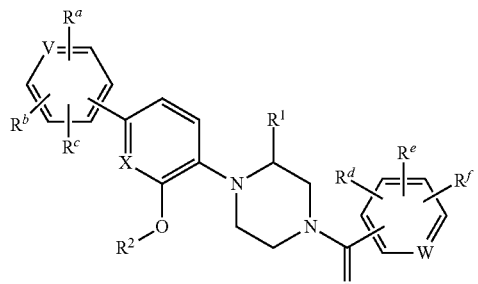

wherein V is CH or N; and W is CH or N.

In some embodiments, the compound has the structure of Formula (A3b), or a pharmaceutically acceptable salt, or solvate thereof:

Formula (A3b)

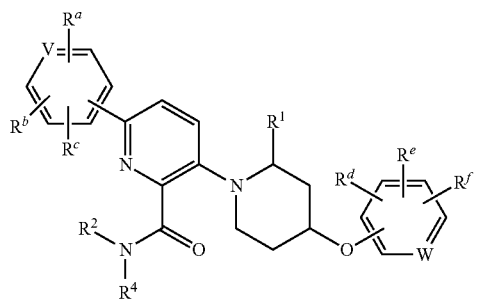

wherein V is CH or N; and W is CH or N.

In some embodiments, the compound has the structure of Formula (III), or a pharmaceutically acceptable salt, or solvate thereof:

Formula (III)

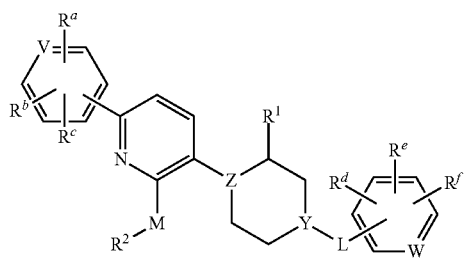

wherein V is CH or N; and W is CH or N.

In some embodiments, the compound has the structure of Formula (IIIa), or a pharmaceutically acceptable salt, or solvate thereof:

Formula (IIIa)

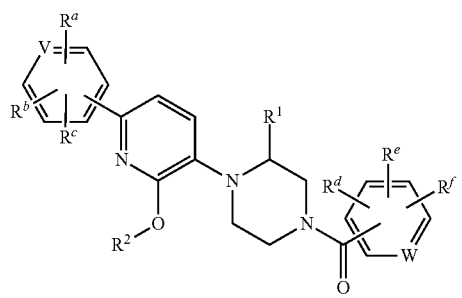

wherein V is CH or N; and W is CH or N.

In some embodiments, the compound has the structure of Formula (IIIb), or a pharmaceutically acceptable salt, or solvate thereof:

Formula (IIIb)

wherein V is CH or N; and W is CH or N.

In some embodiments, the compound has the structure of Formula (IIIc), or a pharmaceutically acceptable salt, or solvate thereof:

Formula (IIIc)

wherein V is CH or N; and W is CH or N.

In some embodiments, the compound has the structure of Formula (IIId), or a pharmaceutically acceptable salt, or solvate thereof:

Formula (IIId)

wherein V is CH or N; W is CH or N; and L is —O— or 5-membered heteroaryl.

In some embodiments, the compound has the structure of Formula (IIIe), or a pharmaceutically acceptable salt, or solvate thereof:

Formula (IIIe)

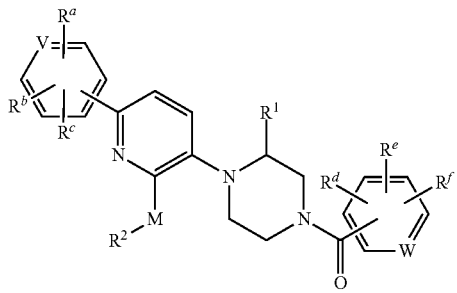

wherein V is CH or N; W is CH or N; and M is —S—, —SO$_2$—, —S(=O)$_2$NR$^4$—, 5-membered heteroaryl, or a bond.

In some embodiments, the compound has the structure of Formula (IIIf), or a pharmaceutically acceptable salt, or solvate thereof:

Formula (IIIf)

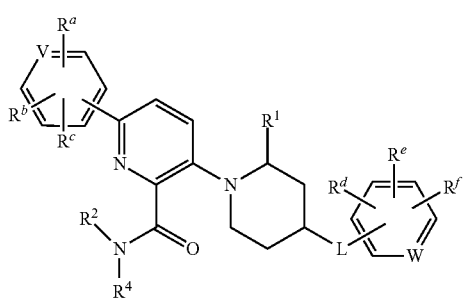

wherein V is CH or N; W is CH or N; and L is —S— or —SO$_2$—.

In some embodiments, the compound has the structure of Formula (A4), or a pharmaceutically acceptable salt, or solvate thereof:

Formula (A4)

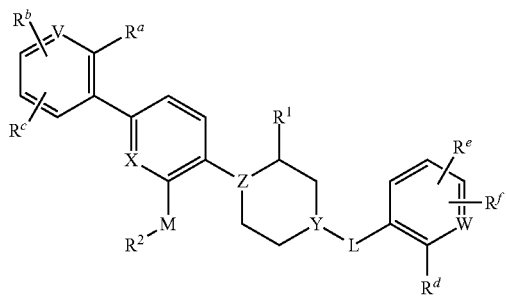

wherein V is CH or N; and W is CH or N.

In some embodiments, the compound has the structure of Formula (A4a), or a pharmaceutically acceptable salt, or solvate thereof:

Formula (A4a)

wherein V is CH or N; and W is CH or N.

In some embodiments, the compound has the structure of Formula (A4b), or a pharmaceutically acceptable salt, or solvate thereof:

Formula (A4b)

wherein V is CH or N; and W is CH or N.

In some embodiments, the compound has the structure of Formula (IV), or a pharmaceutically acceptable salt, or solvate thereof:

Formula (IV)

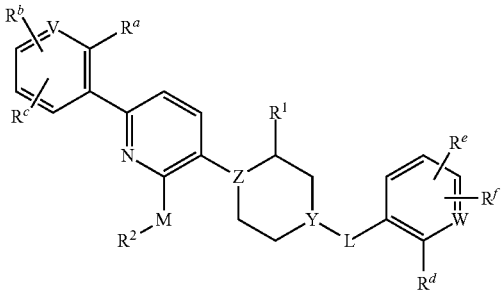

wherein V is CH or N; and W is CH or N.

In some embodiments, the compound has the structure of Formula (IVa), or a pharmaceutically acceptable salt, or solvate thereof:

Formula (IVa)

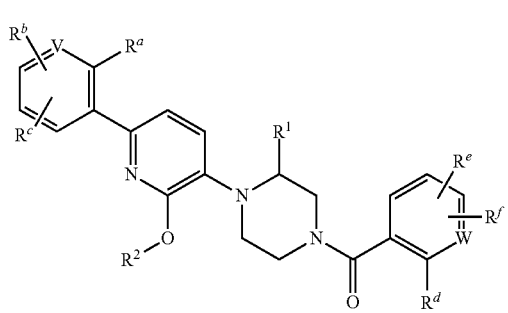

wherein V is CH or N; and W is CH or N.

In some embodiments, the compound has the structure of Formula (IVb), or a pharmaceutically acceptable salt, or solvate thereof:

Formula (IVb)

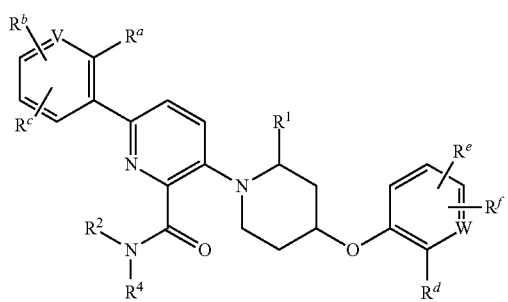

wherein V is CH or N; and W is CH or N.

In some embodiments, the compound has the structure of Formula (IVc), or a pharmaceutically acceptable salt, or solvate thereof:

Formula (IVc)

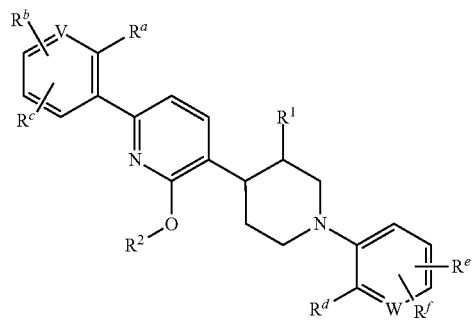

wherein V is CH or N; and W is CH or N.

In some embodiments, the compound has the structure of Formula (IVd), or a pharmaceutically acceptable salt, or solvate thereof:

Formula (IVd)

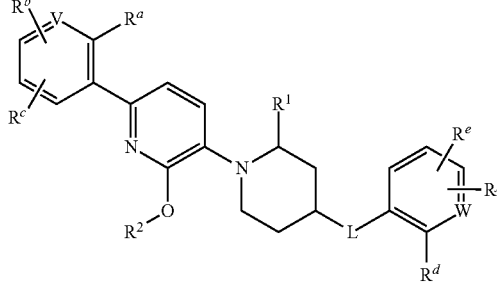

wherein V is CH or N; W is CH or N; and L is —O— or 5-membered heteroaryl.

In some embodiments, the compound has the structure of Formula (IVe), or a pharmaceutically acceptable salt, or solvate thereof:

Formula (IVe)

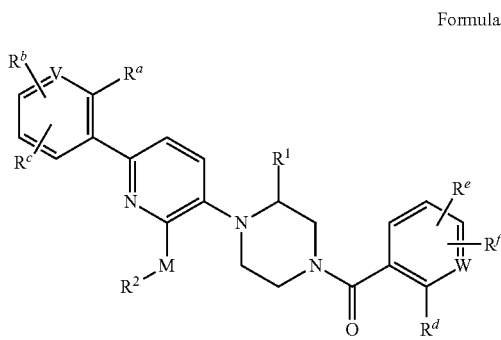

wherein V is CH or N; W is CH or N; and M is —S—, —$SO_2$—, —S(=O)$_2$NR$^4$—, 5-membered heteroaryl, or a bond.

In some embodiments, the compound has the structure of Formula (MI), or a pharmaceutically acceptable salt, or solvate thereof:

Formula (IVf)

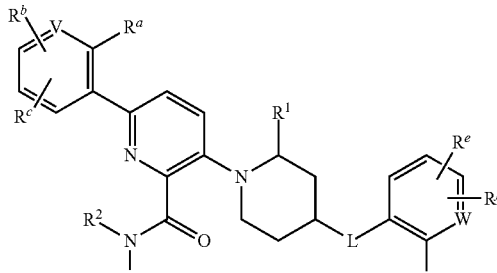

wherein V is CH or N; W is CH or N; and L is —S— or —$SO_2$—.

In some embodiments, the compound has the structure of Formula (A5), or a pharmaceutically acceptable salt, or solvate thereof:

Formula (A5)

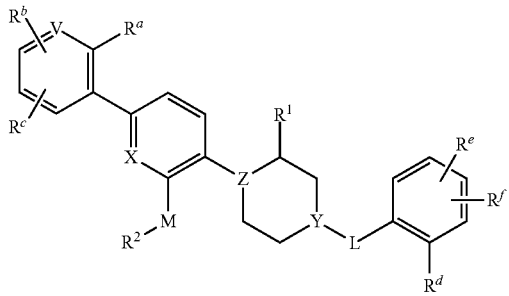

wherein V is CH or N.

In some embodiments, the compound has the structure of Formula (A5a), or a pharmaceutically acceptable salt, or solvate thereof:

Formula (A5a)

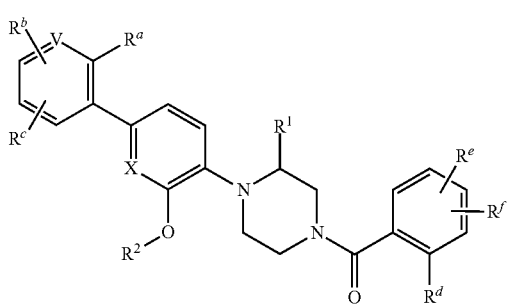

wherein V is CH or N.

In some embodiments, the compound has the structure of Formula (A5b), or a pharmaceutically acceptable salt, or solvate thereof:

Formula (A5b)

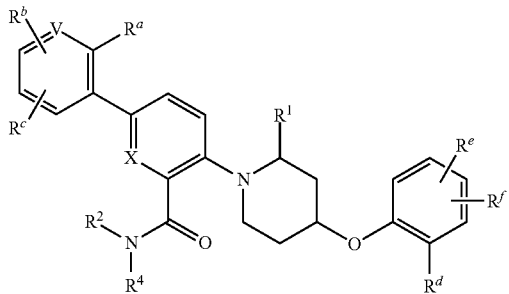

wherein V is CH or N.

In some embodiments, the compound has the structure of Formula (V), or a pharmaceutically acceptable salt, or solvate thereof:

Formula (V)

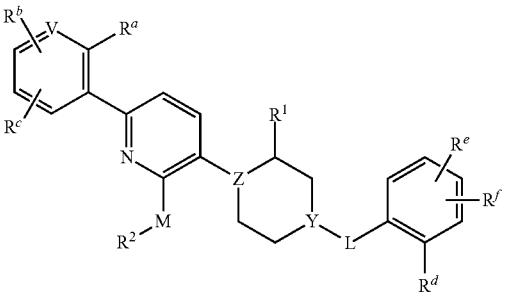

wherein V is CH or N.

In some embodiments, the compound has the structure of Formula (Va), or a pharmaceutically acceptable salt, or solvate thereof:

Formula (Va)

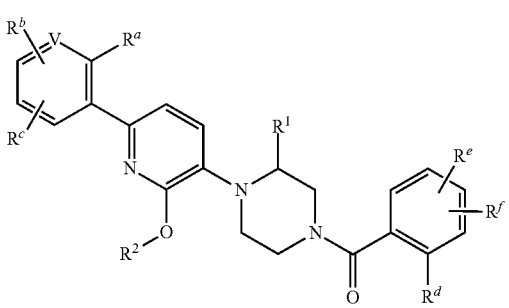

wherein V is CH or N.

In some embodiments, the compound has the structure of Formula (Vb), or a pharmaceutically acceptable salt, or solvate thereof:

Formula (Vb)

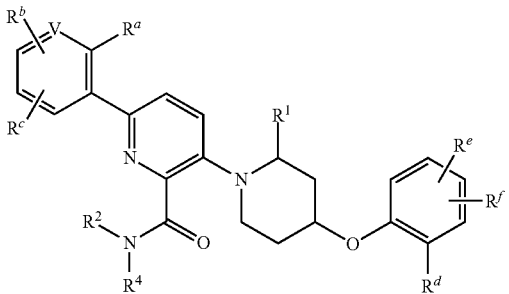

wherein V is CH or N.

In some embodiments, the compound has the structure of Formula (Vc), or a pharmaceutically acceptable salt, or solvate thereof:

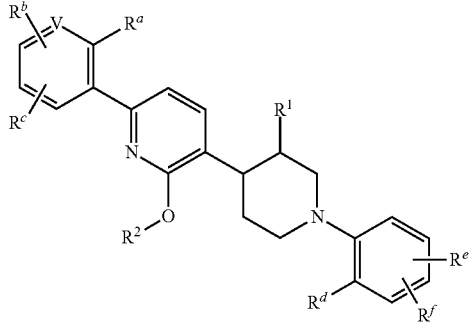

Formula (Vc)

wherein V is CH or N.

In some embodiments, the compound has the structure of Formula (Vd), or a pharmaceutically acceptable salt, or solvate thereof:

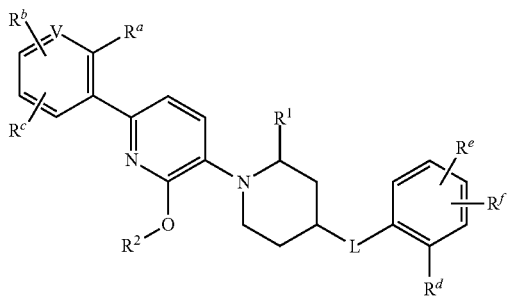

Formula (Vd)

wherein V is CH or N; and L is —O— or 5-membered heteroaryl.

In some embodiments, the compound has the structure of Formula (Ve), or a pharmaceutically acceptable salt, or solvate thereof:

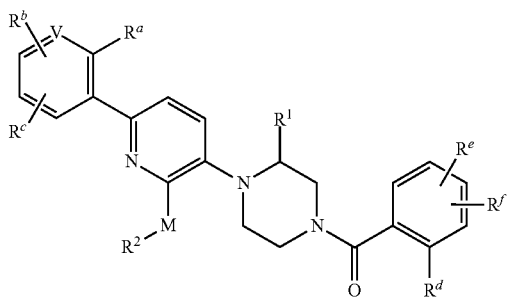

Formula (Ve)

wherein V is CH or N; and M is —S—, —SO$_2$—, —S(=O)$_2$NR$^4$—, 5-membered heteroaryl, or a bond.

In some embodiments, the compound has the structure of Formula (Vf), or a pharmaceutically acceptable salt, or solvate thereof:

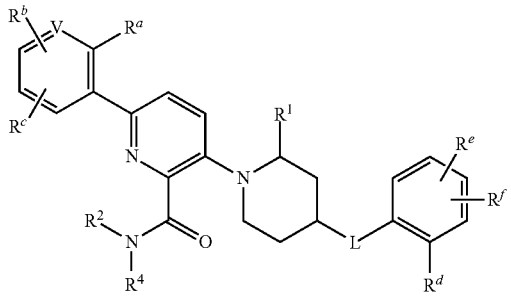

Formula (Vf)

wherein V is CH or N; and L is —S— or —SO$_2$—.

In some embodiments, R$^1$ is —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)(CH$_2$CH$_3$), —C(CH$_3$)$_3$, —CH$_2$OH, —CH$_2$CN, —CH$_2$F, —CHF$_2$, —CF$_3$, —CH$_2$CH$_2$OH, —CH$_2$CH$_2$CN, —CH$_2$CH$_2$F, —CH$_2$CHF$_2$, —CH$_2$CF$_3$, —CH$_2$OCH$_3$, —CH$_2$CH$_2$OCH$_3$, —CH$_2$NH$_2$, —CH$_2$NHCH$_3$, —CH$_2$N(CH$_3$)$_2$, —CH$_2$CH$_2$NH$_2$, —CH$_2$CH$_2$NHCH$_3$, —CH$_2$CH$_2$N(CH$_3$)$_2$, cyclopropyl, cyclobutyl, cyclopentyl, or cyclohexyl. In some embodiments, R$^1$ is —CH$_3$, —CH$_2$CH$_3$, or —CH$_2$CH$_2$CH$_3$.

In some embodiments, R$^4$ is hydrogen or C$_1$-C$_6$ alkyl. In some embodiments, R$^4$ is R$^4$ is hydrogen, —CH$_3$, —CH$_2$CH$_3$, or —CH$_2$CH$_2$CH$_3$. In some embodiments, R$^4$ is hydrogen. In some embodiments, R$^4$ is —CH$_3$.

In some embodiments, R$^2$ is unsubstituted or substituted C$_1$-C$_6$ alkyl, unsubstituted or substituted monocyclic carbocycle, unsubstituted or substituted bridged carbocycle, unsubstituted or substituted spirocyclic carbocycle, unsubstituted or substituted monocyclic heterocycle, unsubstituted or substituted bridged heterocycle, unsubstituted or substituted spirocyclic heterocycle, unsubstituted or substituted —(C$_1$-C$_6$ alkyl)-carbocycle, or unsubstituted or substituted —(C$_1$-C$_6$ alkyl)-heterocycle, wherein any substituted group of R$^2$ is substituted with one or more halogen, unsubstituted or substituted C$_1$-C$_6$ alkyl, unsubstituted or substituted monocyclic heterocycle, —N(R$^5$)$_2$, —OR$^6$, —CN, —CO$_2$R$^6$, —C(=O)N(R$^5$)$_2$, —SR$^6$, —S(=O)R$^8$, —S(=O)$_2$R$^8$, —NR$^5$C(=O)R$^6$, —NR$^5$SO$_2$R$^8$, —SO$_2$R$^8$, or —SO$_2$N(R$^5$)$_2$.

In some embodiments, R$^2$ is unsubstituted or substituted C$_1$-C$_6$ alkyl, unsubstituted or substituted monocyclic carbocycle, or unsubstituted or substituted monocyclic 4-, 5- or 6-membered heterocycle containing 1-4 N atoms and 0 or 1 O or S atoms, wherein any substituted group of R$^2$ is substituted with one or more halogen, unsubstituted or substituted C$_1$-C$_6$ alkyl, unsubstituted or substituted monocyclic heterocycle, —N(R$^5$)$_2$, —OR$^6$, —CN, —CO$_2$R$^6$, —C(=O)N(R$^5$)$_2$, —SR$^6$, —S(=O)R$^8$, —S(=O)$_2$R$^8$, —NR$^5$C(=O)R$^6$, —NR$^5$SO$_2$R$^8$, —SO$_2$R$^8$, or —SO$_2$N(R$^5$)$_2$.

In some embodiments, R$^2$ comprises a basic amine group.

In some embodiments, R$^2$ is substituted C$_1$-C$_6$ alkyl, unsubstituted or substituted monocyclic 4-, 5- or 6-membered heterocycle containing 1-4 N atoms and 0 or 1 O or S atoms, unsubstituted or substituted bridged heterocycle, or unsubstituted or substituted —(C$_1$-C$_6$ alkyl)-heterocycle, wherein any substituted group of R$^2$ is substituted with one or more halogen, unsubstituted or substituted $C_1$-$C_6$ alkyl, unsubstituted or substituted monocyclic heterocycle, —$N(R^5)_2$, —$OR^6$, —CN, —$CO_2R^6$, —$C(=O)N(R^5)_2$, —$SR^6$, —$S(=O)R^8$, —$S(=O)_2R^8$, —$NR^5C(=O)R^6$, —$NR^5SO_2R^8$, —$SO_2R^8$, or —$SO_2N(R^5)_2$; wherein $R^2$ comprises a basic amine group.

In some embodiments, $R^2$ is $C_1$-$C_6$ alkyl substituted by one —$N(R^5)_2$ group and is further substituted by zero or more halogen, unsubstituted or substituted $C_1$-$C_6$ alkyl, unsubstituted or substituted monocyclic heterocycle, —$N(R^5)_2$, —$OR^6$, —CN, —$CO_2R^6$, —$C(=O)N(R^5)_2$, —$SR^6$, —$S(=O)R^8$, —$S(=O)_2R^8$, —$NR^5C(=O)R^6$, —$NR^5SO_2R^8$, —$SO_2R^8$, or —$SO_2N(R^5)_2$; or $R^2$ is unsubstituted or substituted monocyclic 4-, 5- or 6-membered heterocycle containing 1-4 N atoms and 0 or 1 O or S atoms; or $R^2$ is unsubstituted or substituted bridged heterocycle containing 1-4 N atoms and 0 or 1 O or S atoms; or $R^2$ is —($C_1$-$C_6$ alkyl)-heterocycle, wherein the heterocycle is an unsubstituted or substituted monocyclic 4-, 5- or 6-membered heterocycle containing 1-4 N atoms and 0 or 1 O or S atoms.

In some embodiments, $R^2$ is $C_1$-$C_6$ alkyl substituted by a —$N(R^5)_2$ group; or $R^2$ is unsubstituted or substituted monocyclic 4-, 5- or 6-membered heterocycle containing 1-4 N atoms and 0 or 1 O or S atoms; or $R^2$ is —($C_1$-$C_6$ alkyl)-heterocycle, wherein the heterocycle is an unsubstituted or substituted monocyclic 4-, 5- or 6-membered heterocycle containing 1-4 N atoms and 0 or 1 O or S atoms.

In some embodiments, $R^2$ is unsubstituted or substituted $C_1$-$C_6$ alkyl. In some embodiments, $R^2$ is substituted $C_1$-$C_6$ alkyl. In some embodiments, $R^2$ is $C_1$-$C_6$ alkyl substituted by one —$N(R^5)_2$ group and is further substituted by zero or more halogen, unsubstituted or substituted $C_1$-$C_6$ alkyl, unsubstituted or substituted monocyclic heterocycle, —$N(R^5)_2$, —$OR^6$, —CN, —$CO_2R^6$, —$C(=O)N(R^5)_2$, —$SR^6$, —$S(=O)R^8$, —$S(=O)_2R^8$, —$NR^5C(=O)R^6$, —$NR^5SO_2R^8$, —$SO_2R^8$, or —$SO_2N(R^5)_2$. In some embodiments, $R^2$ is $C_1$-$C_6$ alkyl substituted by a —$N(R^5)_2$ group.

In some embodiments, $R^2$ is unsubstituted or substituted monocyclic heterocycle, unsubstituted or substituted bridged heterocycle, or unsubstituted or substituted spirocyclic heterocycle. In some embodiments, $R^2$ is unsubstituted or substituted monocyclic heterocycle. In some embodiments, $R^2$ is unsubstituted or substituted monocyclic 4-, 5- or 6-membered heterocycle containing 1-4 N atoms and 0 or 1 O or S atoms. In some embodiments, $R^2$ is unsubstituted or substituted bridged heterocycle. In some embodiments, $R^2$ is unsubstituted or substituted bridged heterocycle containing 1-4 N atoms and 0 or 1 O or S atoms. In some embodiments, $R^2$ is unsubstituted or substituted spirocyclic heterocycle.

In some embodiments, $R^2$ is unsubstituted or substituted —($C_1$-$C_6$ alkyl)-heterocycle. In some embodiments, $R^2$ is —($C_1$-$C_6$ alkyl)-heterocycle, wherein the heterocycle is an unsubstituted or substituted monocyclic 4-, 5- or 6-membered heterocycle containing 1-4 N atoms and 0 or 1 O or S atoms.

In some embodiments, $R^2$ is hydrogen.

In some embodiments, the compound has the structure of Formula (A6), or a pharmaceutically acceptable salt, or solvate thereof:

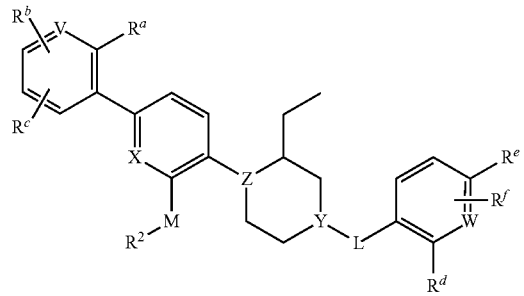

Formula (A6)

wherein V is CH or N; and W is CH or N.

In some embodiments, the compound has the structure of Formula (A6a), or a pharmaceutically acceptable salt, or solvate thereof:

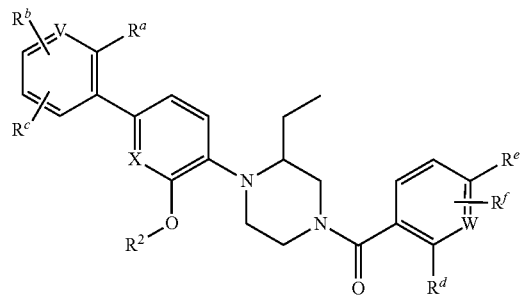

Formula (A6a)

wherein V is CH or N; and W is CH or N.

In some embodiments, the compound has the structure of Formula (A6b), or a pharmaceutically acceptable salt, or solvate thereof:

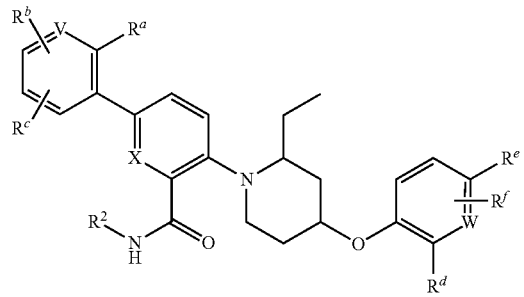

Formula (A6b)

wherein V is CH or N; and W is CH or N.

In some embodiments, the compound has the structure of Formula (VI), or a pharmaceutically acceptable salt, or solvate thereof:

Formula (VI)

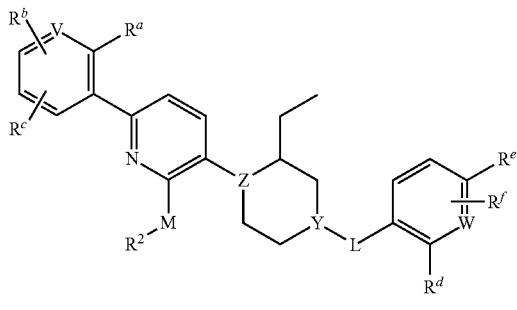

wherein V is CH or N; and W is CH or N.

In some embodiments, the compound has the structure of Formula (VIa), or a pharmaceutically acceptable salt, or solvate thereof:

Formula (VIa)

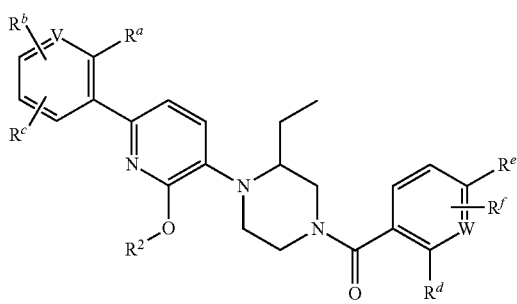

wherein V is CH or N; and W is CH or N.

In some embodiments, the compound has the structure of Formula (VIb), or a pharmaceutically acceptable salt, or solvate thereof:

Formula (VIb)

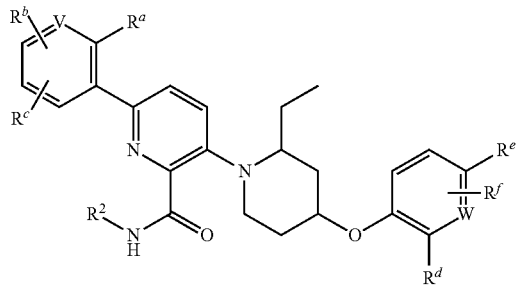

wherein V is CH or N; and W is CH or N.

In some embodiments, the compound has the structure of Formula (VIc), or a pharmaceutically acceptable salt, or solvate thereof:

Formula (VIc)

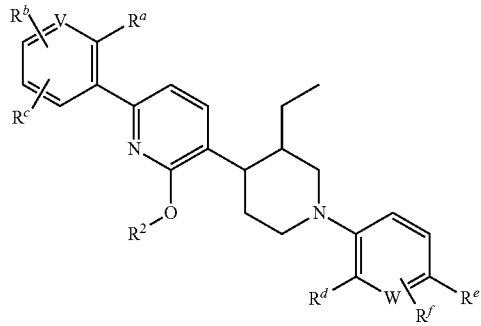

wherein V is CH or N; and W is CH or N.

In some embodiments, the compound has the structure of Formula (VId), or a pharmaceutically acceptable salt, or solvate thereof:

Formula (VId)

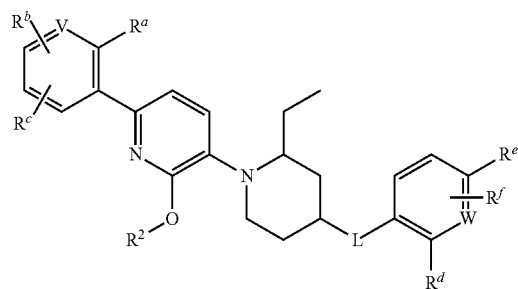

wherein V is CH or N; W is CH or N; and L is —O— or 5-membered heteroaryl.

In some embodiments, the compound has the structure of Formula (VIe), or a pharmaceutically acceptable salt, or solvate thereof:

Formula (VIe)

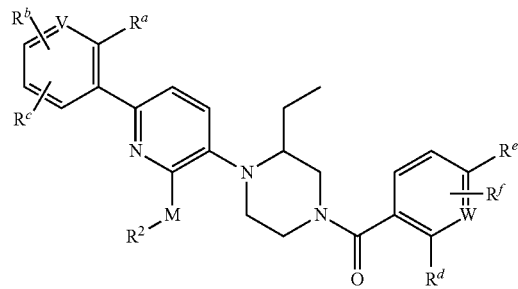

wherein V is CH or N; W is CH or N; and M is —S—, —SO$_2$—, —S(═O)$_2$NR$^4$—, 5-membered heteroaryl, or a bond.

In some embodiments, the compound has the structure of Formula (VIf), or a pharmaceutically acceptable salt, or solvate thereof:

Formula (VIf)

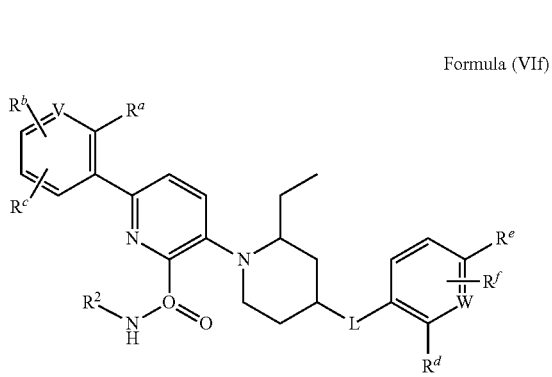

wherein V is CH or N; W is CH or N; and L is —S— or —SO$_2$—.

In some embodiments, the compound has the structure of Formula (VII), or a pharmaceutically acceptable salt, or solvate thereof:

Formula (VII)

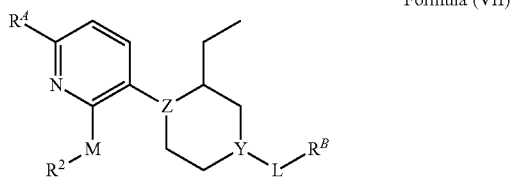

wherein:
R$^A$ is unsubstituted or substituted phenyl, or unsubstituted or substituted pyridinyl, wherein if R$^A$ is substituted then R$^A$ is substituted with R$^a$, R$^b$ and R$^c$;
L is —C(=O)—; M is —O—; Y is N; and Z is N; or
L is —O—; M is —C(=O)NR$^4$—; Y is CH; and Z is N; and
R$^B$ is unsubstituted or substituted carbocycle or unsubstituted or substituted heterocycle, wherein if R$^B$ is substituted then R$^B$ is substituted with R$^d$, R$^e$ and R$^f$.

In some embodiments, the compound has the structure of Formula (VIIa), or a pharmaceutically acceptable salt, or solvate thereof:

Formula (VIIa)

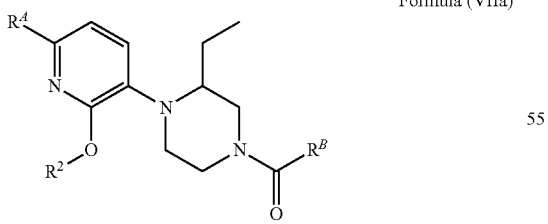

wherein:
R$^A$ is unsubstituted or substituted phenyl, or unsubstituted or substituted pyridinyl, wherein if R$^A$ is substituted then R$^A$ is substituted with R$^a$, R$^b$ and R$^c$; and
R$^B$ is unsubstituted or substituted carbocycle or unsubstituted or substituted heterocycle, wherein if R$^B$ is substituted then R$^B$ is substituted with R$^d$, R$^e$ and R$^f$.

In some embodiments, the compound has the structure of Formula (VIIb), or a pharmaceutically acceptable salt, or solvate thereof:

Formula (VIIb)

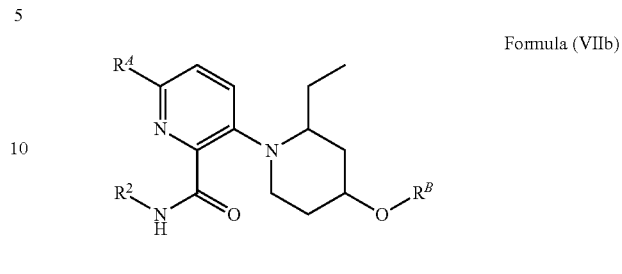

wherein:
R$^A$ is unsubstituted or substituted phenyl, or unsubstituted or substituted pyridinyl, wherein if R$^A$ is substituted then R$^A$ is substituted with R$^a$, R$^b$ and R$^c$; and
R$^B$ is unsubstituted or substituted carbocycle or unsubstituted or substituted heterocycle, wherein if R$^B$ is substituted then R$^B$ is substituted with R$^d$, R$^e$ and R$^f$.

In some embodiments, R$^A$ is

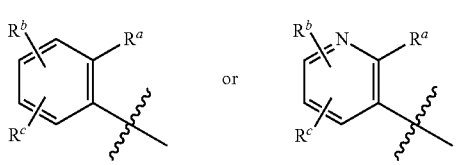

In some embodiments, R$^A$ is

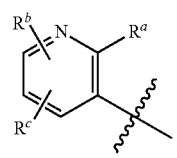

In some embodiments, R$^A$ is

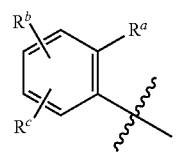

In some embodiments, R$^a$ is selected from the group consisting of hydrogen, halogen, —OR$^6$, —CN, —N(R$^5$)$_2$, unsubstituted or substituted C$_1$-C$_6$ alkyl, unsubstituted or substituted C$_1$-C$_6$ fluoroalkyl, unsubstituted or substituted C$_1$-C$_6$ heteroalkyl, and unsubstituted or substituted C$_3$-C$_6$ cycloalkyl, wherein any substituted group of R$^a$ is substituted with one or more R$^7$ groups; and R$^b$ and R$^c$ are independently selected from the group consisting of hydrogen, halogen, —OR$^6$, —CN, —N(R$^5$)$_2$, unsubstituted or substituted C$_1$-C$_6$ alkyl, unsubstituted or substituted C$_1$-C$_6$ fluoroalkyl, and unsubstituted or substituted C$_1$-C$_6$ heteroalkyl, wherein any substituted group of R$^b$ and R$^c$ is substituted with one or more R$^7$ groups.

In some embodiments, R$^a$ is selected from the group consisting of hydrogen, Cl, Br, —CN, —OH, —OCH$_3$, —OCH₂CH₃, —CH₃, —CH₂CH₃, —CH₂CH₂CH₃, —CH(CH₃)₂, —CH₂CH₂CH₂CH₃, —CH₂CH(CH₃)₂, —CH(CH₃)(CH₂CH₃), —C(CH₃)₃, —CH₂OH, —CH₂CN, —CH₂F, —CHF₂, —CF₃, —CH₂CH₂OH, —CH₂CH₂CN, —CH₂CH₂F, —CH₂CHF₂, —CH₂CF₃, —CH₂OCH₃, —CH₂CH₂OCH₃, —CH₂NH₂, —CH₂NHCH₃, —CH₂N(CH₃)₂, —CH₂CH₂NH₂, —CH₂CH₂NHCH₃, —CH₂CH₂N(CH₃)₂, cyclopropyl, cyclobutyl, cyclopentyl, and cyclohexyl; and $R^b$ and $R^c$ are independently selected from the group consisting of hydrogen, Cl, Br, —CN, —OH, —OCH₃, —OCH₂CH₃, —CH₃, —CH₂CH₃, —CH₂CH₂CH₃, —CH(CH₃)₂, —CH₂CH₂CH₂CH₃, —CH₂CH(CH₃)₂, —CH(CH₃)(CH₂CH₃), —C(CH₃)₃, —CH₂OH, —CH₂CN, —CH₂F, —CHF₂, —CF₃, —CH₂CH₂OH, —CH₂CH₂CN, —CH₂CH₂F, —CH₂CHF₂, —CH₂CF₃, —CH₂OCH₃, —CH₂CH₂OCH₃, —CH₂NH₂, —CH₂NHCH₃, —CH₂N(CH₃)₂, —CH₂CH₂NH₂, —CH₂CH₂NHCH₃, and —CH₂CH₂N(CH₃)₂.

In some embodiments, $R^d$ is selected from the group consisting of hydrogen, halogen, —OR⁶, —CN, —N(R⁵)₂, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, unsubstituted or substituted $C_2$-$C_7$ heterocycloalkyl, unsubstituted or substituted phenyl, and unsubstituted or substituted monocyclic heteroaryl, wherein any substituted group of $R^d$ is substituted with one or more $R^7$ groups; and $R^e$ and $R^f$ are independently selected from the group consisting of hydrogen, halogen, —OR⁶, —CN, —N(R⁵)₂, unsubstituted or substituted $C_1$-$C_6$ alkyl, unsubstituted or substituted $C_1$-$C_6$ fluoroalkyl, and unsubstituted or substituted $C_1$-$C_6$ heteroalkyl.

In some embodiments, $R^d$ is selected from the group consisting of hydrogen, Cl, Br, —CN, —OH, —OCH₃, —OCH₂CH₃, —CH₃, —CH₂CH₃, —CH₂CH₂CH₃, —CH(CH₃)₂, —CH₂CH₂CH₂CH₃, —CH₂CH(CH₃)₂, —CH(CH₃)(CH₂CH₃), —C(CH₃)₃, —CH₂OH, —CH₂CN, —CH₂F, —CHF₂, —CF₃, —CH₂CH₂OH, —CH₂CH₂CN, —CH₂CH₂F, —CH₂CHF₂, —CH₂CF₃, —CH₂OCH₃, —CH₂CH₂OCH₃, —CH₂NH₂, —CH₂NHCH₃, —CH₂N(CH₃)₂, —CH₂CH₂NH₂, —CH₂CH₂NHCH₃, —CH₂CH₂N(CH₃)₂, unsubstituted or substituted cyclopropyl, unsubstituted or substituted cyclobutyl, unsubstituted or substituted cyclopentyl, unsubstituted or substituted cyclohexyl, unsubstituted or substituted $C_2$-$C_7$ heterocycloalkyl, unsubstituted or substituted phenyl, and unsubstituted or substituted monocyclic heteroaryl, wherein any substituted group of $R^d$ is substituted with one or more $R^7$ groups; and $R^e$ and $R^f$ are independently selected from the group consisting of F, Cl, Br, —CH₃, —CH₂CH₃, —CH₂CH₂CH₃, —CH(CH₃)₂, —CH₂CH₂CH₂CH₃, —CH₂CH(CH₃)₂, —CH(CH₃)(CH₂CH₃), —C(CH₃)₃, —CH₂OH, —CH₂CN, —CH₂F, —CHF₂, —CF₃, —CN, —OH, —OCH₃, and —OCH₂CH₃.

In some embodiments, compounds described herein have the following structure:

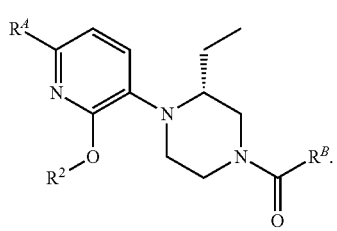

In some embodiments, $R^A$, $R^B$, and $R^2$ are as described herein.

In some embodiments, $R^A$, $R^B$, and $R^2$ are as described in Table 1.

In some embodiments, compounds described herein have the following structure:

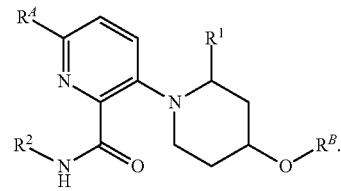

In some embodiments, $R^A$, $R^B$, $R^1$, and $R^2$ are as described herein.

In some embodiments, $R^A$, $R^B$, $R^1$, and $R^2$ are as described in Table 2.

In some embodiments, compounds described herein have the following structure:

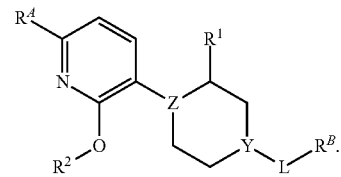

In some embodiments, $R^A$, $R^B$, $R^1$, $R^2$, Z, Y, and L are as described herein.

In some embodiments, $R^A$, $R^B$, $R^1$, $R^2$, Z, Y, and L are as described in Table 3.

In some embodiments, compounds described herein have the following structure:

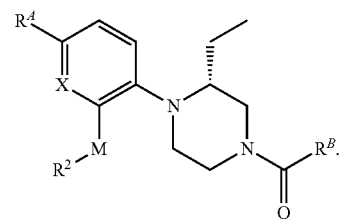

In some embodiments, $R^A$, $R^B$, $R^2$, X, and M are as described herein.

In some embodiments, $R^A$, $R^B$, $R^2$, X, and M are as described in Table 4.

In some embodiments, compounds described herein have the following structure:

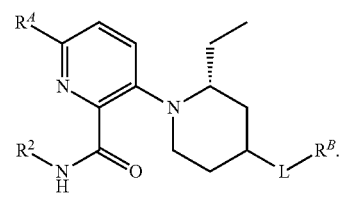

In some embodiments, $R^A$, $R^B$, $R^2$, and L are as described herein.

In some embodiments, $R^A$, $R^B$, $R^2$, and L are as described in Table 5.

Any combination of the groups described above for the various variables is contemplated herein. Throughout the specification, groups and substituents thereof are chosen by one skilled in the field to provide stable moieties and compounds.

Exemplary compounds of Formula (A) or Formula (I) include the compounds described in the following Tables:

TABLE 1

| Cpd No. | $R^A$ | $R^B$ | $R^2$ |
|---|---|---|---|
| 1-2 | 2-ethoxypyridin-3-yl | 4-chloro-2-(trifluoromethyl)phenyl | (3S)-1-methylpyrrolidin-3-yl |
| 1-3 | 2-ethoxypyridin-3-yl | 1-(trifluoromethyl)cyclopentyl | (3S)-1-methylpyrrolidin-3-yl |
| 1-4 | 2-ethoxypyridin-3-yl | (2S)-2-(trifluoromethyl)pyrrolidin-1-yl | (3S)-1-methylpyrrolidin-3-yl |
| 1-5 | 2-ethoxypyridin-3-yl | 6-ethoxy-2-(trifluoromethyl)pyridin-3-yl | (3S)-pyrrolidin-3-yl |
| 1-6 | 2-ethoxypyridin-3-yl | 2-(difluoromethyl)-4-fluorophenyl | (3S)-pyrrolidin-3-yl |
| 1-7 | 2-ethoxypyridin-3-yl | 4-chloro-2-(trifluoromethyl)phenyl | (3S)-pyrrolidin-3-yl |
| 1-8 | 2-ethoxypyridin-3-yl | (2S)-2-(trifluoromethyl)pyrrolidin-1-yl | (3S)-pyrrolidin-3-yl |

TABLE 1-continued

| Cpd No. | R^A | R^B | R^2 |
|---|---|---|---|
| 1-9 | 2-ethoxypyridin-3-yl | 6-ethoxy-2-(trifluoromethyl)pyridin-3-yl | -NHCH3 (methylaminoalkyl) |
| 1-10 | 2-ethoxypyridin-3-yl | 4-fluoro-2-(difluoromethyl)phenyl | -NHCH3 |
| 1-11 | 2-ethoxypyridin-3-yl | (2S)-2-(trifluoromethyl)pyrrolidin-1-yl | -NHCH3 |
| 1-12 | 2-ethoxypyridin-3-yl | 6-ethoxy-2-(trifluoromethyl)pyridin-3-yl | -NH2 |
| 1-13 | 2-ethoxypyridin-3-yl | 4-fluoro-2-(difluoromethyl)phenyl | -NH2 |
| 1-14 | 2-ethoxypyridin-3-yl | (2S)-2-(trifluoromethyl)pyrrolidin-1-yl | -NH2 |
| 1-15 | 2-ethoxypyridin-3-yl | 4-chloro-2-(trifluoromethyl)phenyl | -NHCH3 |
| 1-16 | 2-ethoxypyridin-3-yl | 4-chloro-2-(trifluoromethyl)phenyl | -NH2 |

TABLE 1-continued

| Cpd No. | $R^A$ | $R^B$ | $R^2$ |
|---|---|---|---|
| 1-17 | 2-ethoxypyridin-3-yl | 6-ethoxy-2-(trifluoromethyl)pyridin-3-yl | N,N-dimethylaminopropyl |
| 1-18 | 2-ethoxypyridin-3-yl | 6-ethoxy-2-(trifluoromethyl)pyridin-3-yl | pyrrolidin-3-yl |
| 1-19 | 2-ethoxypyridin-3-yl | 6-ethoxy-2-(trifluoromethyl)pyridin-3-yl | (R)-2-aminopropyl |
| 1-20 | 2-ethoxypyridin-3-yl | 6-ethoxy-2-(trifluoromethyl)pyridin-3-yl | (S)-2-aminopropyl |
| 1-21 | 2-ethoxypyridin-3-yl | 6-ethoxy-2-(trifluoromethyl)pyridin-3-yl | (R)-2-aminopropyl (alt. stereo) |
| 1-22 | 2-ethoxypyridin-3-yl | 6-ethoxy-2-(trifluoromethyl)pyridin-3-yl | (S)-2-aminopropyl (alt. stereo) |
| 1-23 | 2-ethoxypyridin-3-yl | 7-cyano-2,3-dihydro-1H-indol-1-yl | N-methylaminopropyl |
| 1-24 | 2-ethoxypyridin-3-yl | 7-cyano-2,3-dihydro-1H-indol-1-yl | 3-aminopropyl |

TABLE 1-continued

| Cpd No. | R^A | R^B | R^2 |
|---|---|---|---|
| 1-25 | 2-ethoxypyridin-3-yl | 5-chloro-7-cyano-2,3-dihydro-1H-indol-1-yl | H2N-CH2CH2- |
| 1-26 | 2-ethoxypyridin-3-yl | 5-chloro-7-cyano-2,3-dihydro-1H-indol-1-yl | CH3NH-CH2CH2- |
| 1-27 | 2-ethoxypyridin-3-yl | 4-fluoro-2-(trifluoromethyl)phenyl | CH3NH-CH2CH2- |
| 1-28 | 2-ethoxypyridin-3-yl | 2,4-dichlorophenyl | CH3NH-CH2CH2- |
| 1-29 | 2-ethoxypyridin-3-yl | 2-chloro-4-fluorophenyl | CH3NH-CH2CH2- |
| 1-30 | 2-ethoxypyridin-3-yl | 6-methoxy-2-(trifluoromethyl)pyridin-3-yl | CH3NH-CH2CH2- |

Compounds in Table 1 are named:

1-2: 5-[(2R)-4-[4-chloro-2-(trifluoromethyl)benzoyl]-2-ethylpiperazin-1-yl]-2'-ethoxy-6-{[(3R)-1-methylpyrrolidin-3-yl]oxy}-2,3'-bipyridine;

1-3: 2'-ethoxy-5-[(2R)-2-ethyl-4-[1-(trifluoromethyl)cyclopentanecarbonyl]piperazin-1-yl]-6-{[(3R)-1-methylpyrrolidin-3-yl]oxy}-2,3'-bipyridine;

1-4: 2'-ethoxy-5-[(2R)-2-ethyl-4-[(2S)-2-(trifluoromethyl)pyrrolidine-1-carbonyl]piperazin-1-yl]-6-{[(3R)-1-methylpyrrolidin-3-yl]oxy}-2,3'-bipyridine;

1-5: 2'-ethoxy-5-[(2R)-4-[6-ethoxy-2-(trifluoromethyl)pyridine-3-carbonyl]-2-ethylpiperazin-1-yl]-6-[(3R)-pyrrolidin-3-yloxy]-2,3'-bipyridine;

1-6: 5-[(2R)-4-[2-(difluoromethyl)-4-fluorobenzoyl]-2-ethylpiperazin-1-yl]-2'-ethoxy-6-[(3R)-pyrrolidin-3-yloxy]-2,3'-bipyridine;

1-7: 5-[(2R)-4-[4-chloro-2-(trifluoromethyl)benzoyl]-2-ethylpiperazin-1-yl]-2'-ethoxy-6-[(3R)-pyrrolidin-3-yloxy]-2,3'-bipyridine;

1-8: 2'-ethoxy-5-[(2R)-2-ethyl-4-[(2S)-2-(trifluoromethyl)pyrrolidine-1-carbonyl]piperazin-1-yl]-6-[(3R)-pyrrolidin-3-yloxy]-2,3'-bipyridine;

1-9: [2-({2'-ethoxy-5-[(2R)-4-[6-ethoxy-2-(trifluoromethyl)pyridine-3-carbonyl]-2-ethylpiperazin-1-yl]-[2,3'-bipyridin]-6-yl}oxy)ethyl](methyl)amine;

1-10: [2-({5-[(2R)-4-[2-(difluoromethyl)-4-fluorobenzoyl]-2-ethylpiperazin-1-yl]-2'-ethoxy-[2,3'-bipyridin]-6-yl}oxy)ethyl](methyl)amine;

1-11: [2-({2'-ethoxy-5-[(2R)-2-ethyl-4-[(2S)-2-(trifluoromethyl)pyrrolidine-1-carbonyl]piperazin-1-yl]-[2,3'-bipyridin]-6-yl}oxy)ethyl](methyl)amine;

1-12: 2-({2'-ethoxy-5-[(2R)-4-[6-ethoxy-2-(trifluoromethyl)pyridine-3-carbonyl]-2-ethylpiperazin-1-yl]-[2,3'-bipyridin]-6-yl}oxy)ethan-1-amine;

1-13: 2-({5-[(2R)-4-[2-(difluoromethyl)-4-fluorobenzoyl]-2-ethylpiperazin-1-yl]-2'-ethoxy-[2,3'-bipyridin]-6-yl}oxy)ethan-1-amine;

1-14: 2-({2'-ethoxy-5-[(2R)-2-ethyl-4-[(2S)-2-(trifluoromethyl)pyrrolidine-1-carbonyl]piperazin-1-yl]-[2,3'-bipyridin]-6-yl}oxy)ethan-1-amine;

1-15: [2-({5-[(2R)-4-[4-chloro-2-(trifluoromethyl)benzoyl]-2-ethylpiperazin-1-yl]-2'-ethoxy-[2,3'-bipyridin]-6-yl}oxy)ethyl](methyl)amine;

1-16: 2-({5-[(2R)-4-[4-chloro-2-(trifluoromethyl)benzoyl]-2-ethylpiperazin-1-yl]-2'-ethoxy-[2,3'-bipyridin]-6-yl}oxy)ethan-1-amine;

1-17: [2-({2'-ethoxy-5-[(2R)-4-[6-ethoxy-2-(trifluoromethyl)pyridine-3-carbonyl]-2-ethylpiperazin-1-yl]-[2,3'-bipyridin]-6-yl}oxy)ethyl]dimethylamine;

1-18: 2'-ethoxy-5-[(2R)-4-[6-ethoxy-2-(trifluoromethyl)pyridine-3-carbonyl]-2-ethylpiperazin-1-yl]-6-[(3S)-pyrrolidin-3-yloxy]-2,3'-bipyridine;

1-19: (2R)-1-({2'-ethoxy-5-[(2R)-4-[6-ethoxy-2-(trifluoromethyl)pyridine-3-carbonyl]-2-ethylpiperazin-1-yl]-[2,3'-bipyridin]-6-yl}oxy)propan-2-amine;

1-20: (2S)-1-({2'-ethoxy-5-[(2R)-4-[6-ethoxy-2-(trifluoromethyl)pyridine-3-carbonyl]-2-ethylpiperazin-1-yl]-[2,3'-bipyridin]-6-yl}oxy)propan-2-amine;

1-21: (2R)-2-({2'-ethoxy-5-[(2R)-4-[6-ethoxy-2-(trifluoromethyl)pyridine-3-carbonyl]-2-ethylpiperazin-1-yl]-[2,3'-bipyridin]-6-yl}oxy)propan-1-amine;

1-22: (2S)-2-({2'-ethoxy-5-[(2R)-4-[6-ethoxy-2-(trifluoromethyl)pyridine-3-carbonyl]-2-ethylpiperazin-1-yl]-[2,3'-bipyridin]-6-yl}oxy)propan-1-amine;

1-23: 1-[(3R)-4-{2'-ethoxy-6-[2-(methylamino)ethoxy]-[2,3'-bipyridin]-5-yl}-3-ethylpiperazine-1-carbonyl]-2,3-dihydro-1H-indole-7-carbonitrile;

1-24: 1-[(3R)-4-[6-(2-aminoethoxy)-2'-ethoxy-[2,3'-bipyridin]-5-yl]-3-ethylpiperazine-1-carbonyl]-2,3-dihydro-1H-indole-7-carbonitrile;

1-25: 1-[(3R)-4-[6-(2-aminoethoxy)-2'-ethoxy-[2,3'-bipyridin]-5-yl]-3-ethylpiperazine-1-carbonyl]-5-chloro-2,3-dihydro-1H-indole-7-carbonitrile;

1-26: 5-chloro-1-[(3R)-4-{2'-ethoxy-6-[2-(methylamino)ethoxy]-[2,3'-bipyridin]-5-yl}-3-ethylpiperazine-1-carbonyl]-2,3-dihydro-1H-indole-7-carbonitrile;

1-27: [2-({2'-ethoxy-5-[(2R)-2-ethyl-4-[4-fluoro-2-(trifluoromethyl)benzoyl]piperazin-1-yl]-[2,3'-bipyridin]-6-yl}oxy)ethyl](methyl)amine;

1-28: [2-({5-[(2R)-4-(2,4-dichlorobenzoyl)-2-ethylpiperazin-1-yl]-2'-ethoxy-[2,3'-bipyridin]-6-yl}oxy)ethyl](methyl)amine;

1-29: [2-({5-[(2R)-4-(2-chloro-4-fluorobenzoyl)-2-ethylpiperazin-1-yl]-2'-ethoxy-[2,3'-bipyridin]-6-yl}oxy)ethyl](methyl)amine; and 1-30: [2-({2'-ethoxy-5-[(2R)-2-ethyl-4-[6-methoxy-2-(trifluoromethyl)pyridine-3-carbonyl]piperazin-1-yl]-[2,3'-bipyridin]-6-yl}oxy)ethyl](methyl)amine.

TABLE 2

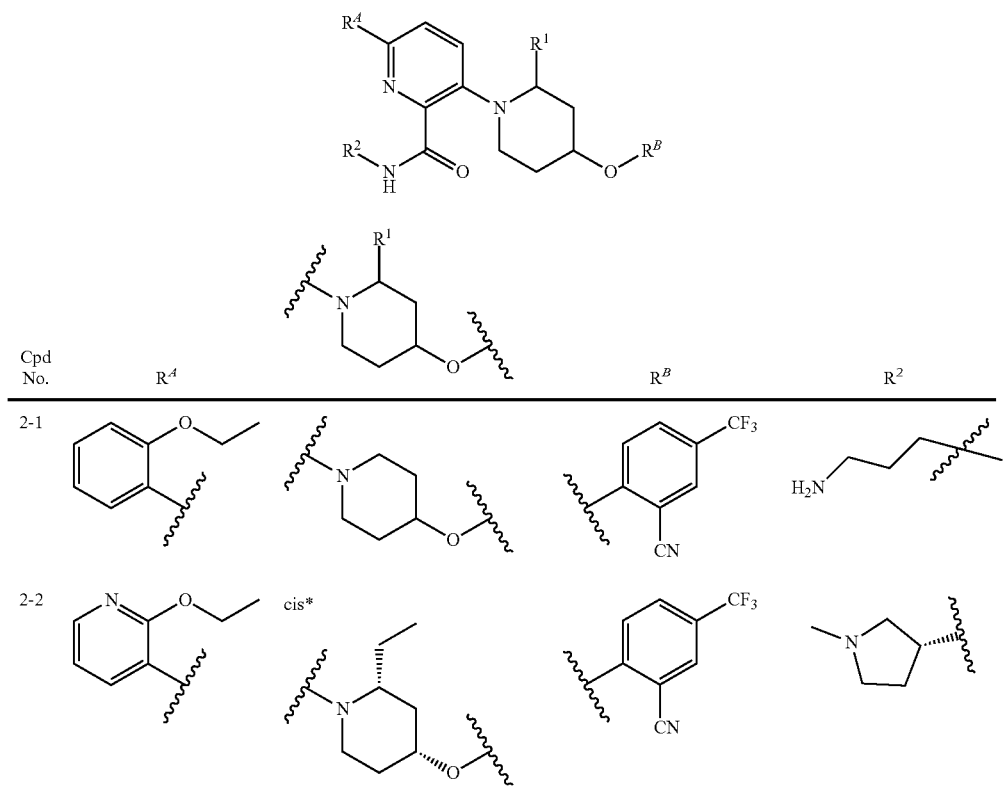

TABLE 2-continued

| Cpd No. | R^A | | R^B | R^2 |
|---|---|---|---|---|
| 2-3 | 2-ethoxypyridin-3-yl | trans* cyclopropyl-piperidine | 4-CF₃-2-CN-phenyl | (3)-pyrrolidinyl (NH) |
| 2-4 | 2-ethoxypyridin-3-yl | trans* cyclopropyl-piperidine | 4-CF₃-2-CN-phenyl | 1-methylpyrrolidin-3-yl |
| 2-5 | 2-ethoxypyridin-3-yl | cis* cyclopropyl-piperidine | 4-CF₃-2-CN-phenyl | (3)-pyrrolidinyl (NH) |
| 2-6 | 2-ethoxypyridin-3-yl | cis* cyclopropyl-piperidine | 4-CF₃-2-CN-phenyl | 1-methylpyrrolidin-3-yl |
| 2-7 | 2-ethoxypyridin-3-yl | cis* cyclopropyl-piperidine | 4-Cl-2-CF₂H-phenyl | 1-methylpyrrolidin-3-yl |

TABLE 2-continued
| Cpd No. | R^A | | R^B | R^2 |
|---|---|---|---|---|
| 2-8 | 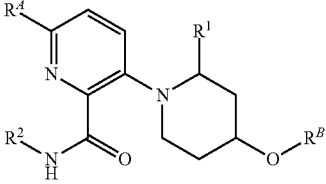 | cis* 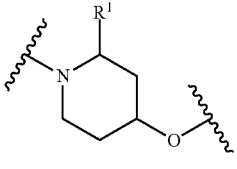 | 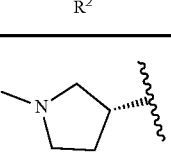 |  |
| 2-9 | 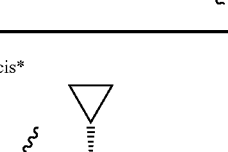 | cis** 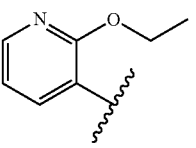 [SMILES: *c1cccnc1OCC] | 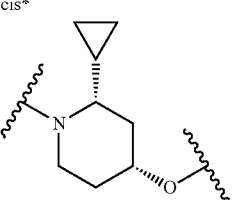 | 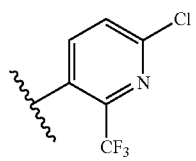 [SMILES: *c1ccc(Cl)nc1C(F)(F)F] |
| 2-10 | 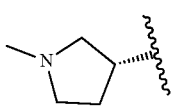 | cis** 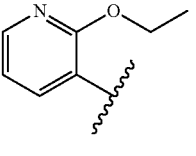 [SMILES: *c1cccnc1OCC] | 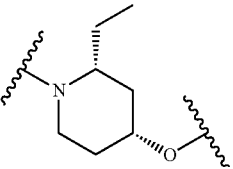 | 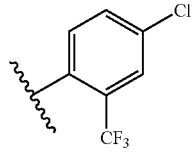 [SMILES: *c1ccc(Cl)cc1C(F)(F)F] |
| 2-11 | 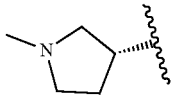 | cis** 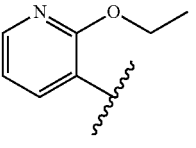 [SMILES: *c1cccnc1OCC] | 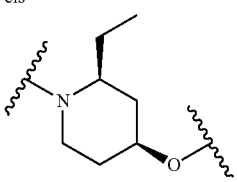 | 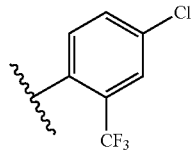 [SMILES: *c1ccc(Cl)cc1C(F)(F)F] |
| 2-12 | 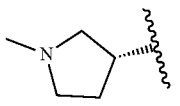 | cis** 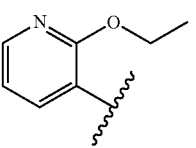 [SMILES: *c1cccnc1OCC] | 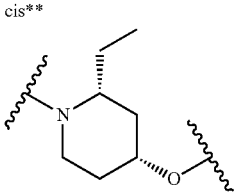 [SMILES: *O[C@@H]1CCN(*)[C@H](CC)C1] | 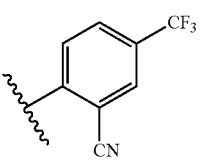 [SMILES: *c1ccc(C(F)(F)F)cc1C#N] |

TABLE 2-continued

| Cpd No. | $R^A$ | | $R^B$ | $R^2$ |
|---|---|---|---|---|
| 2-13 | 2-ethoxypyridin-3-yl | cis* cyclopropyl piperidine | 6-ethoxy-2-(trifluoromethyl)pyridin-3-yl | (R)-1-methylpyrrolidin-3-yl |
| 2-14 | 2-ethoxypyridin-3-yl | cis* cyclopropyl piperidine | 2-cyano-6-(trifluoromethyl)pyridin-3-yl | (R)-1-methylpyrrolidin-3-yl |
| 2-15 | 2-ethoxypyridin-3-yl | cis* ethyl piperidine | 2-cyano-6-(trifluoromethyl)pyridin-3-yl | (R)-1-methylpyrrolidin-3-yl |
| 2-16 | 2-ethoxypyridin-3-yl | cis* cyclopropyl piperidine | 2-cyano-4-methylphenyl | (R)-1-methylpyrrolidin-3-yl |
| 2-17 | 2-ethoxypyridin-3-yl | cis* ethyl piperidine | 2-cyano-4-methylphenyl | (R)-1-methylpyrrolidin-3-yl |

TABLE 2-continued

| Cpd No. | R^A | (piperidine) | R^B | R^2 |
|---|---|---|---|---|
| 2-18 | 2-ethoxypyridin-3-yl | cis** (2-ethyl-4-O-piperidine) | 2-cyano-6-(trifluoromethyl)pyridin-3-yl | 1-methylpyrrolidin-3-yl |
| 2-19 | 2-ethoxypyridin-3-yl | cis* (2-ethyl-4-O-piperidine) | 2-cyano-6-(trifluoromethyl)pyridin-3-yl | quinuclidin-3-yl |
| 2-20 | 2-ethoxypyridin-3-yl | cis* (2-ethyl-4-O-piperidine) | 2-cyano-4-(trifluoromethyl)phenyl | quinuclidin-3-yl |
| 2-21 | 2-ethoxypyridin-3-yl | cis** (2-ethyl-4-O-piperidine) | 4-chloro-2-cyanophenyl | 1-methylpyrrolidin-3-yl |
| 2-22 | 2-ethoxypyridin-3-yl | cis** (2-ethyl-4-O-piperidine) | 2-cyano-6-(trifluoromethyl)pyridin-3-yl | 1-methylpyrrolidin-3-yl |

TABLE 2-continued

| Cpd No. | R$^A$ | | R$^B$ | R$^2$ |
|---|---|---|---|---|
| 2-23 | 2-ethoxyphenyl | cis** (2-methylpiperidin-4-yl) | 6-(trifluoromethyl)-2-cyanopyridin-3-yl | (1-methylpyrrolidin-3-yl) |
| 2-24 | 2-ethoxyphenyl | cis** (2-methylpiperidin-4-yl) | 4-chloro-2-cyanophenyl | (1-methylpyrrolidin-3-yl) |
| 2-25 | 2-ethoxypyridin-3-yl | cis* (2-cyclopropylpiperidin-4-yl) | 4-fluoro-2-cyanophenyl | (1-methylpyrrolidin-3-yl) |

*racemate,
** absolute stereochemistry not defined.

Compounds in Table 2 are named:

2-1: N-(3-aminopropyl)-4-{4-[2-cyano-4-(trifluoromethyl)phenoxy]piperidin-1-yl}-2'-ethoxy-[1,1'-biphenyl]-3-carboxamide;

2-2: 5-{cis-4-[2-cyano-4-(trifluoromethyl)phenoxy]-2-ethylpiperidin-1-yl}-2'-ethoxy-N-[(3R)-1-methylpyrrolidin-3-yl]-[2,3'-bipyridine]-6-carboxamide;

2-3: 5-{trans-4-[2-cyano-4-(trifluoromethyl)phenoxy]-2-cyclopropylpiperidin-1-yl}-2'-ethoxy-N-[(3R)-pyrrolidin-3-yl]-[2,3'-bipyridine]-6-carboxamide;

2-4: 5-{trans-4-[2-cyano-4-(trifluoromethyl)phenoxy]-2-cyclopropylpiperidin-1-yl}-2'-ethoxy-N-[(3R)-1-methylpyrrolidin-3-yl]-[2,3'-bipyridine]-6-carboxamide;

2-5: 5-{cis-4-[2-cyano-4-(trifluoromethyl)phenoxy]-2-cyclopropylpiperidin-1-yl}-2'-ethoxy-N-[(3R)-pyrrolidin-3-yl]-[2,3'-bipyridine]-6-carboxamide;

2-6: 5-{cis-4-[2-cyano-4-(trifluoromethyl)phenoxy]-2-cyclopropylpiperidin-1-yl}-2'-ethoxy-N-[(3R)-1-methylpyrrolidin-3-yl]-[2,3'-bipyridine]-6-carboxamide;

2-7: 5-{cis-4-[4-chloro-2-(difluoromethyl)phenoxy]-2-cyclopropylpiperidin-1-yl}-2'-ethoxy-N-[(3R)-1-methylpyrrolidin-3-yl]-[2,3'-bipyridine]-6-carboxamide;

2-8: 5-cis-(4-{[6-chloro-2-(trifluoromethyl)pyridin-3-yl]oxy}-2-cyclopropylpiperidin-1-yl)-2'-ethoxy-N-[(3R)-1-methylpyrrolidin-3-yl]-[2,3'-bipyridine]-6-carboxamide;

2-9: 5-[(2R,4R)-4-[4-chloro-2-(trifluoromethyl)phenoxy]-2-ethylpiperidin-1-yl]-2'-ethoxy-N-[(3R)-1-methylpyrrolidin-3-yl]-[2,3'-bipyridine]-6-carboxamide;

2-10: 5-[(2S,4S)-4-[4-chloro-2-(trifluoromethyl)phenoxy]-2-ethylpiperidin-1-yl]-2'-ethoxy-N-[(3R)-1-methylpyrrolidin-3-yl]-[2,3'-bipyridine]-6-carboxamide;

2-11: 5-[(2R,4R)-4-[2-cyano-4-(trifluoromethyl)phenoxy]-2-ethylpiperidin-1-yl]-2'-ethoxy-N-[(3R)-1-methylpyrrolidin-3-yl]-[2,3'-bipyridine]-6-carboxamide;

2-12: 5-[(2S,4S)-4-[2-cyano-4-(trifluoromethyl)phenoxy]-2-ethylpiperidin-1-yl]-2'-ethoxy-N-[(3R)-1-methylpyrrolidin-3-yl]-[2,3'-bipyridine]-6-carboxamide;

2-13: 5-(cis-2-cyclopropyl-4-{[6-ethoxy-2-(trifluoromethyl)pyridin-3-yl]oxy}piperidin-1-yl)-2'-ethoxy-N-[(3R)-1-methylpyrrolidin-3-yl]-[2,3'-bipyridine]-6-carboxamide;

2-14: 5-(cis-4-{[2-cyano-6-(trifluoromethyl)pyridin-3-yl]oxy}-2-cyclopropylpiperidin-1-yl)-2'-ethoxy-N-[(3R)-1-methylpyrrolidin-3-yl]-[2,3'-bipyridine]-6-carboxamide;

2-15: 5-(cis-4-{[2-cyano-6-(trifluoromethyl)pyridin-3-yl]oxy}-2-ethylpiperidin-1-yl)-2'-ethoxy-N-[(3R)-1-methylpyrrolidin-3-yl]-[2,3'-bipyridine]-6-carboxamide;

2-16: 5-[cis-4-(2-cyano-4-methylphenoxy)-2-cyclopropylpiperidin-1-yl]-2'-ethoxy-N-[(3R)-1-methylpyrrolidin-3-yl]-[2,3'-bipyridine]-6-carboxamide;

2-17: 5-[cis-4-(2-cyano-4-methylphenoxy)-2-ethylpiperidin-1-yl]-2'-ethoxy-N-[(3R)-1-methylpyrrolidin-3-yl]-[2,3'-bipyridine]-6-carboxamide;

2-18: 5-[(2R,4R)-4-{[2-cyano-6-(trifluoromethyl)pyridin-3-yl]oxy}-2-ethylpiperidin-1-yl]-2'-ethoxy-N-[(3R)-1-methylpyrrolidin-3-yl]-[2,3'-bipyridine]-6-carboxamide;

2-19: N-[(3S)-1-azabicyclo[2.2.2]octan-3-yl]-5-(cis-4-{[2-cyano-6-(trifluoromethyl)pyridin-3-yl]oxy}-2-ethylpiperidin-1-yl)-2'-ethoxy-[2,3'-bipyridine]-6-carboxamide;

2-20: N-[(3S)-1-azabicyclo[2.2.2]octan-3-yl]-5-{cis-4-[2-cyano-4-(trifluoromethyl)phenoxy]-2-ethylpiperidin-1-yl}-2'-ethoxy-[2,3'-bipyridine]-6-carboxamide;

2-21: 5-[(2R,4R)-4-(4-chloro-2-cyanophenoxy)-2-ethylpiperidin-1-yl]-2'-ethoxy-N-[(3R)-1-methylpyrrolidin-3-yl]-[2,3'-bipyridine]-6-carboxamide;

2-22: 5-[(2R,4R)-4-{[2-cyano-6-(trifluoromethyl)pyridin-3-yl]oxy}-2-ethylpiperidin-1-yl]-2'-ethoxy-N-[(3 S)-1-methylpyrrolidin-3-yl]-[2,3'-bipyridine]-6-carboxamide;

2-23: 3-(cis-4-{[2-cyano-6-(trifluoromethyl)pyridin-3-yl]oxy}-2-methylpiperidin-1-yl)-6-(2-ethoxyphenyl)-N-[(3R)-1-methylpyrrolidin-3-yl]pyridine-2-carboxamide;

2-24: 3-[cis-4-(4-chloro-2-cyanophenoxy)-2-methylpiperidin-1-yl]-6-(2-ethoxyphenyl)-N-[(3R)-1-methylpyrrolidin-3-yl]pyridine-2-carboxamide; and 2-25: 5-[cis-4-(2-cyano-4-fluorophenoxy)-2-cyclopropylpiperidin-1-yl]-2'-ethoxy-N-[(3R)-1-methylpyrrolidin-3-yl]-[2,3'-bipyridine]-6-carboxamide.

TABLE 3

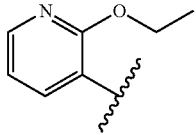 [SMILES: *c1cccnc1OCC]

| Cpd No. | R<sup>A</sup> | | L | R<sup>B</sup> | R<sup>2</sup> |
|---|---|---|---|---|---|
| 3-1 | 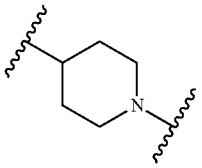 [SMILES: *C1CCN(*)CC1] | 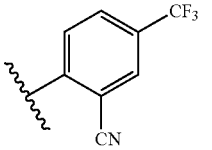 [SMILES: *c1ccc(C(F)(F)F)cc1C#N] | bond | 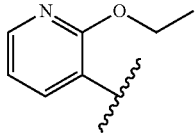 | 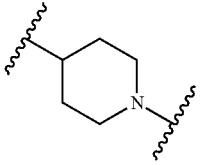 [SMILES: *C1CCN(*)CC1] |
| 3-2 | 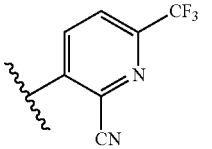 [SMILES: *c1ccc(C(F)(F)F)nc1C#N] | 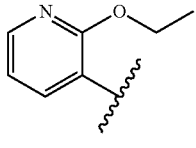 [SMILES: *c1cccnc1OCC] | bond | 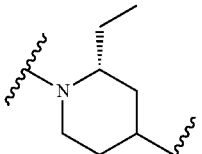 | 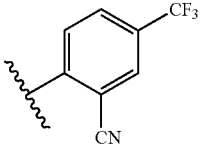 [SMILES: *c1ccc(C(F)(F)F)cc1C#N] |
| 3-3 | 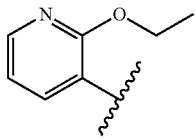 [SMILES: *c1cccnc1OCC] | 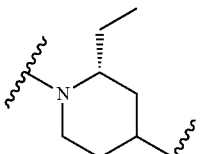 | —O— | 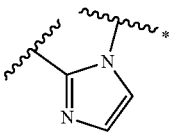 [SMILES: *c1nccn1*] | 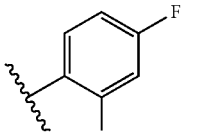 |
| 3-4 | | | | | |

TABLE 3-continued
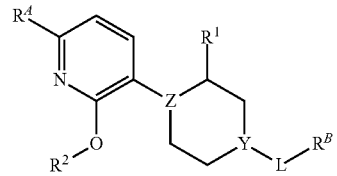
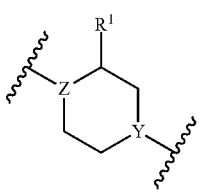
| Cpd No. | R^A | | L | R^B | R^2 |
|---|---|---|---|---|---|
| 3-5 | 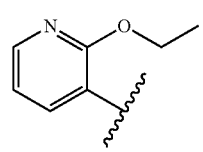 [SMILES: *c1cccnc1OCC] | 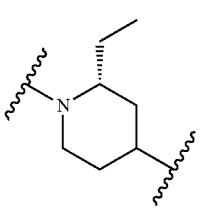 [SMILES: *C1CCN(*)[C@H](CC)C1] | 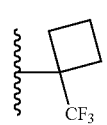 | 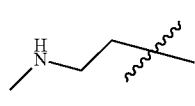 | 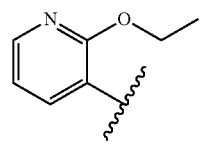 [SMILES: *c1cccnc1OCC] |
| 3-6 | 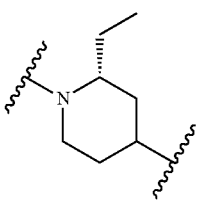 [SMILES: *C1CCN(*)[C@H](CC)C1] | 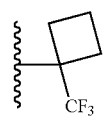 | 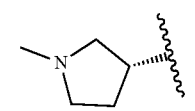 [SMILES: *[C@@H]1CCN(C)C1] | 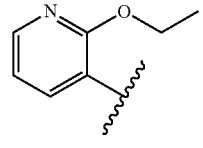 [SMILES: *c1cccnc1OCC] | 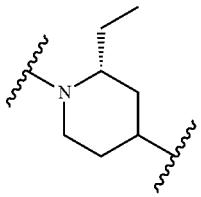 [SMILES: *C1CCN(*)[C@H](CC)C1] |
| 3-7 | 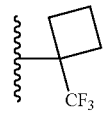 | 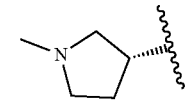 [SMILES: *[C@@H]1CCN(C)C1] | 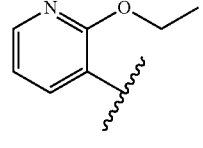 [SMILES: *c1cccnc1OCC] | 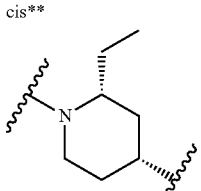 | 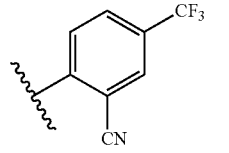 [SMILES: *c1ccc(C(F)(F)F)cc1C#N] |
| 3-8 | 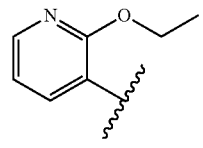 [SMILES: *c1cccnc1OCC] | cis** | —O— | 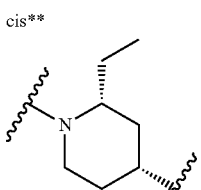 | 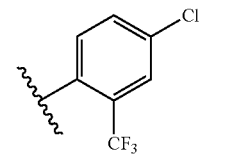 [SMILES: *c1ccc(Cl)cc1C(F)(F)F] |
| 3-9 | | cis** | —O— | | |
*attachment to R^B,
**racemate Compounds in Table 3 are named:

3-1: 2-(4-{2'-ethoxy-6-[2-(methylamino)ethoxy]-[2,3'-bipyridin]-5-yl}piperidin-1-yl)-5-(trifluoromethyl)benzonitrile;

3-2: 3-(4-{2'-ethoxy-6-[2-(methylamino)ethoxy]-[2,3'-bipyridin]-5-yl}piperidin-1-yl)-6-(trifluoromethyl)pyridine-2-carbonitrile;

3-3: 2-{[(2R)-1-{2'-ethoxy-6-[2-(methylamino)ethoxy]-[2,3'-bipyridin]-5-yl}-2-ethylpiperidin-4-yl]oxy}-5-(trifluoromethyl)benzonitrile;

3-4: [2-({2'-ethoxy-5-[(2R)-2-ethyl-4-{1-[4-fluoro-2-(trifluoromethyl)phenyl]-1H-imidazol-2-yl}piperidin-1-yl]-[2,3'-bipyridin]-6-yl}oxy)ethyl](methyl)amine;

3-5: [2-({2'-ethoxy-5-[(2R)-2-ethyl-4-{1-[1-(trifluoromethyl)cyclobutyl]-1H-imidazol-2-yl}piperidin-1-yl]-[2,3'-bipyridin]-6-yl}oxy)ethyl](methyl)amine;

3-6: [2-({2'-ethoxy-5-[(2R)-2-ethyl-4-{5-[1-(trifluoromethyl)cyclobutyl]-4H-1λ³,2,4-oxadiazol-3-yl}piperidin-1-yl]-[2,3'-bipyridin]-6-yl}oxy)ethyl](methyl)amine;

3-7: [2-({2'-ethoxy-5-[(2R)-2-ethyl-4-{3-[1-(trifluoromethyl)cyclobutyl]-4H-1λ³,2,4-oxadiazol-5-yl}piperidin-1-yl]-[2,3'-bipyridin]-6-yl}oxy)ethyl](methyl)amine;

3-8: 2-{[rac-(2R,4R)-1-(2'-ethoxy-6-{[(3R)-1-methylpyrrolidin-3-yl]oxy}-[2,3'-bipyridin]-5-yl)-2-ethylpiperidin-4-yl]oxy}-5-(trifluoromethyl)benzonitrile; and 3-9: 5-[rac-(2R,4R)-4-[4-chloro-2-(trifluoromethyl)phenoxy]-2-ethylpiperidin-1-yl]-2'-ethoxy-6-{[(3R)-1-methylpyrrolidin-3-yl]oxy}-2,3'-bipyridine.

TABLE 4

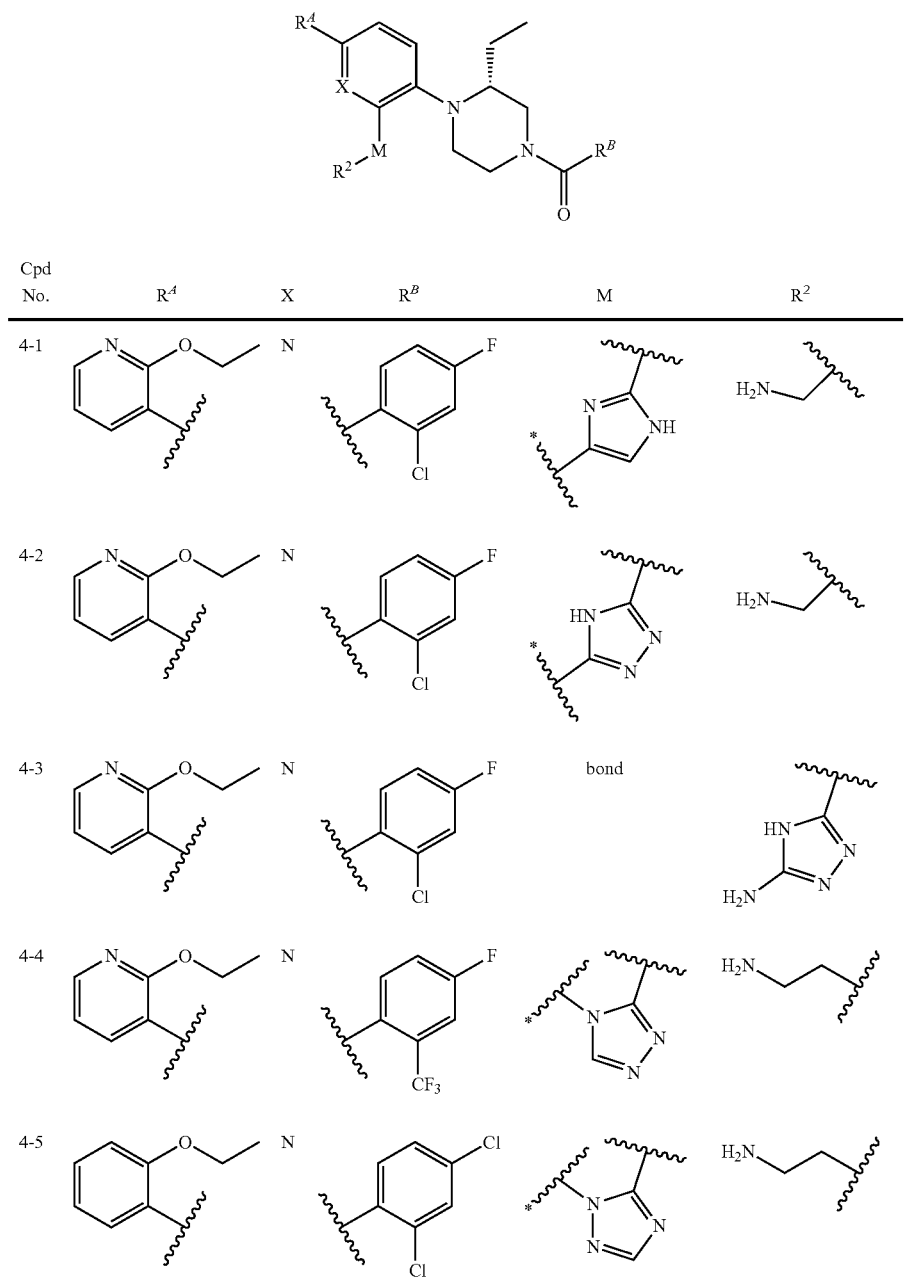

TABLE 4-continued

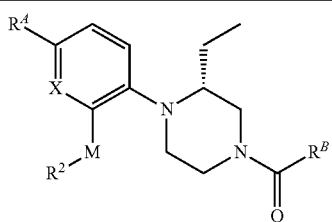

| Cpd No. | R^A | X | R^B | M | R^2 |
|---|---|---|---|---|---|
| 4-6 | 2-ethoxypyridin-3-yl | CH | 4-Cl,2-CF3-phenyl | imidazol-1-yl (attached via N, linked at 2-position) | H2N-CH2- |
| 4-7 | 2-ethoxypyridin-3-yl | N | 4-F,2-Cl-phenyl | oxazol-4,5-diyl (attached via 4-position) | H2N-CH2- |
| 4-8 | 2-ethoxyphenyl | N | 4-F,2-Cl-phenyl | —SO2NH— | H2N-CH2- |
| 4-9 | 2-ethoxypyridin-3-yl | N | 4-F,2-CF3-phenyl | —SO2NH— | H2N-CH2- |
| 4-10 | 2-ethoxypyridin-3-yl | CH | 4-F,2-Cl-phenyl | —SO2NH— | 1-methylpyrrolidin-3-yl |
| 4-11 | 2-ethoxypyridin-3-yl | N | 4-F,2-Cl-phenyl | —SO2NH— | 1-methylpyrrolidin-3-yl |
| 4-12 | 2-ethoxypyridin-3-yl | N | 4-Cl,2-CF3-phenyl | —S— | (CH3)2N-CH2CH2- |
| 4-13 | 2-ethoxypyridin-3-yl | N | 4-Cl,2-CF3-phenyl | —SO2— | (CH3)2N-CH2CH2- |

*attachment to R^2

Compounds in Table 4 are named:

4-1: 1-(2-{5-[(2R)-4-(2-chloro-4-fluorobenzoyl)-2-ethylpiperazin-1-yl]-2'-ethoxy-[2,3'-bipyridin]-6-yl}-1H-imidazol-4-yl)methanamine;

4-2: 1-(5-{5-[(2R)-4-(2-chloro-4-fluorobenzoyl)-2-ethylpiperazin-1-yl]-2'-ethoxy-[2,3'-bipyridin]-6-yl}-4H-1,2,4-triazol-3-yl)methanamine;

4-3: 5-{5-[(2R)-4-(2-chloro-4-fluorobenzoyl)-2-ethylpiperazin-1-yl]-2'-ethoxy-[2,3'-bipyridin]-6-yl}-4H-1,2,4-triazol-3-amine;

4-4: 5-{5-[(2R)-4-(4-fluoro-2-trifluoro-benzoyl)-2-ethylpiperazin-1-yl]-2'-ethoxy-[2,3'-bipyridin]-6-yl}-1H-1,2,4-triazol-3-amine;

4-5: 2-(5-{3-[(2R)-4-(2,4-dichlorobenzoyl)-2-ethylpiperazin-1-yl]-6-(2-ethoxyphenyl)pyridin-2-yl}-1H-1,2,4-triazol-1-yl)ethan-1-amine;

4-6: 2-(2-{2-[(2R)-4-[4-chloro-2-(trifluoromethyl)benzoyl]-2-ethylpiperazin-1-yl]-5-(2-ethoxypyridin-3-yl)phenyl}-1H-imidazol-1-yl)ethan-1-amine;

4-7: 2-(5-{5-[(2R)-4-(2-chloro-4-fluorobenzoyl)-2-ethylpiperazin-1-yl]-2'-ethoxy-[2,3'-bipyridin]-6-yl}-1,3-oxazol-4-yl)ethan-1-amine;

4-8: N-(2-aminoethyl)-3-[(2R)-4-(2-chloro-4-fluorobenzoyl)-2-ethylpiperazin-1-yl]-6-(2-ethoxyphenyl)pyridine-2-sulfonamide;

4-9: N-(2-aminoethyl)-2'-ethoxy-5-[(2R)-2-ethyl-4-[4-fluoro-2-(trifluoromethyl)benzoyl]piperazin-1-yl]-[2,3'-bipyridine]-6-sulfonamide;

4-10: 2-[(2R)-4-(2-chloro-4-fluorobenzoyl)-2-ethylpiperazin-1-yl]-5-(2-ethoxypyridin-3-yl)-N-[(3R)-1-methylpyrrolidin-3-yl]benzene-1-sulfonamide;

4-11: 5-[(2R)-4-(2-chloro-4-fluorobenzoyl)-2-ethylpiperazin-1-yl]-2'-ethoxy-N-[(3R)-1-methylpyrrolidin-3-yl]-[2,3'-bipyridine]-6-sulfonamide;

4-12: [2-({5-[(2R)-4-[4-chloro-2-(trifluoromethyl)benzoyl]-2-ethylpiperazin-1-yl]-2'-ethoxy-[2,3'-bipyridin]-6-yl}sulfanyl)ethyl]dimethylamine; and 4-13: [2-({5-[(2R)-4-[4-chloro-2-(trifluoromethyl)benzoyl]-2-ethylpiperazin-1-yl]-2'-ethoxy-[2,3'-bipyridin]-6-yl}sulfonyl)ethyl]dimethylamine.

TABLE 5

Compounds in Table 5 are named:

5-1: rac-2'-ethoxy-5-[(2R,4S)-2-ethyl-4-{[2-(trifluoromethyl)phenyl]sulfanyl}piperidin-1-yl]-N-[(3R)-1-methylpyrrolidin-3-yl]-[2,3'-bipyridine]-6-carboxamide;

5-2: rac-2'-ethoxy-5-[(2R,4S)-2-ethyl-4-[2-(trifluoromethyl)benzenesulfonyl]piperidin-1-yl]-N-[(3R)-1-methylpyrrolidin-3-yl]-[2,3'-bipyridine]-6-carboxamide; and 5-3: 2'-ethoxy-5-[(2R)-2-ethyl-4-[4-fluoro-2-(trifluoromethyl)benzenesulfonyl]piperidin-1-yl]-N-[(3R)-1-methylpyrrolidin-3-yl]-[2,3'-bipyridine]-6-carboxamide.

In one aspect, compounds described herein are in the form of pharmaceutically acceptable salts. As well, active metabolites of these compounds having the same type of activity are included in the scope of the present disclosure. In addition, the compounds described herein can exist in unsolvated as well as solvated forms with pharmaceutically acceptable solvents such as water, ethanol, and the like. The solvated forms of the compounds presented herein are also considered to be disclosed herein.

"Pharmaceutically acceptable," as used herein, refers a material, such as a carrier or diluent, which does not abrogate the biological activity or properties of the compound, and is relatively nontoxic, i.e., the material is administered to an individual without causing undesirable biological effects or interacting in a deleterious manner with any of the components of the composition in which it is contained.

The term "pharmaceutically acceptable salt" refers to a form of a therapeutically active agent that consists of a cationic form of the therapeutically active agent in combination with a suitable anion, or in alternative embodiments, an anionic form of the therapeutically active agent in combination with a suitable cation. Handbook of Pharmaceutical Salts: Properties, Selection and Use. International Union of Pure and Applied Chemistry, Wiley-VCH 2002. S. M. Berge, L. D. Bighley, D. C. Monkhouse, J. Pharm. Sci. 1977, 66, 1-19. P. H. Stahl and C. G. Wermuth, editors, *Handbook of Pharmaceutical Salts: Properties, Selection and Use*, Weinheim/Zürich: Wiley-VCH/VHCA, 2002. Pharmaceutical salts typically are more soluble and more rapidly soluble in stomach and intestinal juices than non-ionic species and so are useful in solid dosage forms. Furthermore, because their solubility often is a function of pH, selective dissolution in one or another part of the digestive tract is possible and this capability can be manipulated as one aspect of delayed and sustained release behaviours. Also, because the salt-forming molecule can be in equilibrium with a neutral form, passage through biological membranes can be adjusted.

In some embodiments, pharmaceutically acceptable salts are obtained by reacting a compound of Formula (A) or Formula (I) with an acid. In some embodiments, the compound of Formula (A) or Formula (I)(i.e. free base form) is basic and is reacted with an organic acid or an inorganic acid. Inorganic acids include, but are not limited to, hydrochloric acid, hydrobromic acid, sulfuric acid, phosphoric acid, nitric acid, and metaphosphoric acid. Organic acids include, but are not limited to, 1-hydroxy-2-naphthoic acid; 2,2-dichloroacetic acid; 2-hydroxyethanesulfonic acid; 2-oxoglutaric acid; 4-acetamidobenzoic acid; 4-aminosalicylic acid; acetic acid; adipic acid; ascorbic acid (L); aspartic acid (L); benzenesulfonic acid; benzoic acid; camphoric acid (+); camphor-10-sulfonic acid (+); capric acid (decanoic acid); caproic acid (hexanoic acid); caprylic acid (octanoic acid); carbonic acid; cinnamic acid; citric acid; cyclamic acid; dodecylsulfuric acid; ethane-1,2-disulfonic acid; ethanesulfonic acid; formic acid; fumaric acid; galactaric acid; gentisic acid; glucoheptonic acid (D); gluconic acid (D); glucuronic acid (D); glutamic acid; glutaric acid; glycerophosphoric acid; glycolic acid; hippuric acid; isobutyric acid; lactic acid (DL); lactobionic acid; lauric acid; maleic acid; malic acid (− L); malonic acid; mandelic acid (DL); methanesulfonic acid; naphthalene-1,5-disulfonic acid; naphthalene-2-sulfonic acid; nicotinic acid; oleic acid; oxalic acid; palmitic acid; pamoic acid; phosphoric acid; proprionic acid; pyroglutamic acid (− L); salicylic acid; sebacic acid; stearic acid; succinic acid; sulfuric acid; tartaric acid (+ L); thiocyanic acid; toluenesulfonic acid (p); and undecylenic acid.

In some embodiments, a compound of Formula (A) or Formula (I) is prepared as a chloride salt, sulfate salt, bromide salt, mesylate salt, maleate salt, citrate salt or phosphate salt.

In some embodiments, pharmaceutically acceptable salts are obtained by reacting a compound of Formula (A) or Formula (I) with a base. In some embodiments, the compound of Formula (A) or Formula (I) is acidic and is reacted with a base. In such situations, an acidic proton of the compound of Formula (A) or Formula (I) is replaced by a metal ion, e.g., lithium, sodium, potassium, magnesium, calcium, or an aluminum ion. In some cases, compounds described herein coordinate with an organic base, such as, but not limited to, ethanolamine, diethanolamine, triethanolamine, tromethamine, meglumine, N-methylglucamine, dicyclohexylamine, tris(hydroxymethyl)methylamine. In other cases, compounds described herein form salts with amino acids such as, but not limited to, arginine, lysine, and the like. Acceptable inorganic bases used to form salts with compounds that include an acidic proton, include, but are not limited to, aluminum hydroxide, calcium hydroxide, potassium hydroxide, sodium carbonate, potassium carbonate, sodium hydroxide, lithium hydroxide, and the like. In some embodiments, the compounds provided herein are prepared as a sodium salt, calcium salt, potassium salt, magnesium salt, meglumine salt, N-methylglucamine salt or ammonium salt.

It should be understood that a reference to a pharmaceutically acceptable salt includes the solvent addition forms. In some embodiments, solvates contain either stoichiometric or non-stoichiometric amounts of a solvent, and are formed during the process of crystallization with pharmaceutically acceptable solvents such as water, ethanol, and the like. Hydrates are formed when the solvent is water, or alcoholates are formed when the solvent is alcohol. Solvates of compounds described herein are conveniently prepared or formed during the processes described herein. In addition, the compounds provided herein optionally exist in unsolvated as well as solvated forms.

The methods and formulations described herein include the use of N-oxides (if appropriate), or pharmaceutically acceptable salts of compounds having the structure of Formula (A) or Formula (I), as well as active metabolites of these compounds having the same type of activity.

In some embodiments, sites on the organic radicals (e.g. alkyl groups, aromatic rings) of compounds of Formula (A) or Formula (I) are susceptible to various metabolic reactions. Incorporation of appropriate substituents on the organic radicals will reduce, minimize or eliminate this metabolic pathway. In specific embodiments, the appropriate substituent to decrease or eliminate the susceptibility of the aromatic ring to metabolic reactions is, by way of example only, a halogen, deuterium, an alkyl group, a haloalkyl group, or a deuteroalkyl group.

In another embodiment, the compounds described herein are labeled isotopically (e.g. with a radioisotope) or by another other means, including, but not limited to, the use of chromophores or fluorescent moieties, bioluminescent labels, or chemiluminescent labels.

Compounds described herein include isotopically-labeled compounds, which are identical to those recited in the various formulae and structures presented herein, but for the fact that one or more atoms are replaced by an atom having an atomic mass or mass number different from the atomic mass or mass number usually found in nature. Examples of isotopes that can be incorporated into the present compounds include isotopes of hydrogen, carbon, nitrogen, oxygen, sulfur, fluorine chlorine, iodine, phosphorus, such as, for example, $^2$H, $^3$H, $^{13}$C, $^{14}$C, $^{15}$N, $^{18}$O, $^{17}$O, $^{35}$S, $^{18}$F, $^{36}$Cl, $^{123}$I, $^{124}$I, $^{125}$I, $^{131}$I, $^{32}$P and $^{33}$P. In one aspect, isotopically-labeled compounds described herein, for example those into which radioactive isotopes such as $^3$H and $^{14}$C are incorporated, are useful in drug and/or substrate tissue distribution assays. In one aspect, substitution with isotopes such as deuterium affords certain therapeutic advantages resulting from greater metabolic stability, such as, for example, increased in vivo half-life or reduced dosage requirements.

In some embodiments, the compounds of Formula (A) or Formula (I) possess one or more stereocenters and each stereocenter exists independently in either the R or S configuration. In some embodiments, the compound of Formula (A) or Formula (I) exists in the R configuration. In some embodiments, the compound of Formula (A) or Formula (I) exists in the S configuration. The compounds presented herein include all diastereomeric, individual enantiomers, atropisomers, and epimeric forms as well as the appropriate mixtures thereof. The compounds and methods provided herein include all cis, trans, syn, anti, entgegen (E), and zusammen (Z) isomers as well as the appropriate mixtures thereof.

Individual stereoisomers are obtained, if desired, by methods such as, stereoselective synthesis and/or the separation of stereoisomers by chiral chromatographic columns or the separation of diastereomers by either non-chiral or chiral chromatographic columns or crystallization and recrystallization in a proper solvent or a mixture of solvents. In certain embodiments, compounds of Formula (A) or Formula (I) are prepared as their individual stereoisomers by reacting a racemic mixture of the compound with an optically active resolving agent to form a pair of diastereoisomeric compounds/salts, separating the diastereomers and recovering the optically pure individual enantiomers. In some embodiments, resolution of individual enantiomers is carried out using covalent diastereomeric derivatives of the compounds described herein. In another embodiment, diastereomers are separated by separation/resolution techniques based upon differences in solubility. In other embodiments, separation of stereoisomers is performed by chromatography or by the forming diastereomeric salts and separation by recrystallization, or chromatography, or any combination thereof. Jean Jacques, Andre Collet, Samuel H. Wilen, "Enantiomers, Racemates and Resolutions", John Wiley And Sons, Inc., 1981. In some embodiments, stereoisomers are obtained by stereoselective synthesis.

In some embodiments, compounds described herein are prepared as prodrugs. A "prodrug" refers to an agent that is converted into the parent drug in vivo. Prodrugs are often useful because, in some situations, they are easier to administer than the parent drug. They are, for instance, bioavailable by oral administration whereas the parent is not. Further or alternatively, the prodrug also has improved solubility in pharmaceutical compositions over the parent drug. In some embodiments, the design of a prodrug increases the effective water solubility. An example, without limitation, of a prodrug is a compound described herein, which is administered as an ester (the "prodrug") but then is metabolically hydrolyzed to provide the active entity. A further example of a prodrug is a short peptide (polyaminoacid) bonded to an acid group where the peptide is metabolized to reveal the active moiety. In certain embodiments, upon in vivo administration, a prodrug is chemically converted to the biologically, pharmaceutically or therapeutically active form of the compound. In certain embodiments, a prodrug is enzymatically metabolized by one or more steps or processes to the biologically, pharmaceutically or therapeutically active form of the compound.

Prodrugs of the compounds described herein include, but are not limited to, esters, ethers, carbonates, thiocarbonates, N-acyl derivatives, N-acyloxyalkyl derivatives, N-alkyloxyacyl derivatives, quaternary derivatives of tertiary amines, N-Mannich bases, Schiff bases, amino acid conjugates, phosphate esters, and sulfonate esters. See for example Design of Prodrugs, Bundgaard, A. Ed., Elseview, 1985 and Method in Enzymology, Widder, K. et al., Ed.; Academic, 1985, vol. 42, p. 309-396; Bundgaard, H. "Design and Application of Prodrugs" in A Textbook of Drug Design and Development, Krosgaard-Larsen and H. Bundgaard, Ed., 1991, Chapter 5, p. 113-191; and Bundgaard, H., Advanced Drug Delivery Review, 1992, 8, 1-38, each of which is incorporated herein by reference. In some embodiments, a hydroxyl group in the compounds disclosed herein is used to form a prodrug, wherein the hydroxyl group is incorporated into an acyloxyalkyl ester, alkoxycarbonyloxyalkyl ester, alkyl ester, aryl ester, phosphate ester, sugar ester, ether, and the like. In some embodiments, a hydroxyl group in the compounds disclosed herein is a prodrug wherein the hydroxyl is then metabolized in vivo to provide a carboxylic acid group. In some embodiments, a carboxyl group is used to provide an ester or amide (i.e. the prodrug), which is then metabolized in vivo to provide a carboxylic acid group. In some embodiments, compounds described herein are prepared as alkyl ester prodrugs.

Prodrug forms of the herein described compounds, wherein the prodrug is metabolized in vivo to produce a compound of Formula (A) or Formula (I) as set forth herein are included within the scope of the claims. In some cases, some of the herein-described compounds is a prodrug for another derivative or active compound.

In some embodiments, any one of the hydroxyl group(s), amino group(s) and/or carboxylic acid group(s) are functionalized in a suitable manner to provide a prodrug moiety. In some embodiments, the prodrug moiety is as described above.

In additional or further embodiments, the compounds described herein are metabolized upon administration to an organism in need to produce a metabolite that is then used to produce a desired effect, including a desired therapeutic effect.

A "metabolite" of a compound disclosed herein is a derivative of that compound that is formed when the compound is metabolized. The term "active metabolite" refers to a biologically active derivative of a compound that is formed when the compound is metabolized. The term "metabolized," as used herein, refers to the sum of the processes (including, but not limited to, hydrolysis reactions and reactions catalyzed by enzymes) by which a particular substance is changed by an organism. Thus, enzymes may produce specific structural alterations to a compound. For example, cytochrome P450 catalyzes a variety of oxidative and reductive reactions while uridine diphosphate glucuronyltransferases catalyze the transfer of an activated glucuronic-acid molecule to aromatic alcohols, aliphatic alcohols, carboxylic acids, amines and free sulphydryl groups. Metabolites of the compounds disclosed herein are optionally identified either by administration of compounds to a host and analysis of tissue samples from the host, or by incubation of compounds with hepatic cells in vitro and analysis of the resulting compounds.

Synthesis of Compounds

Compounds of Formula (A) or Formula (I) described herein are synthesized using standard synthetic techniques or using methods known in the art in combination with methods described herein.

Unless otherwise indicated, conventional methods of mass spectroscopy, NMR, HPLC, protein chemistry, biochemistry, recombinant DNA techniques and pharmacology are employed.

Compounds are prepared using standard organic chemistry techniques such as those described in, for example, March's Advanced Organic Chemistry, 6<sup>th</sup> Edition, John Wiley and Sons, Inc. Alternative reaction conditions for the synthetic transformations described herein may be employed such as variation of solvent, reaction temperature, reaction time, as well as different chemical reagents and other reaction conditions.

In some embodiments, compounds described herein are prepared as described in Scheme A.

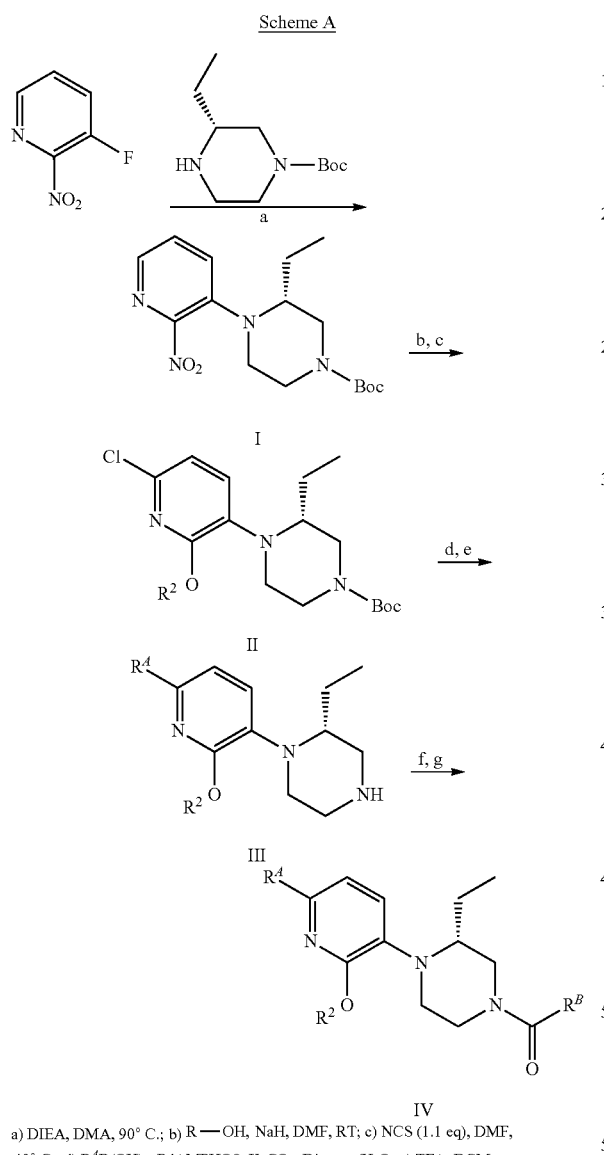

a) DIEA, DMA, 90° C.; b) R—OH, NaH, DMF, RT; c) NCS (1.1 eq), DMF, 40° C.; d) $R^4B(OH)_2$, PdAMPHOS, $K_2CO_3$, Dioxane/$H_2O$; e) TFA, DCM; f) $R^BCO_2H$, HATU, TEA; g) deprotection Compound I is obtained by heating 3-fluoro-2-nitropyridine with a mono-protected substituted piperazine in the presence of organic base such as N,N-diisopropylethylamine. An $S_N2$ reaction of the nitro group with an alkoxide yields a pyridinyl ether, which is subsequently transformed to a chloropyridine (II) by treating with NCS. Compound II is subjected to an organometallic coupling reaction such as Suzuki-Miyaura reaction with $R^4$—$B(OH)_2$ or its corresponding ester and is followed by a standard deprotection to generate compound III. Compound III is converted to the final product (IV) via an HATU-activated amide coupling. In some cases, an additional deprotection step from $R^2$ group is required to obtain compound IV after the amide formation.

In some embodiments, compounds described herein are prepared as described in Scheme B.

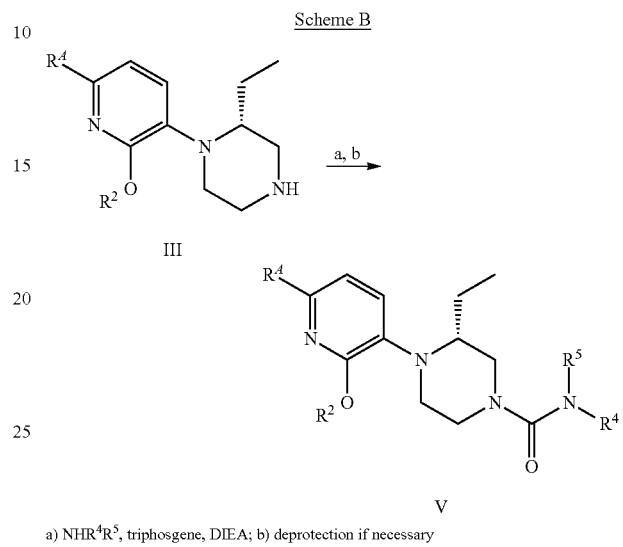

a) $NHR^4R^5$, triphosgene, DIEA; b) deprotection if necessary

Compound III is converted to the urea V by treating with an activated carbamic chloride using triphosgene and a $NHR^4R^5$ in the presence of DIEA. In some cases, an additional deprotection step from $R^2$ is required to obtain compound V after the urea formation.

In some embodiments, compounds described herein are prepared as described in Scheme C.

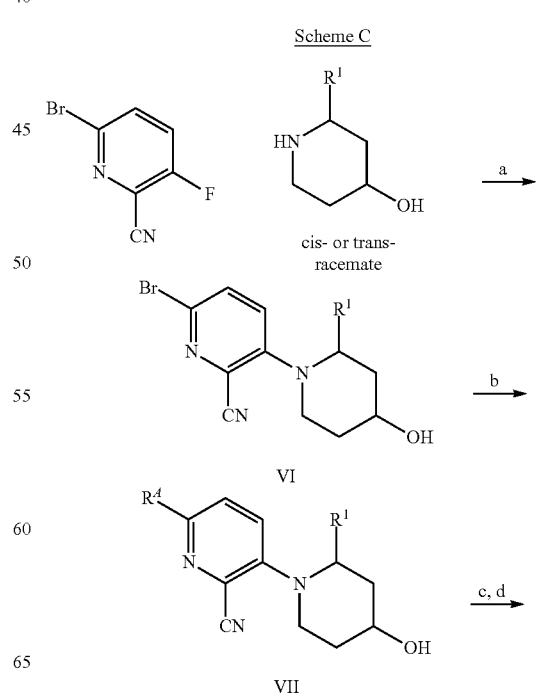

-continued

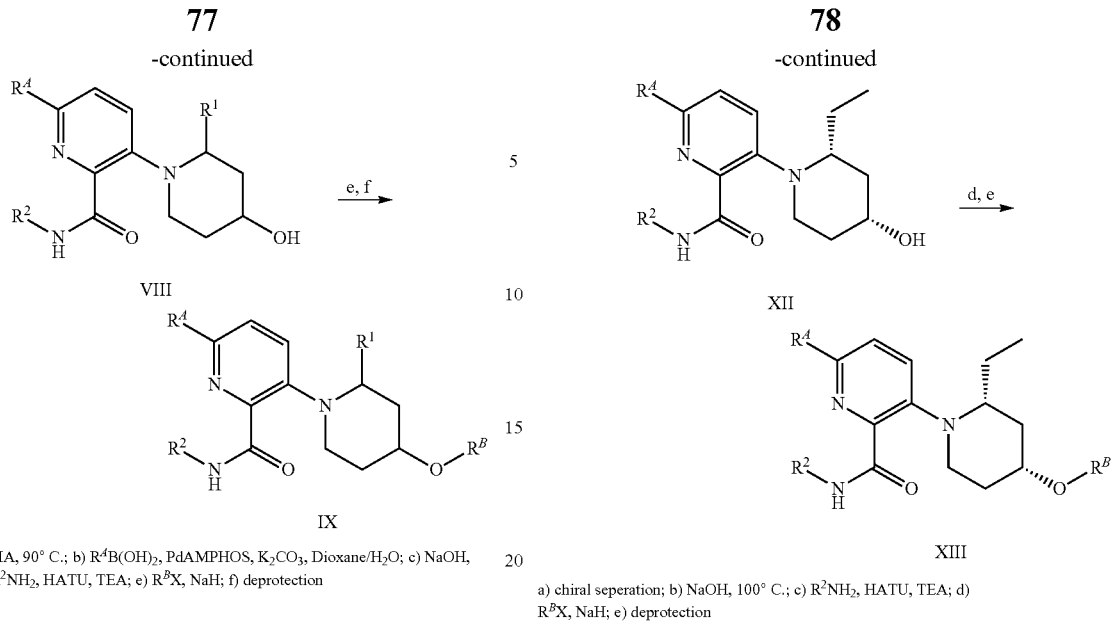

a) DIEA, DMA, 90° C.; b) R^A B(OH)₂, PdAMPHOS, K₂CO₃, Dioxane/H₂O; c) NaOH, 100° C.; d) R²NH₂, HATU, TEA; e) R^B X, NaH; f) deprotection Heating of 6-bromo-3-fluoropicolinonitrile with a 2-R¹-piperidin-4-ol (cis- or trans-racemate) in the presence of organic base such as N,N-diisopropylethylamine yields compound VI, which is subjected to an organometallic coupling reaction such as Suzuki-Miyaura reaction with $R^4$—$B(OH)_2$ or its corresponding ester to produce compound VII. Subsequently, hydrolysis of cyano to acid and then a standard HATU amide coupling with $R^2$—$NH_2$ yield compound VIII. Formation of ether by coupling the alkoxide of VIII with an electrophilic aryl halide ($R^B$—X) yields compound IX. If $R^2$ contains a protecting group, then an additional deprotection step takes place to produce IX.

In some embodiments, compounds described herein are prepared as described in Scheme D.

a) chiral seperation; b) NaOH, 100° C.; c) R²NH₂, HATU, TEA; d) R^B X, NaH; e) deprotection The cis-racemate VII is subjected to chiral separation by Chiral-Prep-HPLC, yielding two optically pure cis-isomers, X and XI. Their absolute stereochemistries have not been determined yet. Compound X is hydrolyzed with NaOH to produce the acid intermediate, which is converted to compound XII via HATU-mediated amide coupling. The conversion to XIII is achieved by a similar manner as described by step e & f in Scheme C. The other stereoisomer from XI is obtained by the same route. If $R^2$ contains a protecting group, then an additional deprotection step takes place to produce XIII.

In some embodiments, compounds described herein are prepared as described in Scheme E.

Scheme D

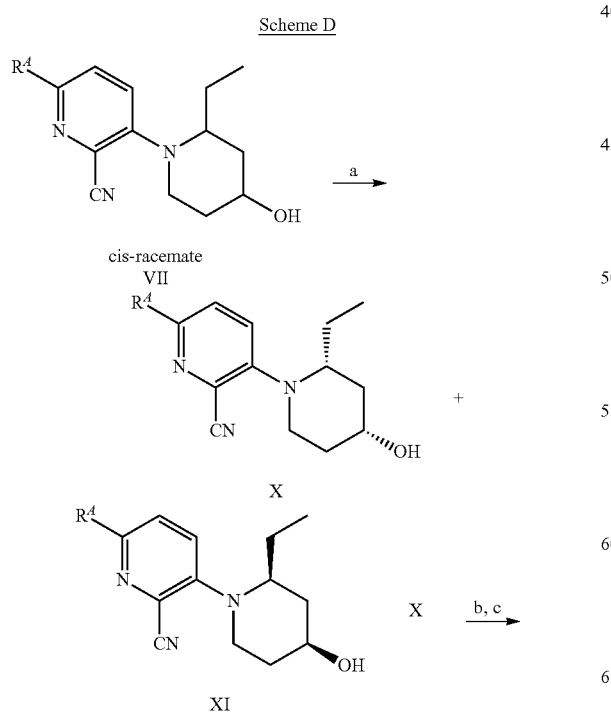

Scheme E

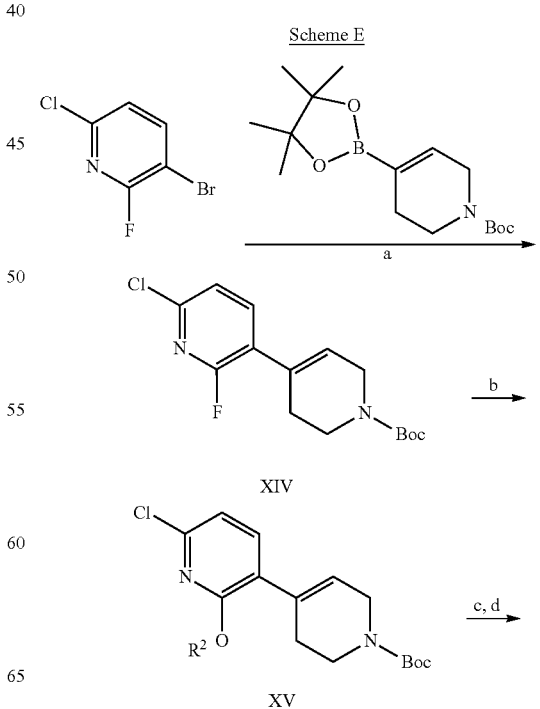

-continued

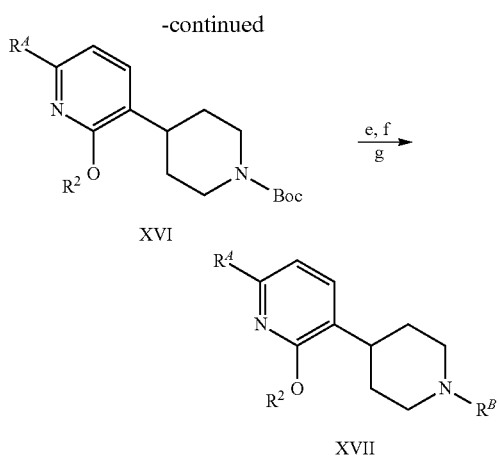

XVI

XVII a) Pd(dppf)Cl₂, K₂CO₃, 100° C.; b) R—OH, NaH, DMF, RT; c) R⁴B(OH)₂, PdAMPHOS, K₂CO₃, Dioxane/H₂O; d) Pd/C, H₂; e) TFA, DCM; f) R^B X, DIEA; g) deprotection Compound XIV is prepared by Suzuki-Miyaura coupling reaction with N-Boc-1,2,3,6-tetrahydropyridine-4-boronic acid pinacol ester, which reacts with an alkoxide to afford XV. Subsequently, introduction of $R^4$ by Suzuki-Miyaura coupling reaction with $R^4$—B(OH)₂ or Stille coupling with $R^4$—SnBu₃ and then reduction of the tetrahydropyridine yield compound XVI. The Boc group is removed by an acid and the final compound XVII is formed via standard $S_N2$ reaction with $R^B$—X in the presence of an organic base such as DIEA. If $R^2$ contains a protecting group, then an additional deprotection step takes place to produce XVII.

In some embodiments, compounds described herein are prepared as described in Scheme F.

Scheme F

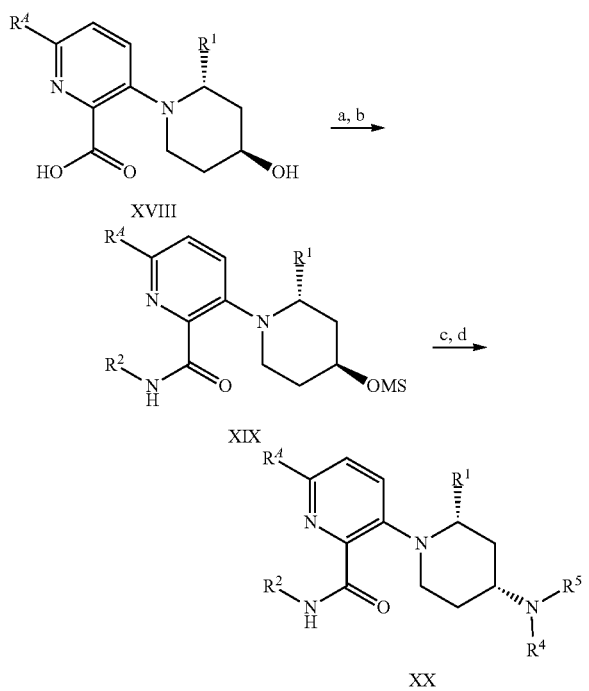

a) R²NH₂, HATU, TEA; b) MsCl, TEA; c) NHR⁴R⁵, Cs₂CO₃ or NaH; d) deprotection

HATU-mediated coupling reaction of XVIII yields the amide intermediate, which is subsequently subjected to mesylation of the hydroxy group with MsCl in the presence of an organic base such as TEA to produce compound XIX. The mesylate undergoes stereochemistry inversion to compound XX via $S_N2$ reaction with a nucleophile. If $R^2$ contains a protecting group, then an additional deprotection step takes place to produce XX.

In some embodiments, compounds described herein are synthesized as outlined in the Examples.

Certain Terminology

Unless otherwise stated, the following terms used in this application have the definitions given below. The use of the term "including" as well as other forms, such as "include", "includes," and "included," is not limiting. The section headings used herein are for organizational purposes only and are not to be construed as limiting the subject matter described.

As used herein, $C_1$-$C_x$ includes $C_1$-$C_2$, $C_1$-$C_3$ ... $C_1$-$C_x$. By way of example only, a group designated as "$C_1$-$C_6$" indicates that there are one to six carbon atoms in the moiety, i.e. groups containing 1 carbon atom, 2 carbon atoms, 3 carbon atoms or 4 carbon atoms. Thus, by way of example only, "$C_1$-$C_4$ alkyl" indicates that there are one to four carbon atoms in the alkyl group, i.e., the alkyl group is selected from among methyl, ethyl, propyl, iso-propyl, n-butyl, iso-butyl, sec-butyl, and t-butyl.

An "alkyl" group refers to an aliphatic hydrocarbon group. The alkyl group is branched or straight chain. In some embodiments, the "alkyl" group has 1 to 10 carbon atoms, i.e. a $C_1$-$C_{10}$alkyl. Whenever it appears herein, a numerical range such as "1 to 10" refers to each integer in the given range; e.g., "1 to 10 carbon atoms" means that the alkyl group consist of 1 carbon atom, 2 carbon atoms, 3 carbon atoms, etc., up to and including 10 carbon atoms, although the present definition also covers the occurrence of the term "alkyl" where no numerical range is designated. In some embodiments, an alkyl is a $C_1$-$C_6$alkyl. In one aspect the alkyl is methyl, ethyl, propyl, iso-propyl, n-butyl, iso-butyl, sec-butyl, or t-butyl. Typical alkyl groups include, but are in no way limited to, methyl, ethyl, propyl, isopropyl, butyl, isobutyl, sec-butyl, tertiary butyl, pentyl, neopentyl, or hexyl.

An "alkylene" group refers to a divalent alkyl radical. Any of the above mentioned monovalent alkyl groups may be an alkylene by abstraction of a second hydrogen atom from the alkyl. In some embodiments, an alkylene is a $C_1$-$C_6$alkylene. In other embodiments, an alkylene is a $C_1$-$C_4$alkylene. Typical alkylene groups include, but are not limited to, —CH₂—, —CH₂CH₂—, —CH₂CH₂CH₂—, —CH₂CH₂CH₂CH₂—, and the like. In some embodiments, an alkylene is —CH₂—.

An "alkoxy" group refers to a (alkyl)O— group, where alkyl is as defined herein.

The term "alkylamine" refers to the —N(alkyl)$_x$H$_y$ group, where x is 0 and y is 2, or where x is 1 and y is 1, or where x is 2 and y is 0.

An "hydroxyalkyl" refers to an alkyl in which one hydrogen atom is replaced by a hydroxyl. In some embodiments, a hydroxyalkyl is a $C_1$-$C_4$hydroxyalkyl. Typical hydroxyalkyl groups include, but are not limited to, —CH₂OH, —CH₂CH₂OH, —CH₂CH₂CH₂OH, —CH₂CH₂CH₂CH₂OH, and the like.

An "aminoalkyl" refers to an alkyl in which one hydrogen atom is replaced by an amino. In some embodiments, aminoalkyl is a $C_1$-$C_4$aminoalkyl. Typical aminoalkyl groups include, but are not limited to, —$CH_2NH_2$, —$CH_2CH_2NH_2$, —$CH_2CH_2CH_2NH_2$, —$CH_2CH_2CH_2CH_2NH_2$, and the like.

The term "alkenyl" refers to a type of alkyl group in which at least one carbon-carbon double bond is present. In one embodiment, an alkenyl group has the formula —C(R)=$CR_2$, wherein R refers to the remaining portions of the alkenyl group, which may be the same or different. In some embodiments, R is H or an alkyl. In some embodiments, an alkenyl is selected from ethenyl (i.e., vinyl), propenyl (i.e., allyl), butenyl, pentenyl, pentadienyl, and the like. Non-limiting examples of an alkenyl group include —CH=$CH_2$, —C($CH_3$)=$CH_2$, —CH=$CHCH_3$, —C($CH_3$)=$CHCH_3$, and —$CH_2$CH=$CH_2$.

The term "alkynyl" refers to a type of alkyl group in which at least one carbon-carbon triple bond is present. In one embodiment, an alkenyl group has the formula —C≡C—R, wherein R refers to the remaining portions of the alkynyl group. In some embodiments, R is H or an alkyl. In some embodiments, an alkynyl is selected from ethynyl, propynyl, butynyl, pentynyl, hexynyl, and the like. Non-limiting examples of an alkynyl group include —C≡CH, —C≡$CCH_3$—C≡$CCH_2CH_3$, —$CH_2$C≡CH.

The term "heteroalkyl" refers to an alkyl group in which one or more skeletal atoms of the alkyl are selected from an atom other than carbon, e.g., oxygen, nitrogen (e.g. —NH—, —N(alkyl)-, sulfur, or combinations thereof. A heteroalkyl is attached to the rest of the molecule at a carbon atom of the heteroalkyl. In one aspect, a heteroalkyl is a $C_1$-$C_6$heteroalkyl.

The term "aromatic" refers to a planar ring having a delocalized π-electron system containing 4n+2 π electrons, where n is an integer. The term "aromatic" includes both carbocyclic aryl ("aryl", e.g., phenyl) and heterocyclic aryl (or "heteroaryl" or "heteroaromatic") groups (e.g., pyridine). The term includes monocyclic or fused-ring polycyclic (i.e., rings which share adjacent pairs of carbon atoms) groups.

The term "carbocyclic" or "carbocycle" refers to a ring or ring system where the atoms forming the backbone of the ring are all carbon atoms. The term thus distinguishes carbocyclic from "heterocyclic" rings or "heterocycles" in which the ring backbone contains at least one atom which is different from carbon. In some embodiments, a carbocycle is a monocyclic carbocycle or a bicyclic carbocycle. In some embodiments, a carbocycle is a monocyclic carbocycle. Carbocycles are non-aromatic or aromatic. Non-aromatic carbocycles are saturated or partially unsaturated. In some embodiments, a carbocycle is a bicyclic carbocycle. In some embodiments, at least one of the two rings of a bicyclic carbocycle is aromatic. In some embodiments, both rings of a bicyclic carbocycle are aromatic. Carbocycles include aryls and cycloalkyls.

As used herein, the term "aryl" refers to an aromatic ring wherein each of the atoms forming the ring is a carbon atom. In one aspect, aryl is phenyl or a naphthyl. In some embodiments, an aryl is a phenyl. In some embodiments, an aryl is a phenyl, naphthyl, indanyl, indenyl, or tetrahyodronaphthyl. In some embodiments, an aryl is a $C_6$-$C_{10}$aryl. Depending on the structure, an aryl group is a monoradical or a diradical (i.e., an arylene group).

The term "cycloalkyl" refers to a monocyclic, bicyclic or polycyclic aliphatic, non-aromatic radical, wherein each of the atoms forming the ring (i.e. skeletal atoms) is a carbon atom. In some embodiments, cycloalkyls are spirocyclic or bridged compounds. In some embodiments, cycloalkyls are optionally fused with an aromatic ring, and the point of attachment is at a carbon that is not an aromatic ring carbon atom. Cycloalkyl groups include groups having from 3 to 10 ring atoms. In some embodiments, cycloalkyl groups are selected from among cyclopropyl, cyclobutyl, cyclopentyl, cyclopentenyl, cyclohexyl, cyclohexenyl, cycloheptyl, cyclooctyl, spiro[2.2]pentyl, norbornyl, norbornenyl, bicycle[1.1.1]pentyl, adamantyl, norbornyl, norbornenyl, decalinyl, or 7,7-dimethyl-bicyclo[2.2.1]heptanyl. In some embodiments, a cycloalkyl is a $C_3$-$C_6$cycloalkyl. In some embodiments, a cycloalkyl is a monocyclic cycloalkyl. Monocyclic cycloalkyls include, but are not limited to, cyclopropyl, cyclobutyl, cyclopentyl, cyclohexyl, cycloheptyl, and cyclooctyl. Polycyclic cycloalkyls include, for example, adamantyl, norbornyl (i.e., bicyclo[2.2.1]heptanyl), norbornenyl, decalinyl, 7,7-dimethyl-bicyclo[2.2.1]heptanyl, and the like.

The term "halo" or, alternatively, "halogen" or "halide" means fluoro, chloro, bromo or iodo. In some embodiments, halo is fluoro, chloro, or bromo.

The term "fluoroalkyl" refers to an alkyl in which one or more hydrogen atoms are replaced by a fluorine atom. In one aspect, a fluoroalkyl is a $C_1$-$C_6$fluoroalkyl.

The term "heterocycle" or "heterocyclic" refers to heteroaromatic rings (also known as heteroaryls) and heterocycloalkyl rings containing one to four heteroatoms in the ring(s), where each heteroatom in the ring(s) is selected from O, S and N, wherein each heterocyclic group has from 3 to 10 atoms in its ring system, and with the proviso that any ring does not contain two adjacent O or S atoms. Non-aromatic heterocyclic groups (also known as heterocycloalkyls) include rings having 3 to 10 atoms in its ring system and aromatic heterocyclic groups include rings having 5 to 10 atoms in its ring system. The heterocyclic groups include benzo-fused ring systems. Examples of non-aromatic heterocyclic groups are pyrrolidinyl, tetrahydrofuranyl, dihydrofuranyl, tetrahydrothienyl, oxazolidinonyl, tetrahydropyranyl, dihydropyranyl, tetrahydrothiopyranyl, piperidinyl, morpholinyl, thiomorpholinyl, thioxanyl, piperazinyl, aziridinyl, azetidinyl, oxetanyl, thietanyl, homopiperidinyl, oxepanyl, thiepanyl, oxazepinyl, diazepinyl, thiazepinyl, 1,2,3,6-tetrahydropyridinyl, pyrrolin-2-yl, pyrrolin-3-yl, indolinyl, 2H-pyranyl, 4H-pyranyl, dioxanyl, 1,3-dioxolanyl, pyrazolinyl, dithianyl, dithiolanyl, dihydropyranyl, dihydrothienyl, dihydrofuranyl, pyrazolidinyl, imidazolinyl, imidazolidinyl, 3-azabicyclo[3.1.0]hexanyl, 3-azabicyclo[4.1.0]heptanyl, 3H-indolyl, indolin-2-onyl, isoindolin-1-onyl, isoindoline-1,3-dionyl, 3,4-dihydroisoquinolin-1(2H)-onyl, 3,4-dihydroquinolin-2(1H)-onyl, isoindoline-1,3-dithionyl, benzo[d]oxazol-2(3H)-onyl, 1H-benzo[d]imidazol-2(3H)-onyl, benzo[d]thiazol-2(3H)-onyl, and quinolizinyl. Examples of aromatic heterocyclic groups are pyridinyl, imidazolyl, pyrimidinyl, pyrazolyl, triazolyl, pyrazinyl, tetrazolyl, furyl, thienyl, isoxazolyl, thiazolyl, oxazolyl, isothiazolyl, pyrrolyl, quinolinyl, isoquinolinyl, indolyl, benzimidazolyl, benzofuranyl, cinnolinyl, indazolyl, indolizinyl, phthalazinyl, pyridazinyl, triazinyl, isoindolyl, pteridinyl, purinyl, oxadiazolyl, thiadiazolyl, furazanyl, benzofurazanyl, benzothiophenyl, benzothiazolyl, benzoxazolyl, quinazolinyl, quinoxalinyl, naphthyridinyl, and furopyridinyl. The foregoing groups are either C-attached (or C-linked) or N-attached where such is possible. For instance, a group derived from pyrrole includes both pyrrol-1-yl (N-attached) or pyrrol-3-yl (C-attached). Further, a group derived from imidazole includes imidazol-1-yl or imidazol-3-yl (both N-attached) or imidazol-2-yl, imidazol-4-yl or imidazol-5-yl (all C-attached). The heterocyclic groups include benzo-fused ring systems. Non-aromatic heterocycles are optionally substituted with one or two oxo (=O) moieties, such as pyrrolidin-2-one. In some embodiments, at least one of the two rings of a bicyclic heterocycle is aromatic. In some embodiments, both rings of a bicyclic heterocycle are aromatic.

The terms "heteroaryl" or, alternatively, "heteroaromatic" refers to an aryl group that includes one or more ring heteroatoms selected from nitrogen, oxygen and sulfur. Illustrative examples of heteroaryl groups include monocyclic heteroaryls and bicyclic heteroaryls. Monocyclic heteroaryls include pyridinyl, imidazolyl, pyrimidinyl, pyrazolyl, triazolyl, pyrazinyl, tetrazolyl, furyl, thienyl, isoxazolyl, thiazolyl, oxazolyl, isothiazolyl, pyrrolyl, pyridazinyl, triazinyl, oxadiazolyl, thiadiazolyl, and furazanyl. Monocyclic heteroaryls include indolizine, indole, benzofuran, benzothiophene, indazole, benzimidazole, purine, quinolizine, quinoline, isoquinoline, cinnoline, phthalazine, quinazoline, quinoxaline, 1,8-naphthyridine, and pteridine. In some embodiments, a heteroaryl contains 0-4 N atoms in the ring. In some embodiments, a heteroaryl contains 1-4 N atoms in the ring. In some embodiments, a heteroaryl contains 0-4 N atoms, 0-1 O atoms, and 0-1 S atoms in the ring. In some embodiments, a heteroaryl contains 1-4 N atoms, 0-1 O atoms, and 0-1 S atoms in the ring. In some embodiments, heteroaryl is a $C_1$-$C_9$heteroaryl. In some embodiments, monocyclic heteroaryl is a $C_1$-$C_5$heteroaryl. In some embodiments, monocyclic heteroaryl is a 5-membered or 6-membered heteroaryl. In some embodiments, bicyclic heteroaryl is a $C_6$-$C_9$heteroaryl.

A "heterocycloalkyl" group refers to a cycloalkyl group that includes at least one heteroatom selected from nitrogen, oxygen and sulfur. In some embodiments, a heterocycloalkyl is fused with an aryl or heteroaryl. In some embodiments, the heterocycloalkyl is oxazolidinonyl, pyrrolidinyl, tetrahydrofuranyl, tetrahydrothienyl, tetrahydropyranyl, tetrahydrothiopyranyl, piperidinyl, morpholinyl, thiomorpholinyl, piperazinyl, piperidin-2-onyl, pyrrolidine-2,5-dithionyl, pyrrolidine-2,5-dionyl, pyrrolidinonyl, imidazolidinyl, imidazolidin-2-onyl, or thiazolidin-2-onyl. The term heterocycloalkyl also includes all ring forms of the carbohydrates, including but not limited to the monosaccharides, the disaccharides and the oligosaccharides. In one aspect, a heterocycloalkyl is a $C_2$-$C_{10}$heterocycloalkyl. In another aspect, a heterocycloalkyl is a $C_4$-$C_{10}$heterocycloalkyl. In some embodiments, a heterocycloalkyl contains 0-2 N atoms in the ring. In some embodiments, a heterocycloalkyl contains 0-2 N atoms, 0-2 O atoms and 0-1 S atoms in the ring.

The term "bond" or "single bond" refers to a chemical bond between two atoms, or two moieties when the atoms joined by the bond are considered to be part of larger substructure. In one aspect, when a group described herein is a bond, the referenced group is absent thereby allowing a bond to be formed between the remaining identified groups.

The term "moiety" refers to a specific segment or functional group of a molecule. Chemical moieties are often recognized chemical entities embedded in or appended to a molecule.

The term "optionally substituted" or "substituted" means that the referenced group is optionally substituted with one or more additional group(s) individually and independently selected from halogen, —CN, —NH$_2$, —NH(alkyl), —N(alkyl)$_2$, —OH, —CO$_2$H, —CO$_2$alkyl, —C(=O)NH$_2$, —C(=O)NH(alkyl), —C(=O)N(alkyl)$_2$, —S(=O)$_2$NH$_2$, —S(=O)$_2$NH(alkyl), —S(=O)$_2$N(alkyl)$_2$, alkyl, cycloalkyl, fluoroalkyl, heteroalkyl, alkoxy, fluoroalkoxy, heterocycloalkyl, aryl, heteroaryl, aryloxy, alkylthio, arylthio, alkylsulfoxide, arylsulfoxide, alkylsulfone, and arylsulfone. In some other embodiments, optional substituents are independently selected from halogen, —CN, —NH$_2$, —NH(CH$_3$), —N(CH$_3$)$_2$, —OH, —CO$_2$H, —CO$_2$(C$_1$-C$_4$alkyl), —C(=O)NH$_2$, —C(=O)NH(C$_1$-C$_4$alkyl), —C(=O)N(C$_1$-C$_4$alkyl)$_2$, —S(=O)$_2$NH$_2$, —S(=O)$_2$NH(C$_1$-C$_4$alkyl), —S(=O)$_2$N(C$_1$-C$_4$alkyl)$_2$, C$_1$-C$_4$alkyl, C$_3$-C$_6$cycloalkyl, C$_1$-C$_4$fluoroalkyl, C$_1$-C$_4$heteroalkyl, C$_1$-C$_4$alkoxy, C$_1$-C$_4$fluoroalkoxy, —SC$_1$-C$_4$alkyl, —S(=O)C$_1$-C$_4$alkyl, and —S(=O)$_2$C$_1$-C$_4$alkyl. In some other embodiments, optional substituents are independently selected from halogen, —CN, —NH$_2$, —NH(CH$_3$), —N(CH$_3$)$_2$, —OH, —CO$_2$H, —CO$_2$(C$_1$-C$_4$alkyl), —C(=O)NH$_2$, —C(=O)NH(C$_1$-C$_4$alkyl), —C(=O)N(C$_1$-C$_4$alkyl)$_2$, —S(=O)$_2$NH$_2$, —S(=O)$_2$NH(C$_1$-C$_4$alkyl), —S(=O)$_2$N(C$_1$-C$_4$alkyl)$_2$, C$_1$-C$_4$alkyl, C$_3$-C$_6$cycloalkyl, C$_2$-C$_6$ heterocycloalkyl, C$_1$-C$_4$fluoroalkyl, C$_1$-C$_4$heteroalkyl, C$_1$-C$_4$alkoxy, C$_1$-C$_4$fluoroalkoxy, —SC$_1$-C$_4$alkyl, —S(=O)C$_1$-C$_4$alkyl, and —S(=O)$_2$C$_1$-C$_4$alkyl. In some embodiments, optional substituents are independently selected from halogen, —CN, —NH$_2$, —OH, —NH(CH$_3$), —N(CH$_3$)$_2$, —CH$_3$, —CH$_2$CH$_3$, —CF$_3$, —OCH$_3$, and —OCF$_3$. In some embodiments, substituted groups are substituted with one or two of the preceding groups. In some embodiments, an optional substituent on an aliphatic carbon atom (acyclic or cyclic) includes oxo (=O).

The term "acceptable" with respect to a formulation, composition or ingredient, as used herein, means having no persistent detrimental effect on the general health of the subject being treated.

The term "modulate" as used herein, means to interact with a target either directly or indirectly so as to alter the activity of the target, including, by way of example only, to enhance the activity of the target, to inhibit the activity of the target, to limit the activity of the target, or to extend the activity of the target.

The term "modulator" as used herein, refers to a molecule that interacts with a target either directly or indirectly. The interactions include, but are not limited to, the interactions of an agonist, partial agonist, an inverse agonist, antagonist, degrader, or combinations thereof. In some embodiments, a modulator is an agonist.

The terms "administer," "administering", "administration," and the like, as used herein, refer to the methods that may be used to enable delivery of compounds or compositions to the desired site of biological action. These methods include, but are not limited to oral routes, intraduodenal routes, parenteral injection (including intravenous, subcutaneous, intraperitoneal, intramuscular, intravascular or infusion), topical and rectal administration. Those of skill in the art are familiar with administration techniques that can be employed with the compounds and methods described herein. In some embodiments, the compounds and compositions described herein are administered orally.

The terms "co-administration" or the like, as used herein, are meant to encompass administration of the selected therapeutic agents to a single patient, and are intended to include treatment regimens in which the agents are administered by the same or different route of administration or at the same or different time.

The terms "effective amount" or "therapeutically effective amount," as used herein, refer to a sufficient amount of an agent or a compound being administered, which will relieve to some extent one or more of the symptoms of the disease or condition being treated. The result includes reduction and/or alleviation of the signs, symptoms, or causes of a disease, or any other desired alteration of a biological system. For example, an "effective amount" for therapeutic uses is the amount of the composition comprising a compound as disclosed herein required to provide a clinically significant decrease in disease symptoms. An appropriate "effective" amount in any individual case is optionally determined using techniques, such as a dose escalation study.

The terms "enhance" or "enhancing," as used herein, means to increase or prolong either in potency or duration a desired effect. Thus, in regard to enhancing the effect of therapeutic agents, the term "enhancing" refers to the ability to increase or prolong, either in potency or duration, the effect of other therapeutic agents on a system. An "enhancing-effective amount," as used herein, refers to an amount adequate to enhance the effect of another therapeutic agent in a desired system.

The term "pharmaceutical combination" as used herein, means a product that results from the mixing or combining of more than one active ingredient and includes both fixed and non-fixed combinations of the active ingredients. The term "fixed combination" means that the active ingredients, e.g. a compound of Formula (A) or Formula (I), or a pharmaceutically acceptable salt thereof, and a co-agent, are both administered to a patient simultaneously in the form of a single entity or dosage. The term "non-fixed combination" means that the active ingredients, e.g. a compound of Formula (A) or Formula (I), or a pharmaceutically acceptable salt thereof, and a co-agent, are administered to a patient as separate entities either simultaneously, concurrently or sequentially with no specific intervening time limits, wherein such administration provides effective levels of the two compounds in the body of the patient. The latter also applies to cocktail therapy, e.g. the administration of three or more active ingredients.

The terms "article of manufacture" and "kit" are used as synonyms.

The term "subject" or "patient" encompasses mammals. Examples of mammals include, but are not limited to, any member of the Mammalian class: humans, non-human primates such as chimpanzees, and other apes and monkey species; farm animals such as cattle, horses, sheep, goats, swine; domestic animals such as rabbits, dogs, and cats; laboratory animals including rodents, such as rats, mice and guinea pigs, and the like. In one aspect, the mammal is a human.

The terms "treat," "treating" or "treatment," as used herein, include alleviating, abating or ameliorating at least one symptom of a disease or condition, preventing additional symptoms, inhibiting the disease or condition, e.g., arresting the development of the disease or condition, relieving the disease or condition, causing regression of the disease or condition, relieving a condition caused by the disease or condition, or stopping the symptoms of the disease or condition either prophylactically and/or therapeutically.

Pharmaceutical Compositions

In some embodiments, the compounds described herein are formulated into pharmaceutical compositions. Pharmaceutical compositions are formulated in a conventional manner using one or more pharmaceutically acceptable inactive ingredients that facilitate processing of the active compounds into preparations that are used pharmaceutically. Proper formulation is dependent upon the route of administration chosen. A summary of pharmaceutical compositions described herein is found, for example, in Remington: The Science and Practice of Pharmacy, Nineteenth Ed (Easton, Pa.: Mack Publishing Company, 1995); Hoover, John E., Remington's Pharmaceutical Sciences, Mack Publishing Co., Easton, Pennsylvania 1975; Liberman, H. A. and Lachman, L., Eds., Pharmaceutical Dosage Forms, Marcel Decker, New York, N.Y., 1980; and Pharmaceutical Dosage Forms and Drug Delivery Systems, Seventh Ed. (Lippincott Williams & Wilkins 1999), herein incorporated by reference for such disclosure.

In some embodiments, the compounds described herein are administered either alone or in combination with pharmaceutically acceptable carriers, excipients or diluents, in a pharmaceutical composition. Administration of the compounds and compositions described herein can be effected by any method that enables delivery of the compounds to the site of action. These methods include, though are not limited to delivery via enteral routes (including oral, gastric or duodenal feeding tube, rectal suppository and rectal enema), parenteral routes (injection or infusion, including intraarterial, intracardiac, intradermal, intraduodenal, intramedullary, intramuscular, intraosseous, intraperitoneal, intrathecal, intravascular, intravenous, intravitreal, epidural and subcutaneous), inhalational, transdermal, transmucosal, sublingual, buccal and topical (including epicutaneous, dermal, enema, eye drops, ear drops, intranasal, vaginal) administration, although the most suitable route may depend upon for example the condition and disorder of the recipient. By way of example only, compounds described herein can be administered locally to the area in need of treatment, by for example, local infusion during surgery, topical application such as creams or ointments, injection, catheter, or implant. The administration can also be by direct injection at the site of a diseased tissue or organ.

In some embodiments, pharmaceutical compositions suitable for oral administration are presented as discrete units such as capsules, cachets or tablets each containing a predetermined amount of the active ingredient; as a powder or granules; as a solution or a suspension in an aqueous liquid or a non-aqueous liquid; or as an oil-in-water liquid emulsion or a water-in-oil liquid emulsion. In some embodiments, the active ingredient is presented as a bolus, electuary or paste.

Pharmaceutical compositions which can be used orally include tablets, push-fit capsules made of gelatin, as well as soft, sealed capsules made of gelatin and a plasticizer, such as glycerol or sorbitol. Tablets may be made by compression or molding, optionally with one or more accessory ingredients. Compressed tablets may be prepared by compressing in a suitable machine the active ingredient in a free-flowing form such as a powder or granules, optionally mixed with binders, inert diluents, or lubricating, surface active or dispersing agents. Molded tablets may be made by molding in a suitable machine a mixture of the powdered compound moistened with an inert liquid diluent. In some embodiments, the tablets are coated or scored and are formulated so as to provide slow or controlled release of the active ingredient therein. All formulations for oral administration should be in dosages suitable for such administration. The push-fit capsules can contain the active ingredients in admixture with filler such as lactose, binders such as starches, and/or lubricants such as talc or magnesium stearate and, optionally, stabilizers. In soft capsules, the active compounds may be dissolved or suspended in suitable liquids, such as fatty oils, liquid paraffin, or liquid polyethylene glycols. In some embodiments, stabilizers are added. Dragee cores are provided with suitable coatings. For this purpose, concentrated sugar solutions may be used, which may optionally contain gum arabic, talc, polyvinyl pyrrolidone, carbopol gel, polyethylene glycol, and/or titanium dioxide, lacquer solutions, and suitable organic solvents or solvent mixtures. Dyestuffs or pigments may be added to the tablets or Dragee coatings for identification or to characterize different combinations of active compound doses.

In some embodiments, pharmaceutical compositions are formulated for parenteral administration by injection, e.g., by bolus injection or continuous infusion. Formulations for injection may be presented in unit dosage form, e.g., in ampoules or in multi-dose containers, with an added preservative. The compositions may take such forms as suspensions, solutions or emulsions in oily or aqueous vehicles, and may contain formulatory agents such as suspending, stabilizing and/or dispersing agents. The compositions may be presented in unit-dose or multi-dose containers, for example sealed ampoules and vials, and may be stored in powder form or in a freeze-dried (lyophilized) condition requiring only the addition of the sterile liquid carrier, for example, saline or sterile pyrogen-free water, immediately prior to use. Extemporaneous injection solutions and suspensions may be prepared from sterile powders, granules and tablets of the kind previously described.

Pharmaceutical compositions for parenteral administration include aqueous and non-aqueous (oily) sterile injection solutions of the active compounds which may contain antioxidants, buffers, bacteriostats and solutes which render the formulation isotonic with the blood of the intended recipient; and aqueous and non-aqueous sterile suspensions which may include suspending agents and thickening agents. Suitable lipophilic solvents or vehicles include fatty oils such as sesame oil, or synthetic fatty acid esters, such as ethyl oleate or triglycerides, or liposomes. Aqueous injection suspensions may contain substances which increase the viscosity of the suspension, such as sodium carboxymethyl cellulose, sorbitol, or dextran. Optionally, the suspension may also contain suitable stabilizers or agents which increase the solubility of the compounds to allow for the preparation of highly concentrated solutions.

Pharmaceutical compositions may also be formulated as a depot preparation. Such long acting formulations may be administered by implantation (for example subcutaneously or intramuscularly) or by intramuscular injection. Thus, for example, the compounds may be formulated with suitable polymeric or hydrophobic materials (for example, as an emulsion in an acceptable oil) or ion exchange resins, or as sparingly soluble derivatives, for example, as a sparingly soluble salt.

For buccal or sublingual administration, the compositions may take the form of tablets, lozenges, pastilles, or gels formulated in conventional manner. Such compositions may comprise the active ingredient in a flavored basis such as sucrose and acacia or tragacanth.

Pharmaceutical compositions may be administered topically, that is by non-systemic administration. This includes the application of a compound of the present invention externally to the epidermis or the buccal cavity and the instillation of such a compound into the ear, eye and nose, such that the compound does not significantly enter the blood stream. In contrast, systemic administration refers to oral, intravenous, intraperitoneal and intramuscular administration.

Pharmaceutical compositions suitable for topical administration include liquid or semi-liquid preparations suitable for penetration through the skin to the site of inflammation such as gels, liniments, lotions, creams, ointments or pastes, and drops suitable for administration to the eye, ear or nose. The active ingredient may comprise, for topical administration, from 0.001% to 10% w/w, for instance from 1% to 2% by weight of the formulation.

Pharmaceutical compositions for administration by inhalation are conveniently delivered from an insufflator, nebulizer pressurized packs or other convenient means of delivering an aerosol spray. Pressurized packs may comprise a suitable propellant such as dichlorodifluoromethane, trichlorofluoromethane, dichlorotetrafluoroethane, carbon dioxide or other suitable gas. In the case of a pressurized aerosol, the dosage unit may be determined by providing a valve to deliver a metered amount. Alternatively, for administration by inhalation or insufflation, pharmaceutical preparations may take the form of a dry powder composition, for example a powder mix of the compound and a suitable powder base such as lactose or starch. The powder composition may be presented in unit dosage form, in for example, capsules, cartridges, gelatin or blister packs from which the powder may be administered with the aid of an inhalator or insufflator.

It should be understood that in addition to the ingredients particularly mentioned above, the compounds and compositions described herein may include other agents conventional in the art having regard to the type of formulation in question, for example those suitable for oral administration may include flavoring agents.

Methods of Dosing and Treatment Regimens

In one embodiment, the compounds of Formula (A) or Formula (I), or a pharmaceutically acceptable salt thereof, are used in the preparation of medicaments for the treatment of diseases or conditions in a mammal that would benefit from modulation of melanocortin receptor activity. Methods for treating any of the diseases or conditions described herein in a mammal in need of such treatment, involves administration of pharmaceutical compositions that include at least one compound of Formula (A) or Formula (I) or a pharmaceutically acceptable salt, active metabolite, prodrug, or pharmaceutically acceptable solvate thereof, in therapeutically effective amounts to said mammal.

In certain embodiments, the compositions containing the compound(s) described herein are administered for prophylactic and/or therapeutic treatments. In certain therapeutic applications, the compositions are administered to a patient already suffering from a disease or condition, in an amount sufficient to cure or at least partially arrest at least one of the symptoms of the disease or condition. Amounts effective for this use depend on the severity and course of the disease or condition, previous therapy, the patient's health status, weight, and response to the drugs, and the judgment of the treating physician. Therapeutically effective amounts are optionally determined by methods including, but not limited to, a dose escalation and/or dose ranging clinical trial.

In prophylactic applications, compositions containing the compounds described herein are administered to a patient susceptible to or otherwise at risk of a particular disease, disorder or condition. Such an amount is defined to be a "prophylactically effective amount or dose." In this use, the precise amounts also depend on the patient's state of health, weight, and the like. When used in patients, effective amounts for this use will depend on the severity and course of the disease, disorder or condition, previous therapy, the patient's health status and response to the drugs, and the judgment of the treating physician. In one aspect, prophylactic treatments include administering to a mammal, who previously experienced at least one symptom of the disease being treated and is currently in remission, a pharmaceutical composition comprising a compound of Formula (A) or Formula (I), or a pharmaceutically acceptable salt thereof, in order to prevent a return of the symptoms of the disease or condition.

In certain embodiments wherein the patient's condition does not improve, upon the doctor's discretion the administration of the compounds are administered chronically, that is, for an extended period of time, including throughout the duration of the patient's life in order to ameliorate or otherwise control or limit the symptoms of the patient's disease or condition.

Once improvement of the patient's conditions has occurred, a maintenance dose is administered if necessary. Subsequently, in specific embodiments, the dosage or the frequency of administration, or both, is reduced, as a function of the symptoms, to a level at which the improved disease, disorder or condition is retained. In certain embodiments, however, the patient requires intermittent treatment on a long-term basis upon any recurrence of symptoms.

The amount of a given agent that corresponds to such an amount varies depending upon factors such as the particular compound, disease condition and its severity, the identity (e.g., weight, sex) of the subject or host in need of treatment, but nevertheless is determined according to the particular circumstances surrounding the case, including, e.g., the specific agent being administered, the route of administration, the condition being treated, and the subject or host being treated.

In general, however, doses employed for adult human treatment are typically in the range of 0.01 mg-2000 mg per day. In one embodiment, the desired dose is conveniently presented in a single dose or in divided doses administered simultaneously or at appropriate intervals, for example as two, three, four or more sub-doses per day.

In one embodiment, the daily dosages appropriate for the compound of Formula (A) or Formula (I), or a pharmaceutically acceptable salt thereof, described herein are from about 0.01 to about 50 mg/kg per body weight. In some embodiments, the daily dosage or the amount of active in the dosage form are lower or higher than the ranges indicated herein, based on a number of variables in regard to an individual treatment regime. In various embodiments, the daily and unit dosages are altered depending on a number of variables including, but not limited to, the activity of the compound used, the disease or condition to be treated, the mode of administration, the requirements of the individual subject, the severity of the disease or condition being treated, and the judgment of the practitioner.

Toxicity and therapeutic efficacy of such therapeutic regimens are determined by standard pharmaceutical procedures in cell cultures or experimental animals, including, but not limited to, the determination of the $LD_{50}$ and the $ED_{50}$. The dose ratio between the toxic and therapeutic effects is the therapeutic index and it is expressed as the ratio between $LD_{50}$ and $ED_{50}$. In certain embodiments, the data obtained from cell culture assays and animal studies are used in formulating the therapeutically effective daily dosage range and/or the therapeutically effective unit dosage amount for use in mammals, including humans. In some embodiments, the daily dosage amount of the compounds described herein lies within a range of circulating concentrations that include the $ED_{50}$ with minimal toxicity. In certain embodiments, the daily dosage range and/or the unit dosage amount varies within this range depending upon the dosage form employed and the route of administration utilized.

In any of the aforementioned aspects are further embodiments in which the effective amount of the compound of Formula (A) or Formula (I), or a pharmaceutically acceptable salt thereof, is: (a) systemically administered to the mammal; and/or (b) administered orally to the mammal; and/or (c) intravenously administered to the mammal; and/or (d) administered by injection to the mammal; and/or (e) administered topically to the mammal; and/or (f) administered non-systemically or locally to the mammal.

In any of the aforementioned aspects are further embodiments comprising single administrations of the effective amount of the compound, including further embodiments in which (i) the compound is administered once a day; or (ii) the compound is administered to the mammal multiple times over the span of one day.

In any of the aforementioned aspects are further embodiments comprising multiple administrations of the effective amount of the compound, including further embodiments in which (i) the compound is administered continuously or intermittently: as in a single dose; (ii) the time between multiple administrations is every 6 hours; (iii) the compound is administered to the mammal every 8 hours; (iv) the compound is administered to the mammal every 12 hours; (v) the compound is administered to the mammal every 24 hours. In further or alternative embodiments, the method comprises a drug holiday, wherein the administration of the compound is temporarily suspended or the dose of the compound being administered is temporarily reduced; at the end of the drug holiday, dosing of the compound is resumed. In one embodiment, the length of the drug holiday varies from 2 days to 1 year.

Combination Treatments

In certain instances, it is appropriate to administer at least one compound of Formula (A) or Formula (I), or a pharmaceutically acceptable salt thereof, in combination with one or more other therapeutic agents.

In one embodiment, the therapeutic effectiveness of one of the compounds described herein is enhanced by administration of an adjuvant (i.e., by itself the adjuvant has minimal therapeutic benefit, but in combination with another therapeutic agent, the overall therapeutic benefit to the patient is enhanced). Or, in some embodiments, the benefit experienced by a patient is increased by administering one of the compounds described herein with another agent (which also includes a therapeutic regimen) that also has therapeutic benefit.

In one specific embodiment, a compound of Formula (A) or Formula (I), or a pharmaceutically acceptable salt thereof, is co-administered with a second therapeutic agent, wherein the compound of Formula (A) or Formula (I), or a pharmaceutically acceptable salt thereof, and the second therapeutic agent modulate different aspects of the disease, disorder or condition being treated, thereby providing a greater overall benefit than administration of either therapeutic agent alone.

In any case, regardless of the disease, disorder or condition being treated, the overall benefit experienced by the patient is simply be additive of the two therapeutic agents or the patient experiences a synergistic benefit.

For combination therapies described herein, dosages of the co-administered compounds vary depending on the type of co-drug employed, on the specific drug employed, on the disease or condition being treated and so forth. In additional embodiments, when co-administered with one or more other therapeutic agents, the compound provided herein is administered either simultaneously with the one or more other therapeutic agents, or sequentially.

In combination therapies, the multiple therapeutic agents (one of which is one of the compounds described herein) are administered in any order or even simultaneously. If administration is simultaneous, the multiple therapeutic agents are, by way of example only, provided in a single, unified form, or in multiple forms (e.g., as a single pill or as two separate pills).

The compounds of Formula (A) or Formula (I), or a pharmaceutically acceptable salt thereof, as well as combination therapies, are administered before, during or after the occurrence of a disease or condition, and the timing of administering the composition containing a compound varies. Thus, in one embodiment, the compounds described herein are used as a prophylactic and are administered continuously to subjects with a propensity to develop conditions or diseases in order to prevent the occurrence of the disease or condition. In another embodiment, the compounds and compositions are administered to a subject during or as soon as possible after the onset of the symptoms. In specific embodiments, a compound described herein is administered as soon as is practicable after the onset of a disease or condition is detected or suspected, and for a length of time necessary for the treatment of the disease. In some embodiments, the length required for treatment varies, and the treatment length is adjusted to suit the specific needs of each subject.

EXAMPLES

The following examples are provided for illustrative purposes only and not to limit the scope of the claims provided herein.

Abbreviations

DIEA: N,N-diisopropylethylamine;
DMA: N,N-dimethylacetamide;
EtOAc: ethyl acetate
DMSO: dimethyl sulfoxide;
Pd(PPh$_3$)$_4$: tetrakis(triphenylphosphine)palladium(0)
Pd(dppf)Cl$_2$: [1,1'-bis(diphenylphosphino)ferrocene]palladium(II) dichloride;
CuI: copper(I) iodide;
PdAMphos: bis(di-tert-butyl(4-dimethylaminophenyl)phosphine)dichloropalladium(II);
TBAF: tetra-n-butylammonium fluoride;
P(t-Bu)$_3$: tri-tert-buytlphosphine;
HBF$_4$: tetrafluoroboric acid;
DBU: 1,8-diazabicyclo[5.4.0]undec-7-ene;
Prep-HPLC: preparative high performance liquid chromatography;
TFA: trifluoroacetic acid;
CH$_3$CN: acetonitrile;
MeOD: deuterated methanol;
CDCl$_3$: deuterated chloroform
DME: 1,2-dimethoxyethane;
H$_2$O: water;
KOAc: potassium acetate;
NaOAc: sodium acetate;
Cs$_2$CO$_3$: cesium carbonate
P-TsOH: p-toluenesulfonic acid;
NaNO$_2$: sodium nitrate;
THF: tetrahydrofuran;
DCM: dichloromethane;
NBS: N-bromosuccinimide;
NCS: N-chlorosuccinimide;
Br$_2$: bromine;
AgF: silver fluoride;
LiAlH$_4$: lithium aluminium hydride;
IBX: 2-iodoxybenzoic acid;
TEA: trimethylamine;
HOBT: hydroxybenzotriazole;
EDCI: 1-ethyl-3-(3-dimethylaminopropyl)carbodiimide;
Pd(PPh$_3$)$_2$Cl$_2$: bis(triphenylphosphine)palladium(II) dichloride;
Pd(dppf)Cl$_2$: [1,1'-Bis(diphenylphosphino)ferrocene]dichloropalladium(II);
PdAMphos or Pd (amphos)Cl$_2$ or: bis(di-tert-butyl(4-dimethylaminophenyl)phosphine)dichloropalladium (II);
Pd(DTBPF)Cl$_2$: [1,1'-bis(di-tert-butylphosphino)ferrocene]dichloropalladium(II);
rt: room temperature;
h: hour or hours;
CC: column chromatography.

Synthesis of Compounds

Example 1: 5-[(2R)-4-[4-chloro-2-(trifluoromethyl)benzoyl]-2-ethylpiperazin-1-yl]-2'-ethoxy-6-{[(3R)-1-methylpyrrolidin-3-yl]oxy}-2,3'-bipyridine (Cpd 1-2)

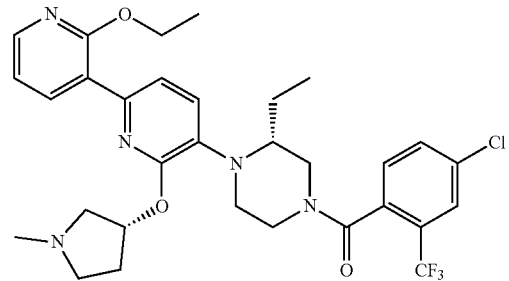 [SMILES: CCOc1ncccc1-c1ccc(N2CCN(C(=O)c3ccc(Cl)cc3C(F)(F)F)C[C@H]2CC)c(O[C@@H]2CCN(C)C2)n1]

Step 1-1, preparation of tert-butyl (3R)-3-ethyl-4-(2-nitropyridin-3-yl)piperazine-1-carboxylate: Into a 250-mL round-bottom flask purged and maintained with an inert atmosphere of nitrogen, was placed 3-fluoro-2-nitropyridine (5.0 g, 35 mmol), tert-butyl (R)-3-ethylpiperazine-1-carboxylate (9.3 g, 43 mmol), DIEA (14 g, 110 mmol), and DMA (50 mL). The resulting solution was stirred at 90° C. for 16 h, cooled to rt, and diluted with water (100 ml). The resulting solution was extracted with EtOAc (3×). The combined organic layers were washed with brine, dried over anhydrous sodium sulfate and concentrated. The residue was applied onto a silica gel column with ethyl acetate/petroleum ether (1:3). This resulted in the title compound (7.5 g, 63%) as yellow solid. LCMS (M+H)$^+$=337.2.

Step 1-2, preparation of tert-butyl (3R)-3-ethyl-4-(2-{[(3R)-1-methylpyrrolidin-3-yl]oxy}pyridin-3-yl)piperazine-1-carboxylate: Into a 100-mL round-bottom flask purged and maintained with an inert atmosphere of nitrogen, was placed (R)-1-methylpyrrolidine-3-ol (293 mg, 2.9 mmol) and DMF (4 mL). The resulting solution was treated with NaH (0.15 g, 3.86 mmol) and stirred at 0° C. for 20 min. The reaction was treated with tert-butyl (3R)-3-ethyl-4-(2-nitropyridin-3-yl)piperazine-1-carboxylate (650 mg, 1.93 mmol) in DMF (6 mL) and then was stirred at rt for 16 h. The reaction was then quenched by water (20 mL) and extracted with EtOAc (3×). The combined organic layers were washed with brine, dried over anhydrous sodium sulfate and concentrated. The residue was applied onto a silica gel column with DCM/MeOH (10:1). This resulted in the title compound (400 mg, 53%) as yellow oil. LCMS (M+H)$^+$=391.3.

Step 1-3, preparation of tert-butyl (3R)-4-(6-chloro-2-{[(3R)-1-methylpyrrolidin-3-yl]oxy}pyridin-3-yl)-3-ethylpiperazine-1-carboxylate: Into a 50-mL round-bottom flask purged and maintained with an inert atmosphere of nitrogen, was placed tert-butyl (3R)-3-ethyl-4-(2-{[(3R)-1-methylpyrrolidin-3-yl]oxy}pyridin-3-yl)piperazine-1-carboxylate (1.0 g, 2.6 mmol) and DMF (8 mL). The resulting solution was treated with NCS (980 mg, 7.34 mmol) in DMF (5 mL) at 17° C. and then stirred at 40° C. for 2 h. The crude product was purified by Flash-Prep-HPLC with the following conditions (IntelFlash-1): Column, C18 silica gel; mobile phase, Water (0.1% TFA) and CH$_3$CN(10% CH$_3$CN up to 56% in 6 min); Detector, UV 254 &220 nm. This resulted in the title compound (500 mg, 46%) as yellow oil. LCMS (M+H)$^+$=425.2.

Step 1-4, preparation of tert-butyl (3R)-4-(2'-ethoxy-6-{[(3R)-1-methylpyrrolidin-3-yl]oxy}-[2,3'-bipyridin]-5-yl)-3-ethylpiperazine-1-carboxylate: Into a 50-mL round-bottom flask purged and maintained with an inert atmosphere of nitrogen, was placed tert-butyl (3R)-4-(6-chloro-2-{[(3R)-1-methylpyrrolidin-3-yl]oxy}pyridin-3-yl)-3-ethylpiperazine-1-carboxylate (500 mg, 1.18 mmol), 2-ethoxypyridin-3-yl)boronic acid (590 mg, 3.53 mmol), potassium carbonate (500 mg, 3.62 mmol), PdAMPHOS (50 mg, 0.07 mmol) and dioxane (6 mL)/H$_2$O (0.6 mL). The resulting solution was degassed for 10 min with N$_2$ and stirred at 80° C. for 8 h. The reaction was cooled to rt, and the inorganic solid was filtered out. The filtrate was concentrated under vacuum. The residue was applied onto a silica gel column with dichloromethane/MeOH (10:1). This resulted in the title compound (300 mg, 50%) as yellow solid. LCMS (M+H)$^+$=512.5.

Step 1-5, preparation of 2'-ethoxy-5-[(2R)-2-ethylpiperazin-1-yl]-6-{[(3R)-1-methylpyrrolidin-3-yl]oxy}-2,3'-bipyridine trihydrochloride: Into a 50-mL round-bottom flask, was placed tert-butyl (3R)-4-(2'-ethoxy-6-{[(3R)-1-methylpyrrolidin-3-yl]oxy}-[2,3'-bipyridin]-5-yl)-3-ethylpiperazine-1-carboxylate (300 mg, 0.586 mmol) and DCM (2 mL). The resulting solution was treated with 4N—HCl in 1,4-dioxane (2 mL). The resulting solution was stirred at rt for 1 h and concentrated. This resulted the title compound (330 mg, 94%) as yellow solid. LCMS (M+H)$^+$=412.3.

Step 1-6, preparation of 5-[(2R)-4-[4-chloro-2-(trifluoromethyl)benzoyl]-2-ethylpiperazin-1-yl]-2'-ethoxy-6-{[(3R)-1-methylpyrrolidin-3-yl]oxy}-2,3'-bipyridine formate: Into a 50-mL round-bottom flask purged, was placed 4-chloro-2-(trifluoromethyl)benzoic acid (36 mg, 0.16 mmol), DMF (2 mL), HATU (70 mg, 0.18 mmol), DIEA (75 mg, 0.58 mmol), and 2'-ethoxy-5-[(2R)-2-ethylpiperazin-1-yl]-6-{[(3R)-1-methylpyrrolidin-3-yl]oxy}-2,3'-bipyridine trihydrochloride (80 mg, 0.13 mmol). The resulting solution was stirred at rt for 1 h. The crude product was purified by Prep-HPLC with the following conditions (Waters I): Column, SunFire Prep C18 OBD column, 5 um, 19*150 mm; mobile phase, Water (0.05% FA) and CH$_3$CN(16% CH$_3$CN up to 34% in 10 min); Detector, UV 220&254 nm. This resulted in the title compound (35 mg, 39%) as off-white solid. LCMS (M+H)$^+$=618.3.

The following compounds were prepared similarly to Example 1 with appropriate substituting reagents and substrates at different steps. Some examples may require an additional deprotection to the final products.

| Compound no. | MS (M + H)$^+$ |
|---|---|
| 1-3 | 576.3 |
| 1-5 | 615.4 |
| 1-6 | 570.4 |
| 1-7 | 604.3 |
| 1-17 | 617.5 |
| 1-18 | 615.3 |

Example 2: [2-({5-[(2R)-4-[4-chloro-2-(trifluoromethyl)benzoyl]-2-ethylpiperazin-1-yl]-2'-ethoxy-[2,3'-bipyridin]-6-yl}oxy)ethyl](methyl)amine (Cpd 1-15)

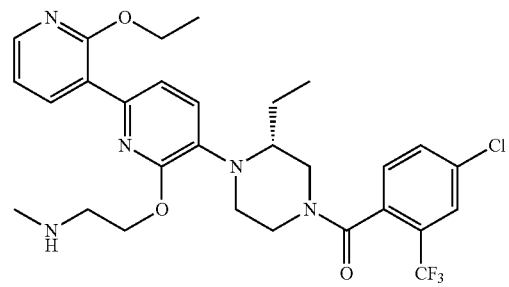 [SMILES: CCOc1ncccc1-c1ccc(N2CCN(C(=O)c3ccc(Cl)cc3C(F)(F)F)C[C@H]2CC)c(OCCNC)n1]

Step 2-1, preparation of tert-butyl (3R)-4-(2-{2-[benzyl(methyl)amino]ethoxy}pyridin-3-yl)-3-ethylpiperazine-1-carboxylate: Into a 50-mL 3-necked round-bottom flask purged and maintained with an inert atmosphere of nitrogen, was placed 2-(benzyl(methyl)aminoethane-1-ol (836 mg, 5.06 mmol) and DMF (15 mL). The solution was treated with NaH (181 mg, 7.54 mmol) at 0° C. and then stirred at 0° C. for 20 min. The reaction was treated with tert-butyl (3R)-3-ethyl-4-(2-nitropyridin-3-yl)piperazine-1-carboxylate (850 mg, 2.53 mmol) in DMF (15 mL). The resulting solution was stirred at rt for 2 h, quenched by water (50 mL), and extracted with EtOAc (3×). The combined organic layers were washed with brine, dried over anhydrous sodium sulfate and concentrated. The residue was applied onto a silica gel column with DCM/MeOH (10:1). This resulted in the title compound (910 mg, 79%) as white solid. LCMS (M+H)$^+$=455.3.

Step 2-2, preparation of tert-butyl (3R)-4-(2-{2-[benzyl(methyl)amino]ethoxy}-6-chloropyridin-3-yl)-3-ethylpiperazine-1-carboxylate: Into a 50-mL round-bottom flask purged and maintained with an inert atmosphere of nitrogen, was placed tert-butyl (3R)-4-(2-{2-[benzyl(methyl)amino]ethoxy}pyridin-3-yl)-3-ethylpiperazine-1-carboxylate (910 mg, 2.0 mmol) and DMF (15 mL). The solution was treated with NCS (267 mg, 2.0 mmol) at rt and then stirred at 60° C. for 5 h. During the reaction, an additional NCS (1.0 eq) was added into the reaction. The crude product was purified by Flash-Prep-HPLC with the following conditions (IntelFlash-1): Column, C18 silica gel; mobile phase, Water (0.1% TFA) and CH$_3$CN(10% CH$_3$CN up to 56% in 6 min); Detector, UV 254 &220 nm. This resulted in the title compound (350 mg, 36%) as yellow oil. LCMS (M+H)$^+$=489.3.

Step 2-3, preparation of tert-butyl (3R)-4-(6-{2-[benzyl(methyl)amino]ethoxy}-2'-ethoxy-[2,3'-bipyridin]-5-yl)-3-ethylpiperazine-1-carboxylate: Into a 50-mL round-bottom flask purged and maintained with an inert atmosphere of nitrogen, was placed tert-butyl (3R)-4-(2-{2-[benzyl(methyl)amino]ethoxy}-6-chloropyridin-3-yl)-3-ethylpiperazine-1-carboxylate (350 mg, 0.72 mmol) and dioxane/H₂O (6 mL/0.6 mL). To a resulting solution were added (2-ethoxypyridin-3-yl)boronic acid (240 mg, 1.4 mmol), PdAMPHOS (50 mg, 0.1 eq.) and potassium carbonate (300 mg, 2.17 mmol). The resulting solution was degassed for 5 min with N₂ and stirred at 80° C. for 1 h under N₂. The reaction was cooled to rt, and inorganic solid was filtered out. The filtrate was concentrated under vacuum. The residue was purified by a silica gel column eluting with dichloromethane/MeOH (10:1) to afford the title compound (320 mg, 78%) as yellow solid. LCMS (M+H)⁺=576.3.

Step 2-4, preparation of tert-butyl (3R)-4-{2'-ethoxy-6-[2-(methylamino)ethoxy]-[2,3'-bipyridin]-5-yl}-3-ethylpiperazine-1-carboxylate: Into a 50 mL autoclave, was placed tert-butyl (3R)-4-(6-{2-[benzyl(methyl)amino]ethoxy}-2'-ethoxy-[2,3'-bipyridin]-5-yl)-3-ethylpiperazine-1-carboxylate (90 mg, 0.16 mmol), MeOH (2 mL) and palladium hydroxide (5 mg, 0.2 eq). The flask was evacuated and flushed three times with nitrogen, followed by flushing with hydrogen. The mixture was stirred 2 h at room temperature under an 10 atm of hydrogen. The solid was filtered out through a pad of Celite. The filtrate was concentrated on vacuum to afford the title compound (77 mg, 100%). LCMS (M+H)⁺=486.6.

Step 2-5, preparation of tert-butyl (3R)-4-[6-(2-{[(benzyloxy)carbonyl](methyl)amino}ethoxy)-2'-ethoxy-[2,3'-bipyridin]-5-yl]-3-ethylpiperazine-1-carboxylate: Into a 8-mL vial, was placed tert-butyl (3R)-4-{2'-ethoxy-6-[2-(methylamino)ethoxy]-[2,3'-bipyridin]-5-yl}-3-ethylpiperazine-1-carboxylate (70 mg, 0.14 mmol), TEA (50 mg, 0.49 mmol), and DCM (1 mL). The resulting was treated with CbzCl (50 mg, 0.29 mmol) at 0° C. and stirred for 2 h at the same temperature. The reaction mixture was diluted with water (5 mL) and then extracted with CH₂Cl₂ (2×). The combined organic layers were washed with brine, dried, and concentrated under vacuum. This resulted in the title compound (90 mg, 100%) that was used in the next step without further purification. LCMS (M+H)⁺=620.3.

Step 2-6, preparation of benzyl N-[2-({2'-ethoxy-5-[(2R)-2-ethylpiperazin-1-yl]-[2,3'-bipyridin]-6-yl}oxy)ethyl]-N-methylcarbamate: Into a 8-mL vial, was placed tert-butyl (3R)-4-[6-(2-{[(benzyloxy)carbonyl](methyl)amino}ethoxy)-2'-ethoxy-[2,3'-bipyridin]-5-yl]-3-ethylpiperazine-1-carboxylate (90 mg, 0.15 mmol), TFA (0.2 mL) and DCM (1 mL). The resulting solution was stirred at rt for 2 h and concentrated under vacuum. The residue was dissolved in DCM (5 mL) and washed with saturated sodium bicarbonate solution (5 mL). The organic layer was washed with brine, dried and concentrated under vacuum. This resulted in the title compound (70 mg, 93%) as a yellow oil. LCMS (M+H)⁺=520.3.

Step 2-7, preparation of benzyl N-[2-({5-[(2R)-4-[4-chloro-2-(trifluoromethyl)benzoyl]-2-ethylpiperazin-1-yl]-2'-ethoxy-[2,3'-bipyridin]-6-yl}oxy)ethyl]-N-methylcarbamate: Into a 8-mL vial, was placed 4-chloro-2-(trifluoromethyl)benzoic acid (31 mg, 0.14 mmol), HATU (52 mg, 0.14 mmol), DIEA (55 mg, 0.43 mmol) and DMF (1 mL). After stirring for 10 min at rt, the resulting solution was treated with benzyl N-[2-({2'-ethoxy-5-[(2R)-2-ethylpiperazin-1-yl]-[2,3'-bipyridin]-6-yl}oxy)ethyl]-N-methylcarbamate (70 mg, 0.13 mmol. The reaction was stirred at rt for 1 h, diluted with water (5 mL), and then extracted with CH₂Cl₂ (2×). The combined organic layers were washed with brine, dried and concentrated under vacuum. The residue was applied onto a silica gel column with ethyl acetate/petroleum ether (8:92). This resulted in the title compound (45 mg, 46%) as a yellow oil. LCMS (M+H)⁺=726.3.

Step 2-8, preparation of [2-({5-[(2R)-4-[4-chloro-2-(trifluoromethyl)benzoyl]-2-ethylpiperazin-1-yl]-2'-ethoxy-[2,3'-bipyridin]-6-yl}oxy)ethyl](methyl)amine formate: Into a 8-mL vial, was placed benzyl N-[2-({5-[(2R)-4-[4-chloro-2-(trifluoromethyl)benzoyl]-2-ethylpiperazin-1-yl]-2'-ethoxy-[2,3'-bipyridin]-6-yl}oxy)ethyl]-N-methylcarbamate (45 mg, 0.062 mmol) and TFA (1 mL). The resulting mixture was stirred at rt for 1 h. The mixture was concentrated under vacuum, and the residue was purified by Prep-HPLC with the following conditions (Waters I): Column, SunFire Prep C18 OBD column, 5 um, 19*150 mm; mobile phase, Water (0.05% FA) and CH₃CN(16% CH₃CN up to 34% in 10 min); Detector, UV 220&254 nm. This resulted in the title compound (25 mg, 62%) as a white solid. LCMS (M+H)⁺=638.2.

The following compounds were prepared similarly to Example 2 with appropriate substituting reagents and substrates at different steps:

| Compound no. | MS (M + H)⁺ |
|---|---|
| 1-9 | 603.3 |
| 1-10 | 558.3 |
| 1-12 | 589.3 |
| 1-13 | 544.3 |
| 1-16 | 578.3 |
| 1-19 | 603.4 |
| 1-20 | 603.4 |
| 1-21 | 603.3 |
| 1-22 | 603.3 |
| 1-27 | 576.2 |
| 1-28 | 558.2 |
| 1-29 | 542.2 |
| 1-30 | 589.3 |

Example 3: [2-({2'-ethoxy-5-[(2R)-2-ethyl-4-[(2S)-2-(trifluoromethyl)pyrrolidine-1-carbonyl]piperazin-1-yl]-[2,3'-bipyridin]-6-yl}oxy)ethyl](methyl)amine (Cpd 1-11)

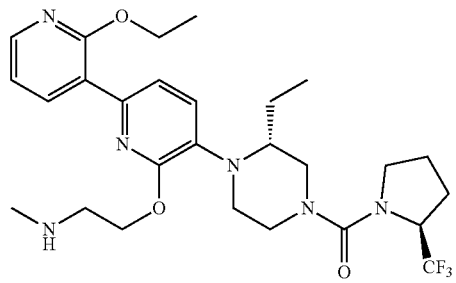 [SMILES: CCOc1ncccc1-c1ccc(N2CCN(C(=O)N3CCC[C@H]3C(F)(F)F)C[C@H]2CC)c(OCCNC)n1]

Step 3-1, preparation of (2S)-2-(trifluoromethyl)pyrrolidine-1-carbonyl chloride: Into a 8-mL vial, was placed DCM (1 mL), DIEA (60 mg, 0.6 mmol), (2S)-2-(trifluoromethyl)pyrrolidine (22 mg, 0.16 mmol), and bis(trichloromethyl)carbonate (16 mg, 0.054 mmol) at 0° C. The resulting solution was stirred at 0° C. for 3 h, diluted with H₂O (5 mL), and extracted with DCM (2×). The combined organic layers were washed with brine, dried, and concentrated under vacuum. This resulted in the title compound (30 mg, 94%) as a yellow oil.

Step 3-2, preparation of benzyl[2-({2'-ethoxy-5-[(2R)-2-ethylpiperazin-1-yl]-[2,3'-bipyridin]-6-yl}oxy)ethyl]methylamine: Into a 8-mL vial, was placed tert-butyl (3R)-4-(6-{2-[benzyl(methyl)amino]ethoxy}-2'-ethoxy-[2,3'-bipyridin]-5-yl)-3-ethylpiperazine-1-carboxylate from step 3 in Example 2 (220 mg, 0.38 mmol), DCM (2 mL) and TFA (0.4 mL). The resulting solution was stirred at rt for 1 h and concentrated. The residue was dissolved in DCM (5 mL) and washed with sat. —NaHCO$_3$. The organic layer was washed with brine, dried, and concentrated to afford the title compound (180 mg, 99%). LCMS (M+H)$^+$=476.3.

Step 3-3, preparation of benzyl[2-({2'-ethoxy-5-[(2R)-2-ethyl-4-[(2S)-2-(trifluoromethyl)pyrrolidine-1-carbonyl]piperazin-1-yl]-[2,3'-bipyridin]-6-yl}oxy)ethyl]methylamine: Into a 8-mL vial, was placed benzyl[2-({2'-ethoxy-5-[(2R)-2-ethylpiperazin-1-yl]-[2,3'-bipyridin]-6-yl}oxy)ethyl]methylamine (50 mg, 0.11 mmol), (2S)-2-(trifluoromethyl)pyrrolidine-1-carbonyl chloride (30 mg, 0.15 mmol), K$_2$CO$_3$ (42 mg, 0.30 mmol), and ACN(1 mL). The resulting solution was stirred at 30° C. for 3 h, diluted with H$_2$O (5 mL), and extracted with DCM (2×). The combined organic layers were washed with brine, dried, and concentrated under vacuum. The residue was applied onto a silica gel column with ethyl acetate/petroleum ether (15:85). This resulted in the title compound (46 mg, 68%) as a yellow oil. LCMS (M+H)$^+$=641.3.

Step 3-4, preparation of [2-({2'-ethoxy-5-[(2R)-2-ethyl-4-[(2S)-2-(trifluoromethyl)pyrrolidine-1-carbonyl]piperazin-1-yl]-[2,3'-bipyridin]-6-yl}oxy)ethyl](methyl)amine formate: Into a 50 mL autoclave, was placed benzyl[2-({2'-ethoxy-5-[(2R)-2-ethyl-4-[(2S)-2-(trifluoromethyl)pyrrolidine-1-carbonyl]piperazin-1-yl]-[2,3'-bipyridin]-6-yl}oxy)ethyl]methylamine (46 mg, 0.072 mmol), MeOH (5 mL) and palladium hydroxide (10 mg, 0.072 mmol). The flask was evacuated and flushed three times with nitrogen, followed by flushing with hydrogen. The mixture was stirred 1 h at room temperature under an 10 atm of hydrogen. The solid was filtered out through a pad of Celite, and the filtrate was concentrated under vacuum. The residue was purified by Prep-HPLC with the following conditions (Prep-HPLC-013): Column, SunFire Prep C18 OBD Column, 19*150 mm 5 um 10 nm; mobile phase, Water (0.1% FA) and ACN– (15% PhaseB up to 80% in 8 min). Total flow 20 mL/min. Detector UV 220 nm. This resulted in the title compound (20 mg, 46%) as a white solid. LCMS (M+H)$^+$=551.3.

The following compounds were prepared similarly to Example 3 with appropriate substituting reagents and substrates at different steps. Some examples may require additional functional group transformations to introduce an appropriate substituent on aryl rings. In some examples, the final deprotecting step may not be required:

| Compound no. | MS (M + H)$^+$ |
|---|---|
| 1-4 | 577.3 |
| 1-8 | 563.4 |
| 1-14 | 537.3 |
| 1-23 | 556.3 |
| 1-24 | 542.3 |
| 1-25 | 576.2 |
| 1-26 | 590.2 |

Example 4: 5-[(2R,4R)*-4-[4-chloro-2-(trifluoromethyl)phenoxy]-2-ethylpiperidin-1-yl]-2'-ethoxy-N-[(3R)-1-methylpyrrolidin-3-yl]-[2,3'-bipyridine]-6-carboxamide [*Absolute Stereochemistry not Determined](Cpd 2-9)

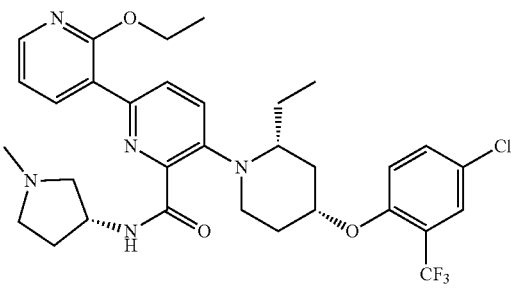 [SMILES: CCOc1ncccc1-c1ccc(N2CC[C@@H](Oc3ccc(Cl)cc3C(F)(F)F)C[C@H]2CC)c(C(=O)N[C@@H]2CCN(C)C2)n1]

Step 4-1, preparation of rac-6-bromo-3-[(2R,4R)-2-ethyl-4-hydroxypiperidine-1-yl)pyridine-2-carbonitrile: To a solution of 6-bromo-3-fluoropyridine-2-carbonitrile (500 mg, 2.49 mmol) and rac-(2R,4R)-2-ethylpiperidin-4-ol hydrochloride (495 mg, 2.99 mmol) in DMSO (2 mL) in a sealed tube was added DIEA (1.08 mL, 6.22 mmol). The mixture was heated at 130° C. for 3.5 h. The mixture was purified by reversed-phase CC to give the title compound (429 mg, 55.6% yield) as a medium brown gum. LCMS (M+H)$^+$=310.2.

Step 4-2, preparation of rac-2'-ethoxy-5-[(2R,4R)-2-ethyl-4-hydroxypiperidin-1-yl]-[2,3'-bipyridine]-6-carbonitrile: To a mixture of rac-6-bromo-3-[(2R,4R)-2-ethyl-4-hydroxypiperidin-1-yl]pyridine-2-carbonitrile (429 mg, 1.38 mmol), (2-ethoxypyridin-3-yl)boronic acid (346 mg, 2.07 mmol), Pd(amphos)Cl$_2$ (97.9 mg, 0.138 mmol), and potassium carbonate (382 mg, 2.77 mmol) in a sealed tube was added 1,4-dioxane (5 mL) and water (0.5 mL). The mixture was charged with N$_2$ (g) and heated at 100° C. for 1 h. The mixture was quenched with water and extracted with EtOAc (2×). The combined organics were concentrated to dryness and the residue was purified by reversed-phase CC to give the title compound (390 mg, 80.1% yield) as a brown gum. LCMS (M+H)$^+$=353.4.

Step 4-3, separation of 2'-ethoxy-5-[(2S,4S)*-2-ethyl-4-hydroxypiperidin-1-yl]-[2,3'-bipyridine]-6-carbonitrile and 2'-ethoxy-5-[(2R,4R)*-2-ethyl-4-hydroxypiperidin-1-yl]-[2,3'-bipyridine]-6-carbonitrile: Racemic 2'-ethoxy-5-[(2R,4R)-2-ethyl-4-hydroxypiperidin-1-yl]-[2,3'-bipyridine]-6-carbonitrile (1.10 g) was purified by Chiral-Prep-HPLC with the following conditions to give the 1$^{st}$ enantiomer (480 mg) and 2$^{nd}$ enantiomer (470 mg).
Instrument Name: SHIMADZU LC-09
Column: normal phase Diacel Chiralpak IC column, 4.6 mm ID×50 mm L, 3 μm particle size
Column Temperature: 25° C.
Wavelength: 220 nm
Gradient: Isocratic 10% EtOH in Hexanes
Flow rate: 20 mL/min
Retention Times: 1$^{st}$ enantiomer: 1.98 min; 2$^{nd}$ enantiomer: 2.74 min.

Step 4-4, preparation of 2'-ethoxy-5-[(2R,4R)*-2-ethyl-4-hydroxypiperidin-1-yl]-[2,3'-bipyridine]-6-carboxylic acid: To a suspension of 2$^{nd}$ enantiomer, 2'-ethoxy-5-[(2R,4R)*-2-ethyl-4-hydroxypiperidin-1-yl]-[2,3'-bipyridine]-6-carbonitrile (210 mg, 0.596 mmol) in a mixed solvent of EtOH (2 mL) and water (2 mL) was added potassium hydroxide (334 mg, 5.95 mmol). The mixture was heated at 100° C. for 16 h. The mixture was adjusted to pH 6-7 with 3N HCl (aq). The resulting mixture was extracted with DCM/MeOH (10:1)(3×20 mL). The combined organics were dried over anhydrous Na$_2$SO$_4$ and concentrated to dryness to give the title compound (208 mg, 94.0% yield) as a yellow solid. LCMS (M+H)$^+$=372.2.

Step 4-5, preparation of 2'-ethoxy-5-[(2R,4R)*-2-ethyl-4-hydroxypiperidin-1-yl]-N-[(3R)-1-methylpyrrolidin-3-yl]-[2,3'-bipyridine]-6-carboxamide: To a solution of 2'-ethoxy-5-[(2R,4R)*-2-ethyl-4-hydroxypiperidin-1-yl]-[2,3'-bipyridine]-6-carboxylic acid (50 mg, 0.13 mmol) and HATU (61 mg, 0.16 mmol) in DMF (0.6 mL) was added DIEA (0.10 g, 0.77 mmol). After stirring at rt for 5 min, (3R)-1-methylpyrrolidin-3-amine (16 mg, 0.16 mmol) was added to the above HATU-activated solution. The mixture was stirred at rt for 1 h. The mixture was purified by reversed-phase CC to give the title compound (45 mg, 74% yield) as a yellow solid. LCMS (M+H)$^+$=454.3.

Step 4-6, preparation of 5-[(2R,4R)*-4-[4-chloro-2-(trifluoromethyl)phenoxy]-2-ethylpiperidin-1-yl]-2'-ethoxy-N-[(3R)-1-methylpyrrolidin-3-yl]-[2,3'-bipyridine]-6-carboxamide: To a solution of 2'-ethoxy-5-[(2R,4R)*-2-ethyl-4-hydroxypiperidin-1-yl]-N-[(3R)-1-methylpyrrolidin-3-yl]-[2,3'-bipyridine]-6-carboxamide (80 mg, 0.18 mmol) in DMF (1 mL) at 0° C. was added 60% sodium hydride in mineral oil (25 mg, 0.63 mmol) in portions. After stirring at rt for 10 min, 4-chloro-1-fluoro-2-(trifluoromethyl)benzene (42 mg, 0.21 mmol) was added. The mixture was heated at 90° C. for 2 h. The mixture was quenched by saturated NH$_4$Cl (aq) and extracted with DCM/MeOH (10:1)(3×10 mL). The combined organics were washed with brine, dried over anhydrous Na$_2$SO$_4$ and concentrated to dryness to give the formate salt of title compound as a yellow solid. LCMS (M+H)$^+$=632.3.

The following compounds were prepared similarly to Example 4 with appropriate substituting reagents and substrates at different steps. Absolute stereochemistry of each compound has not been determined:

| Compound no. | MS (M + H)$^+$ |
|---|---|
| 2-11 | 623.4 |
| 2-18 | 624.3 |
| 2-21 | 589.7 |

Example 5: 5-[(2S,4S)*-4-[4-chloro-2-(trifluoromethyl)phenoxy]-2-ethylpiperidin-1-yl]-2'-ethoxy-N-[(3R)-1-methylpyrrolidin-3-yl]-[2,3'-bipyridine]-6-carboxamide [*Absolute Stereochemistry not Determined](Cpd 2-10)

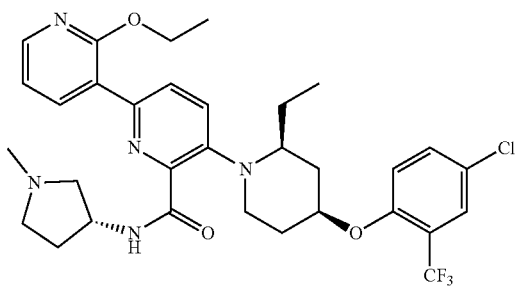 [SMILES: CCOc1ncccc1-c1ccc(N2CC[C@H](Oc3ccc(Cl)cc3C(F)(F)F)C[C@@H]2CC)c(C(=O)N[C@@H]2CCN(C)C2)n1]

Step 5-1, preparation of 2'-ethoxy-5-[(2S,4S)*-2-ethyl-4-hydroxypiperidin-1-yl]-[2,3'-bipyridine]-6-carboxylic acid: To a suspension of 1$^{st}$ enantiomer, 2'-ethoxy-5-[(2S,4S)*-2-ethyl-4-hydroxypiperidin-1-yl]-[2,3'-bipyridine]-6-carbonitrile (0.21 g, 0.60 mmol) from Step 1-3 in a mixed solvent of EtOH (2 mL) and water (2 mL) was added potassium hydroxide (341 mg, 6.08 mmol). The mixture was heated at 100° C. for 16 h. The mixture was adjusted to pH 6 with 2N HCl (aq). The resulting mixture was extracted with EtOAc (2×5 mL). The combined organics were dried over anhydrous Na$_2$SO$_4$ and concentrated to dryness to give the title compound (0.20 g, 90% yield) as a yellow solid. LCMS (M+H)$^+$=372.1.

Step 5-2, preparation of 2'-ethoxy-5-[(2S,4S)*-2-ethyl-4-hydroxypiperidin-1-yl]-N-[(3R)-1-methylpyrrolidin-3-yl]-[2,3'-bipyridine]-6-carboxamide: To a solution of 2'-ethoxy-5-[(2S,4S)*-2-ethyl-4-hydroxypiperidin-1-yl]-[2,3'-bipyridine]-6-carboxylic acid (0.2 g, 0.5 mmol) and HATU (0.25 g, 0.66 mmol) in DMF (2 mL) was added DIEA (0.50 mL, 2.9 mmol). After stirring at rt for 5 min, (3R)-1-methylpyrrolidin-3-amine (0.11 g, 1.1 mmol) was added to the above HATU-activated solution. The mixture was stirred at rt for 1 h. The mixture was purified by reversed-phase CC to give the title compound (0.20 g, 80% yield) as a light yellow solid. LCMS (M+H)$^+$=454.3.

Step 5-3, preparation of 5-((2S,4S)*-4-[4-chloro-2-(trifluoromethyl)phenoxy]-2-ethylpiperidin-1-yl)-2'-ethoxy-N-[(3R)-1-methylpyrrolidin-3-yl]-[2,3'-bipyridine]-6-carboxamide: To a solution of 2'-ethoxy-5-[(2S,4S)*-2-ethyl-4-hydroxypiperidin-1-yl]-N-[(3R)-1-methylpyrrolidin-3-yl]-[2,3'-bipyridine]-6-carboxamide (80 mg, 0.20 mmol) in DMF (1 mL) at rt was added 60% sodium hydride in mineral oil (31 mg, 0.77 mmol) in portions. After stirring at rt for 10 min, 4-chloro-1-fluoro-2-(trifluoromethyl)benzene (54.2 mg, 0.273 mmol) was added. The mixture was heated at 90° C. for 2 h. The mixture was quenched by saturated NH$_4$Cl (aq) and extracted with DCM/MeOH (10:1)(3×10 mL). The combined organics were washed with brine, dried over anhydrous Na$_2$SO$_4$ and concentrated to dryness. The residue was purified by reversed-phase CC to give the formate salt of title compound as a light yellow solid (31.7 mg, 30.0% yield). LCMS (M+H)$^+$=632.3.

The following compounds were prepared similarly to Example 5 with appropriate substituting reagents and substrates at different steps. Absolute stereochemistry of each compound has not been determined:

| Compound no. | MS (M + H)$^+$ |
|---|---|
| 2-12 | 623.3 |

Example 6: 5-[(2R,4R)*-4-[4-chloro-2-(trifluoromethyl)phenoxy]-2-ethylpiperidin-1-yl]-2'-ethoxy-N-[(3S)-1-methylpyrrolidin-3-yl]-[2,3'-bipyridine]-6-carboxamide [*Absolute Stereochemistry not Determined](Cpd 2-22)

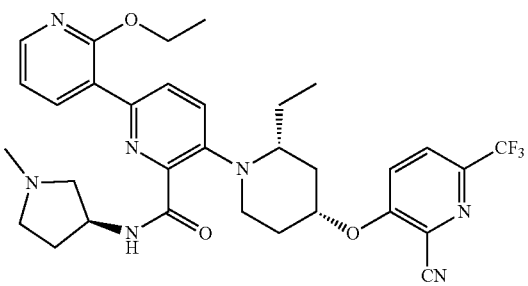 [SMILES: CCOc1ncccc1-c1ccc(N2CC[C@@H](Oc3ccc(C(F)(F)F)nc3C#N)C[C@H]2CC)c(C(=O)N[C@H]2CCN(C)C2)n1]

Step 6-1, preparation of 2'-ethoxy-5-[(2R,4R)*-2-ethyl-4-hydroxypiperidin-1-yl]-N-[(3S)-1-methylpyrrolidin-3-yl]-

[2,3'-bipyridine]-6-carboxamide: To a solution of 2'-ethoxy-5-[(2R,4R)*-2-ethyl-4-hydroxypiperidin-1-yl]-[2,3'-bipyridine]-6-carboxylic acid (50.0 mg, 0.135 mmol) from Step 1-4 and HATU (71.7 mg, 0.188 mmol) in DMF (0.3 mL) was added DIEA (0.070 mL, 0.40 mmol). After stirring at rt for 5 min, (3S)-1-methylpyrrolidin-3-amine (21.6 mg, 0.215 mmol) was added to the above HATU-activated solution. The mixture was stirred at rt for 10 min. The mixture was purified by reversed-phase CC to give the title compound (51.3 mg, 84.0% yield) as a light yellow solid. LCMS (M+H)$^+$=454.6.

Step 6-2, preparation of 5-[(2R,4R)*-4-[4-chloro-2-(trifluoromethyl)phenoxy]-2-ethylpiperidin-1-yl]-2'-ethoxy-N-[(3S)-1-methylpyrrolidin-3-yl]-[2,3'-bipyridine]-6-carboxamide: To a solution of 2'-ethoxy-5-[(2R,4R)*-2-ethyl-4-hydroxypiperidin-1-yl]-N-[(3S)-1-methylpyrrolidin-3-yl]-[2,3'-bipyridine]-6-carboxamide (25.2 mg, 0.0556 mmol) and 3-fluoro-6-(trifluoromethyl)pyridine-2-carbonitrile (52.8 mg, 0.278 mmol) in DMF (0.5 mL) at 0° C. was added 60% sodium hydride in mineral oil (22 mg, 0.56 mmol) in portions. The mixture was stirred at rt for 30 min. The mixture was quenched by ice water and purified by reversed-phase CC to give the title compound (24.2 mg, 69.8% yield) as a light yellow solid. LCMS (M+H)$^+$=624.4.

Example 7: 5-[(cis*-4-[2-cyano-4-(trifluoromethyl)phenoxy]-2-ethylpiperidin-1-yl]-2'-ethoxy-N-[(3R)-1-methylpyrrolidin-3-yl]-[2,3'-bipyridine]-6-carboxamide [*racemate](Cpd 2-2)

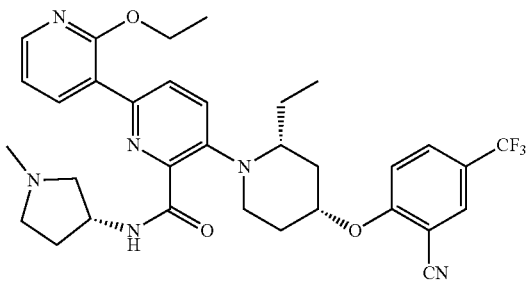 [SMILES: CCOc1ncccc1-c1ccc(N2CC[C@@H](Oc3ccc(C(F)(F)F)cc3C#N)C[C@H]2CC)c(C(=O)N[C@@H]2CCN(C)C2)n1]

Step 7-1, preparation of rac-2'-ethoxy-5-[cis-2-ethyl-4-hydroxypiperidin-1-yl]-[2,3'-bipyridine]-6-carboxylic acid: To a suspension of rac-2'-ethoxy-5-[cis-2-ethyl-4-hydroxypiperidin-1-yl]-[2,3'-bipyridine]-6-carbonitrile (100 mg, 0.284 mmol) from Step 1-2 in a mixed solvent of EtOH (1 mL) and water (1 mL) was added potassium hydroxide (159 mg, 2.84 mmol). The mixture was heated at 100° C. for 16 h. The mixture was concentrated to remove EtOH and the aqueous residue was diluted with ice water and acidified with 1N HCl (aq) to pH 2-3. The mixture was extracted with DCM (5×) and the combined organics were dried over anhydrous Na$_2$SO$_4$ and concentrated to dryness to give the title compound (110 mg, 100% yield) as a brown gum. LCMS (M+H)$^+$=372.2.

Step 7-2, preparation 2'-ethoxy-5-[cis-2-ethyl-4-hydroxypiperidin-1-yl]-N-[(3R)-1-methylpyrrolidin-3-yl]-[2,3'-bipyridine]-6-carboxamide: To a solution of rac-2'-ethoxy-5-[cis-2-ethyl-4-hydroxypiperidin-1-yl]-[2,3'-bipyridine]-6-carboxylic acid (0.11 g, 0.28 mmol) and HATU (0.16 g, 0.43 mmol) in DMF (1 mL) was added DIEA (0.15 mL, 0.85 mmol). After stirring at rt for 5 min, (3R)-1-methylpyrrolidin-3-amine (51 mg, 0.51 mmol) was added to the above HATU-activated solution. The mixture was stirred at rt for 10 min. The mixture was purified by reversed phase CC to give the title compound (83.0 mg, 64.0% yield) as a brown gum. LCMS (M+H)$^+$=454.4.

Step 7-3, preparation of 5-[cis-4-[2-cyano-4-(trifluoromethyl)phenoxy]-2-ethylpiperidin-1-yl]-2'-ethoxy-N-[(3R)-1-methylpyrrolidin-3-yl]-[2,3'-bipyridine]-6-carboxamide: To a solution of 2'-ethoxy-5-[cis-2-ethyl-4-hydroxypiperidin-1-yl]-N-[(3R)-1-methylpyrrolidin-3-yl]-[2,3'-bipyridine]-6-carboxamide (30 mg, 0.066 mmol) and 2-fluoro-5-(trifluoromethyl)benzonitrile (15 mg, 0.079 mmol) in DMF (1 mL) at 0° C. was added 60% sodium hydride in mineral oil (26 mg, 0.66 mmol) in portions. The mixture was stirred at 0° C. for 10 min. The mixture was quenched by ice and purified by reversed-phase CC to give the title compound (29.2 mg, 70.9% yield) as a white solid. LCMS (M+H)$^+$=623.3.

The following compounds were prepared similarly to Example 7 with appropriate substituting reagents and substrates at different steps. The final compound is a racemate of the cis isomer:

| Compound no. | MS (M + H)$^+$ |
|---|---|
| 2-15 | 624.3 |
| 2-17 | 569.6 |

Example 8: N-[(3S)-1-azabicyclo[2.2.2]octan-3-yl]-5-[cis*-4-[2-cyano-4-(trifluoromethyl)phenoxy]-2-ethylpiperidin-1-yl]-2'-ethoxy-[2,3'-bipyridine]-6-carboxamide [*racemate](Cpd 2-20)

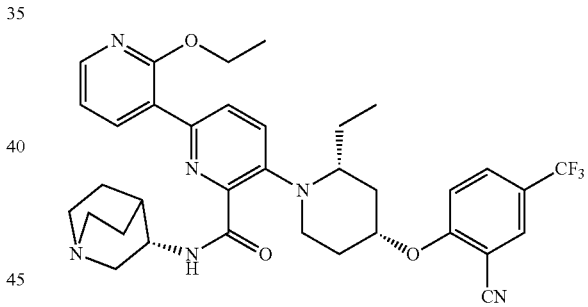

Step 8-1, preparation of N-[(3S)-1-azabicyclo[2.2.2]octan-3-yl]-2'-ethoxy-5-[cis-2-ethyl-4-hydroxypiperidin-1-yl]-[2,3'-bipyridine]-6-carboxamide: To a solution of 2'-ethoxy-5-[cis-2-ethyl-4-hydroxypiperidin-1-yl]-[2,3'-bipyridine]-6-carboxylic acid (50.0 mg, 0.135 mmol) from step 7-1 in Example 7 and HATU (71.7 mg, 0.188 mmol) in DMF (0.3 mL) was added DIEA (0.082 mL, 0.47 mmol). After stirring at rt for 5 min, (3S)-1-azabicyclo[2.2.2]octan-3-amine (42.9 mg, 0.215 mmol) was added to the above HATU-activated solution. The mixture was stirred at rt for 10 min. The mixture was purified by reversed-phase CC to give the title compound (50.0 mg, 77.4% yield) as a brown gum. LCMS (M+H)$^+$=480.4.

Step 8-2, preparation of N-[(3S)-1-azabicyclo[2.2.2]octan-3-yl]-5-[cis-4-[2-cyano-4-(trifluoromethyl)phenoxy]-2-ethylpiperidin-1-yl]-2'-ethoxy-[2,3'-bipyridine]-6-carboxamide: To a solution of N-[(3S)-1-azabicyclo[2.2.2]octan-3-yl]-2'-ethoxy-5-[cis-2-ethyl-4-hydroxypiperidin-1-yl]-[2,3'-bipyridine]-6-carboxamide (25 mg, 0.052 mmol) and 2-fluoro-5-(trifluoromethyl)benzonitrile (49.3 mg, 0.261 mmol) in DMF (0.5 mL) at 0° C. was added 60% sodium hydride in mineral oil (21 mg, 0.52 mmol) in portions. The mixture was stirred at rt for 30 min. The mixture was quenched by ice and purified by reversed-phase CC to give the title compound (5.3 mg, 16% yield) as a light brown solid. LCMS (M+H)$^+$=649.6.

The following compounds were prepared similarly to Example 8 with appropriate substituting reagents and substrates at different steps. The final compound is a racemate of the cis isomer:

| Compound no. | MS (M + H)$^+$ |
|---|---|
| 2-19 | 650.3 |

Example 9: 5-[cis*-4-{[6-chloro-2-(trifluoromethyl)pyridin-3-yl]oxy}-2-cyclopropylpiperidin-1-yl]-2'-ethoxy-N-[(3R)-1-methylpyrrolidin-3-yl]-[2,3'-bipyridine]-6-carboxamide [*racemate](Cpd 2-8)

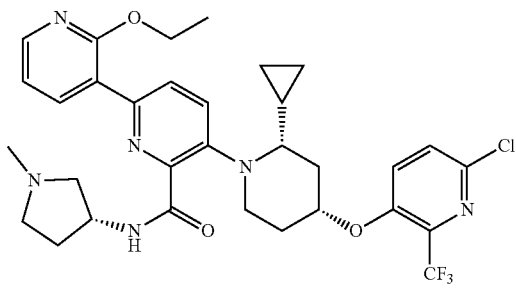 [SMILES: CCOc1ncccc1-c1ccc(N2CC[C@@H](Oc3ccc(Cl)nc3C(F)(F)F)C[C@H]2C2CC2)c(C(=O)N[C@@H]2CCN(C)C2)n1]

Step 9-1, preparation of rac-6-bromo-3-[cis-2-cyclopropyl-4-hydroxypiperidin-1-yl]pyridine-2-carbonitrile: To a solution of 6-bromo-3-fluoropyridine-2-carbonitrile (545 mg, 2.71 mmol) and rac-cis-2-cyclopropylpiperidin-4-ol hydrochloride (482 mg, 2.71 mmol) in DMSO (2 mL) in a sealed tube was added DIEA (1.18 mL, 6.80 mmol). The mixture was heated at 130° C. for 16 h. The mixture was purified by reversed-phase CC to give the title compound (379 mg, 43.4% yield) as a medium brown gum. LCMS (M+H)$^+$=322.3.

Step 9-2, preparation of rac-5-[cis-2-cyclopropyl-4-hydroxypiperidin-1-yl]-2'-ethoxy-[2,3'-bipyridine]-6-carbonitrile: To a mixture of rac-6-bromo-3-[cis-2-cyclopropyl-4-hydroxypiperidin-1-yl]pyridine-2-carbonitrile (379 mg, 1.18 mmol), (2-ethoxypyridin-3-yl)boronic acid (295 mg, 1.76 mmol), Pd(amphos)Cl$_2$ (83.3 mg, 0.118 mmol), and potassium carbonate (325 mg, 2.35 mmol) in a sealed tube was added 1,4-dioxane (5 mL) and water (0.5 mL). The mixture was charged with N$_2$ (g) and heated at 100° C. for 1 h. The mixture was quenched with water and extracted with EtOAc (2×). The combined organics were concentrated to dryness and the residue was purified by reversed-phase CC to give the title compound (429 mg, 100% yield) as a brown gum. LCMS (M+H)$^+$=365.2.

Step 9-3, preparation of rac-5-[cis-2-cyclopropyl-4-hydroxypiperidin-1-yl]-2'-ethoxy-[2,3'-bipyridine]-6-carboxylic acid: To a suspension of rac-5-[cis-2-cyclopropyl-4-hydroxypiperidin-1-yl]-2'-ethoxy-[2,3'-bipyridine]-6-carbonitrile (429 mg, 1.18 mmol) in a mixed solvent of EtOH (2 mL) and water (2 mL) was added potassium hydroxide (660 mg, 11.8 mmol). The mixture was heated at 100° C. for 16 h. The mixture was concentrated to remove EtOH and the aqueous residue was diluted with ice water and acidified with 1N HCl (aq) to pH 2-3. The mixture was extracted with DCM (5×) and the combined organics were dried over anhydrous Na$_2$SO$_4$ and concentrated to dryness to give the title compound (327 mg, 72.5% yield) as a yellow solid. LCMS (M+H)$^+$=384.1.

Step 9-4, preparation of 5-[cis-2-cyclopropyl-4-hydroxypiperidin-1-yl]-2'-ethoxy-N-[(3R)-1-methylpyrrolidin-3-yl]-[2,3'-bipyridine]-6-carboxamide: To a solution of rac-5-[cis-2-cyclopropyl-4-hydroxypiperidin-1-yl]-2'-ethoxy-[2,3'-bipyridine]-6-carboxylic acid (327 mg, 0.853 mmol) and HATU (486 mg, 1.28 mmol) in DMF (1 mL) was added DIEA (0.45 mL, 2.6 mmol). After stirring at rt for 5 min, (3R)-1-methylpyrrolidin-3-amine (154 mg, 1.54 mmol) was added to the above HATU-activated solution. The mixture was stirred at rt for 10 min. The mixture was purified by reversed-phase CC to give the title compound (264 mg, 66.5% yield) as a brown solid. LCMS (M+H)$^+$=466.3.

Step 9-5, preparation of 5-[cis-4-{[6-chloro-2-(trifluoromethyl)pyridin-3-yl]oxy}-2-cyclopropylpiperidin-1-yl]-2'-ethoxy-N-[(3R)-1-methylpyrrolidin-3-yl]-[2,3'-bipyridine]-6-carboxamide: To a solution of 5-[cis-2-cyclopropyl-4-hydroxypiperidin-1-yl]-2'-ethoxy-N-[(3R)-1-methylpyrrolidin-3-yl]-[2,3'-bipyridine]-6-carboxamide (30.0 mg, 0.0644 mmol) and 6-chloro-3-fluoro-2-(trifluoromethyl)pyridine (25.7 mg, 0.129 mmol) in DMF (1 mL) at 0° C. was added 60% sodium hydride in mineral oil (26 mg, 0.64 mmol) in portions. The mixture was stirred at rt for 1 h. The mixture was quenched by ice and purified by reversed-phase CC to give the title compound (40.0 mg, 96.2% yield) as an off-white solid. LCMS (M+H)$^+$=645.4.

The following compounds were prepared similarly to Example 9 with appropriate substituting reagents and substrates at different steps. The final compound is a racemate of the cis isomer.

| Compound no. | MS (M + H)$^+$ |
|---|---|
| 2-6 | 635.2 |
| 2-7 | 620.0 |
| 2-14 | 636.3 |
| 2-16 | 581.6 |
| 2-25 | 585.4 |

Example 10. Example 10: 5-[cis*-2-cyclopropyl-4-{[6-ethoxy-2-(trifluoromethyl)pyridin-3-yl]oxy}piperidin-1-yl]-2'-ethoxy-N-[(3R)-1-methylpyrrolidin-3-yl]-[2,3'-bipyridine]-6-carboxamide [*racemate](Cpd 2-13)

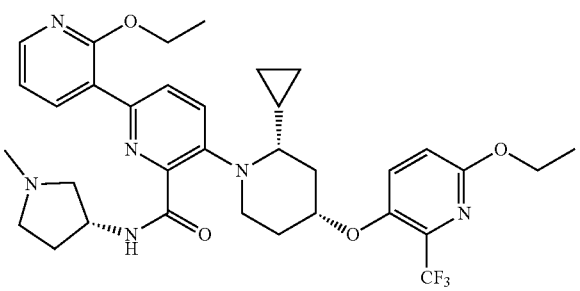 [SMILES: CCOc1ccc(O[C@@H]2CCN(c3ccc(-c4cccnc4OCC)nc3C(=O)N[C@@H]3CCN(C)C3)[C@H](C3CC3)C2)c(C(F)(F)F)n1]

Step 10-1, preparation of 5-[cis-2-cyclopropyl-4-{[6-ethoxy-2-(trifluoromethyl)pyridin-3-yl]oxy}piperidin-1-yl]-2'-ethoxy-N-[(3R)-1-methylpyrrolidin-3-yl]-[2,3'-bipyridine]-6-carboxamide: To a solution of 5-[cis-4-{[6-chloro-2-(trifluoromethyl)pyridin-3-yl]oxy}-2-cyclopropylpiperidin-1-yl]-2'-ethoxy-N-[(3R)-1-methylpyrrolidin-3-yl]-[2,3'-bipyridine]-6-carboxamide (39.0 mg, 0.0605 mmol) in EtOH (1 mL) at 0° C. was added 21 wt % of sodium ethoxide in ethanol (0.11 mL, 0.30 mmol). The mixture was heated at 100° C. for 6 h. The reaction was not complete and thus more sodium ethoxide (0.11 mL) was added and the reaction was continued to heat for 16 h. The mixture was quenched by ice water and extracted with DCM (2×). The combined organics were concentrated to dryness and the residue was purified by reversed-phase CC to give the title compound (21.3 mg, 53.8% yield) as a white solid. LCMS (M+H)$^+$=655.6.

Example 11: 5-[cis*4-[2-cyano-4-(trifluoromethyl)phenoxy]-2-cyclopropylpiperidin-1-yl]-2'-ethoxy-N-[(3R)-pyrrolidin-3-yl]-[2,3'-bipyridine]-6-carboxamide [*racemate](Cpd 2-5)

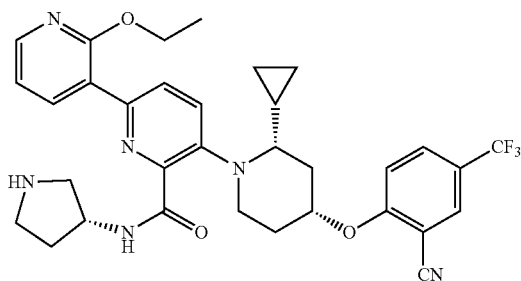 [SMILES: CCOc1ncccc1-c1ccc(N2CC[C@@H](Oc3ccc(C(F)(F)F)cc3C#N)C[C@H]2C2CC2)c(C(=O)N[C@@H]2CCNC2)n1]

Step 11-1, preparation of 5-[cis-2-cyclopropyl-4-hydroxypiperidin-1-yl]-2'-ethoxy-N-[(3R)-1-methylpyrrolidin-3-yl]-[2,3'-bipyridine]-6-carboxamide: To a solution of 5-[cis-2-cyclopropyl-4-hydroxypiperidin-1-yl]-2'-ethoxy-[2,3'-bipyridine]-6-carboxylic acid (150 mg, 0.391 mmol) from step 9-3 in Example 9 and HATU (223 mg, 0.587 mmol) in DMF (1 mL) was added DIEA (0.20 mL, 1.2 mmol). After stirring at rt for 5 min, benzyl (3R)-3-aminopyrrolidine-1-carboxylate (155 mg, 0.704 mmol) was added to the above HATU-activated solution. The mixture was stirred at rt for 10 min. The mixture was purified by reversed-phase CC to give the title compound (164 mg, 71.7% yield) as a light brown solid. LCMS (M+H)$^+$=586.2.

Step 11-2, preparation of benzyl (3R)-3-{5-[cis-4-[2-cyano-4-(trifluoromethyl)phenoxy]-2-cyclopropylpiperidin-1-yl]-2'-ethoxy-[2,3'-bipyridine]-6-amido}pyrrolidine-1-carboxylate: To a solution of benzyl (3R)-3-{5-[cis-2-cyclopropyl-4-hydroxypiperidin-1-yl]-2'-ethoxy-[2,3'-bipyridine]-6-amido}pyrrolidine-1-carboxylate (100 mg, 0.171 mmol) and 2-fluoro-5-(trifluoromethyl)benzonitrile (38.7 mg, 0.205 mmol) in DMF (1 mL) at 0° C. was added 60% sodium hydride in mineral oil (55 mg, 1.4 mmol) in portions. The mixture was stirred at rt for 30 min. The mixture was quenched by ice and purified by reversed-phase CC to give the title compound (74.4 mg, 57.7% yield) as a light yellow solid. LCMS (M+H)$^+$=755.6.

Step 11-3, preparation of 5-[cis-4-[2-cyano-4-(trifluoromethyl)phenoxy]-2-cyclopropylpiperidin-1-yl]-2'-ethoxy-N-[(3R)-pyrrolidin-3-yl]-[2,3'-bipyridine]-6-carboxamide: To benzyl (3R)-3-{5-[cis-4-[2-cyano-4-(trifluoromethyl)phenoxy]-2-cyclopropylpiperidin-1-yl]-2'-ethoxy-[2,3'-bipyridine]-6-amido}pyrrolidine-1-carboxylate (74.4 mg, 0.0986 mmol) was added (methylsulfanyl)benzene (0.030 mL, 0.26 mmol) and TFA (0.15 mL, 2.0 mmol). The mixture was heated at 60° C. for 30 min. The mixture was purified by reversed-phase CC to give the title compound (40.1 mg, 65.5% yield) as a white solid. LCMS (M+H)$^+$=621.5.

Example 12: 5-[trans*4-[2-cyano-4-(trifluoromethyl)phenoxy]-2-cyclopropylpiperidin-1-yl]-2'-ethoxy-N-[(3R)-pyrrolidin-3-yl]-[2,3'-bipyridine]-6-carboxamide [*racemate](Cpd 2-3)

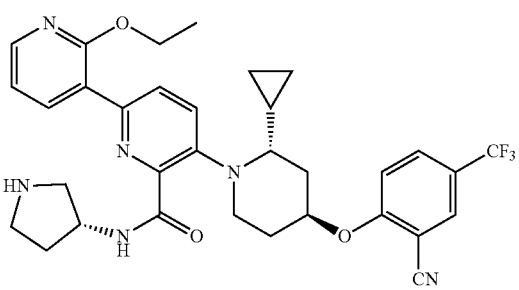 [SMILES: CCOc1ncccc1-c1ccc(N2CC[C@H](Oc3ccc(C(F)(F)F)cc3C#N)C[C@H]2C2CC2)c(C(=O)N[C@@H]2CCNC2)n1]

Step 12-1, preparation of rac-6-bromo-3-[trans-2-cyclopropyl-4-hydroxypiperidin-1-yl]pyridine-2-carbonitrile: To a solution of 6-bromo-3-fluoropyridine-2-carbonitrile (500 mg, 2.49 mmol) and rac-trans-2-cyclopropylpiperidin-4-ol hydrochloride (530 mg, 2.99 mmol) in DMSO (2 mL) in a sealed tube was added DIEA (1.08 mL, 6.22 mmol). The mixture was heated at 130° C. for 16 h. The mixture was purified by reversed-phase CC to give the title compound (433 mg, 54.0% yield) as a medium brown gum. LCMS (M+H)$^+$=322.3.

Step 12-2, preparation of rac-5-[trans-2-cyclopropyl-4-hydroxypiperidin-1-yl]-2'-ethoxy-[2,3'-bipyridine]-6-carbonitrile: To a mixture of rac-6-bromo-3-[trans-2-cyclopropyl-4-hydroxypiperidin-1-yl]pyridine-2-carbonitrile (433 mg, 1.34 mmol), (2-ethoxypyridin-3-yl)boronic acid (337 mg, 2.02 mmol), Pd(amphos)Cl$_2$ (95.2 mg, 0.134 mmol), and potassium carbonate (371 mg, 2.69 mmol) in a sealed tube was added 1,4-dioxane (5 mL) and water (0.5 mL). The mixture was charged with N$_2$ (g) and heated at 100° C. for 1 h. The mixture was quenched with water and extracted with EtOAc (2×). The combined organics were concentrated to dryness and the residue was purified by reversed-phase CC to give the title compound (386 mg, 78.8% yield) as a brown gum. LCMS (M+H)$^+$=365.2.

Step 12-3, preparation of rac-5-[trans-2-cyclopropyl-4-hydroxypiperidin-1-yl]-2'-ethoxy-[2,3'-bipyridine]-6-carboxylic acid: To a suspension of rac-5-[trans-2-cyclopropyl-4-hydroxypiperidin-1-yl]-2'-ethoxy-[2,3'-bipyridine]-6-carbonitrile (386 mg, 1.06 mmol) in a mixed solvent of EtOH (5 mL) and water (5 mL) was added potassium hydroxide (594 mg, 10.6 mmol). The mixture was heated at 100° C. for 1 d. The mixture was concentrated to remove EtOH and the aqueous residue was diluted with ice water and acidified with 1N HCl (aq) to pH 2-3. The mixture was extracted with DCM (5×) and the combined organics were dried over anhydrous Na$_2$SO$_4$ and concentrated to dryness to give the title compound (364 mg, 89.5% yield) as a yellow solid. LCMS (M+H)$^+$=384.2.

Step 12-4, preparation of benzyl (3R)-3-{5-[trans-2-cyclopropyl-4-hydroxypiperidin-1-yl]-2'-ethoxy-[2,3'-bipyridine]-6-amido}pyrrolidine-1-carboxylate: To a solution of rac-5-[trans-2-cyclopropyl-4-hydroxypiperidin-1-yl]-2'-ethoxy-[2,3'-bipyridine]-6-carboxylic acid (150 mg, 0.391 mmol) and HATU (223 mg, 0.587 mmol) in DMF (1 mL) was added DIEA (0.20 mL, 1.2 mmol). After stirring at rt for 5 min, benzyl (3R)-3-aminopyrrolidine-1-carboxylate (155 mg, 0.704 mmol) was added to the above HATU-activated solution. The mixture was stirred at rt for 10 min. The mixture was purified by reversed-phase CC to give the title compound (189 mg, 82.3% yield) as a brown solid. LCMS (M+H)$^+$=586.2.

Step 12-5, preparation of benzyl (3R)-3-{5-[trans-4-[2-cyano-4-(trifluoromethyl)phenoxy]-2-cyclopropylpiperidin-1-yl]-2'-ethoxy-[2,3'-bipyridine]-6-amido}pyrrolidine-1-carboxylate: To a solution of benzyl (3R)-3-{5-[trans-2-cyclopropyl-4-hydroxypiperidin-1-yl]-2'-ethoxy-[2,3'-bipyridine]-6-amido}pyrrolidine-1-carboxylate (100 mg, 0.171 mmol) and 2-fluoro-5-(trifluoromethyl)benzonitrile (38.7 mg, 0.205 mmol) in DMF (1 mL) at 0° C. was added 60% sodium hydride in mineral oil (68 mg, 1.7 mmol) in portions. The mixture was stirred at rt for 30 min. The mixture was quenched by ice and purified by reversed-phase CC to give the title compound (94.3 mg, 73.2% yield) as a light brown solid. LCMS (M+H)$^+$=755.4.

Step 12-6, preparation of 5-[trans-4-[2-cyano-4-(trifluoromethyl)phenoxy]-2-cyclopropylpiperidin-1-yl]-2'-ethoxy-N-[(3R)-pyrrolidin-3-yl]-[2,3'-bipyridine]-6-carboxamide: To benzyl (3R)-3-{5-[trans-4-[2-cyano-4-(trifluoromethyl)phenoxy]-2-cyclopropylpiperidin-1-yl]-2'-ethoxy-[2,3'-bipyridine]-6-amido}pyrrolidine-1-carboxylate (94.3 mg, 0.125 mmol) was added (methylsulfanyl)benzene (0.030 mL, 0.26 mmol) and TFA (0.15 mL, 2.0 mmol). The mixture was heated at 60° C. for 30 min. The mixture was purified by reversed-phase CC to give the title compound (57.1 mg, 73.6% yield) as a light yellow solid. LCMS (M+H)$^+$=621.5.

The following compounds were prepared similarly to Example 12 with appropriate substituting reagents and substrates at different steps.

| Compound no. | MS (M + H)$^+$ |
|---|---|
| 2-1 | 567.3 |

Example 13: 5-[trans*4-[2-cyano-4-(trifluoromethyl)phenoxy]-2-cyclopropylpiperidin-1-yl]-2'-ethoxy-N-[(3R)-1-methylpyrrolidin-3-yl]-[2,3'-bipyridine]-6-carboxamide [*racemate](Cpd 2-4)

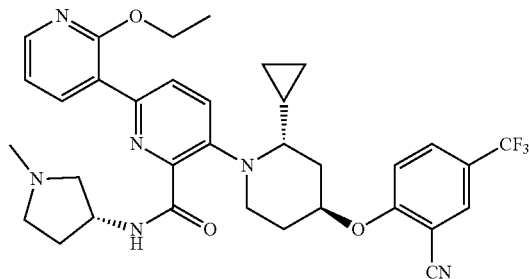 [SMILES: CCOc1ncccc1-c1ccc(N2CC[C@H](Oc3ccc(C(F)(F)F)cc3C#N)C[C@H]2C2CC2)c(C(=O)N[C@@H]2CCN(C)C2)n1]

Step 13-1, preparation of 5-[trans-4-[2-cyano-4-(trifluoromethyl)phenoxy]-2-cyclopropylpiperidin-1-yl]-2'-ethoxy-N-[(3R)-1-methylpyrrolidin-3-yl]-[2,3'-bipyridine]-6-carboxamide: To a solution of 5-[trans-4-[2-cyano-4-(trifluoromethyl)phenoxy]-2-cyclopropylpiperidin-1-yl]-2'-ethoxy-N-[(3R)-pyrrolidin-3-yl]-[2,3'-bipyridine]-6-carboxamide (42.0 mg, 0.0677 mmol) in MeOH (3 mL) was added paraformaldehyde (42.5 mg) and NaBH$_3$CN(42.5 mg, 0.677 mmol). The mixture was stirred at rt for 1 h. The mixture was quenched by TFA (0.1 mL) and re-basified with saturated NaHCO$_3$ (aq). The mixture was extracted with DCM (2×) and the combined organics were concentrated to dryness. The residue was purified by reversed-phase CC to give the title compound (26.7 mg, 62.2% yield) as a white solid. LCMS (M+H)$^+$=635.2.

Example 14: 3-(cis*-4-{[2-cyano-6-(trifluoromethyl)pyridin-3-yl]oxy}-2-methylpiperidin-1-yl)-6-(2-ethoxyphenyl)-N-[(3R)-1-methylpyrrolidin-3-yl]pyridine-2-carboxamide [*racemate](Cpd 2-23)

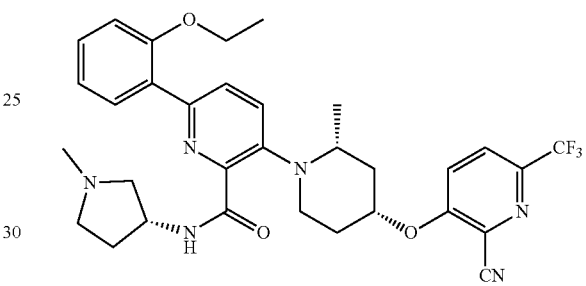

Step 14-1, preparation of rac-6-bromo-3-[cis-4-hydrox-2-methylpiperidine-1-yl)pyridine-2-carbonitrile: To a solution of 6-bromo-3-fluoropyridine-2-carbonitrile (600 mg, 2.99 mmol) and rac-cis-2-methylpiperidin-4-ol hydrochloride (543 mg, 3.58 mmol) in DMSO (2 mL) in a sealed tube was added DIEA (1.30 mL, 7.46 mmol). The mixture was heated at 130° C. for 3.5 h. The mixture was purified by reversed-phase CC to give the title compound (555 mg, 62.8% yield) as a yellow gum. LCMS (M+H)$^+$=296.3.

Step 14-2, preparation of rac-6-(2-ethoxyphenyl)-3-[cis-4-hydroxy-2-methylpiperidin-1-yl]pyridine-2-carbonitrile: To a mixture of rac-6-bromo-3-[cis-4-hydroxy-2-methylpiperidin-1-yl]pyridine-2-carbonitrile (277 mg, 0.935 mmol), (2-ethoxyphenyl)boronic acid (233 mg, 1.40 mmol), Pd(amphos)Cl$_2$ (66.2 mg, 0.0935 mmol), and potassium carbonate (259 mg, 1.87 mmol) in a sealed tube was added 1,4-dioxane (4 mL) and water (0.4 mL). The mixture was charged with N$_2$ (g) and heated at 100° C. for 1 h. The mixture was quenched with water and extracted with EtOAc (2×). The combined organics were concentrated to dryness and the residue was purified by reversed-phase CC to give the title compound (316 mg, 100% yield) as a brown gum. LCMS (M+H)$^+$=338.2.

Step 14-3, preparation of rac-6-(2-ethoxyphenyl)-3-[cis-4-hydroxy-2-methylpiperidin-1-yl]pyridine-2-carboxylic acid: To a suspension of rac-6-(2-ethoxyphenyl)-3-[(2R,4R)-4-hydroxy-2-methylpiperidin-1-yl]pyridine-2-carbonitrile (317 mg, 0.939 mmol) in a mixed solvent of EtOH (2 mL) and water (2 mL) was added potassium hydroxide (527 mg, 9.39 mmol). The mixture was heated at 100° C. for 16 h. The mixture was concentrated to remove EtOH and the aqueous residue was diluted with ice water and acidified with 1N HCl (aq) to pH 2-3. The mixture was extracted with DCM (5×) and the combined organics were dried over anhydrous Na₂SO₄ and concentrated to dryness to give the title compound (286 mg, 85.6% yield) as a light brown solid. LCMS (M+H)⁺=357.6.

Step 14-4, preparation 6-(2-ethoxyphenyl)-3-[cis-4-hydroxy-2-methylpiperidin-1-yl]-N-[(3R)-1-methylpyrrolidin-3-yl]pyridine-2-carboxamide: To a solution of rac-6-(2-ethoxyphenyl)-3-[cis-4-hydroxy-2-methylpiperidin-1-yl] pyridine-2-carboxylic acid (50.0 mg, 0.140 mmol) and HATU (74.7 mg, 0.196 mmol) in DMF (0.3 mL) was added DIEA (0.073 mL, 0.42 mmol). After stirring at rt for 5 min, (3R)-1-methylpyrrolidin-3-amine (22.5 mg, 0.224 mmol) was added to the above HATU-activated solution. The mixture was stirred at rt for 10 min. The mixture was purified by reversed phase CC to give the title compound (40.4 mg, 65.7% yield) as a brown gum. LCMS (M+H)⁺=439.0.

Step 14-5, preparation of 3-(cis-4-{[2-cyano-6-(trifluoromethyl)pyridin-3-yl]oxy}-2-methylpiperidin-1-yl)-6-(2-ethoxyphenyl)-N-[(3R)-1-methylpyrrolidin-3-yl]pyridine-2-carboxamide: To a solution of 6-(2-ethoxyphenyl)-3-[cis-4-hydroxy-2-methylpiperidin-1-yl]-N-[(3R)-1-methylpyrrolidin-3-yl]pyridine-2-carboxamide (20.0 mg, 0.0461 mmol) and 3-fluoro-6-(trifluoromethyl)pyridine-2-carbonitrile (17 mg, 0.091 mmol) in DMF (0.5 mL) at 0° C. was added 60% sodium hydride in mineral oil (9.1 mg, 0.23 mmol) in portions. The mixture was stirred at rt for 30 min. The mixture was quenched by ice and purified by reversed-phase CC to give the title compound (7.2 mg, 26% yield) as a white solid. LCMS (M+H)⁺=609.4.

The following compounds were prepared similarly to Example 14 with appropriate substituting reagents and substrates at different steps:

| Compound no. | MS (M + H)⁺ |
| --- | --- |
| 2-24 | 574.7 |

Example 15: 2-(4-(2'-ethoxy-6-(2-(methylamino) ethoxy)-[2,3'-bipyridin]-5-yl)piperidin-1-yl)-5-(trifluoromethyl)benzonitrile (Cpd 3-1)

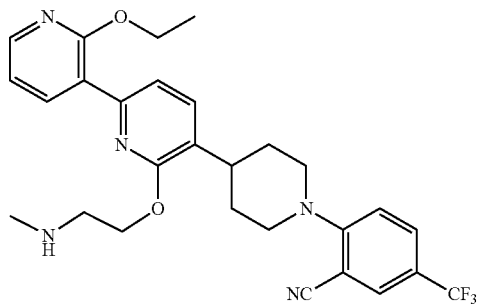 [SMILES: CCOc1ncccc1-c1ccc(C2CCN(c3ccc(C(F)(F)F)cc3C#N)CC2)c(OCCNC)n1]

Step 15-1, preparation of tert-butyl 6-chloro-2-fluoro-3',6'-dihydro-[3,4'-bipyridine]-1'(2'H)-carboxylate: To a mixture of 3-bromo-6-chloro-2-fluoropyridine (2.0 g, 9.5 mmol), potassium carbonate (3.9 g, 28 mmol), tert-butyl 4-(4,4,5,5-tetramethyl-1,3,2-dioxaborolan-2-yl)-3,6-dihydropyridine-1(2H)-carboxylate (3.2 g, 10 mmol), and Pd(dppf)Cl₂ (0.31 g, 0.38 mmol) under nitrogen was added 1,4-dioxane (20 mL) and H₂O (2 mL). The resulting mixture was heated at 100° C. for 2 h. The mixture was concentrated in vacuo and the residue was purified by silica gel CC to give the title compound (2.5 g, 84%) as a yellow solid. LCMS (M+H)⁺=298.1.

Step 15-2, preparation of tert-butyl 2-(2-((tert-butoxycarbonyl)(methyl)amino)ethoxy)-6-chloro-3',6'-dihydro-[3,4'-bipyridine]-1'(2'H)-carboxylate: To a solution of tert-butyl (2-hydroxyethyl)(methyl)carbamate (234 mg, 1.34 mmol) in DMF (5 mL) under nitrogen was added 60 wt % sodium hydride in mineral oil (78 mg, 2.0 mmol). The resulting solution was stirred at 0° C. for 0.5 h. To this was added tert-butyl 6-chloro-2-fluoro-3',6'-dihydro-[3,4'-bipyridine]-1'(2'H)-carboxylate (380 mg, 1.21 mmol) and the resulting solution was stirred at rt for 2 h. The crude product was purified by reversed-phase CC to give the title compound (250 mg, 44.0%) as a yellow solid. LCMS (M+H)⁺=490.3.

Step 15-3, preparation of tert-butyl 6'-(2-((tert-butoxycarbonyl)(methyl)amino)ethoxy)-2-ethoxy-3'',6''-dihydro-[3,2':5',4''-terpyridine]-1''(2''H)-carboxylate: To a mixture of tert-butyl 2-(2-((tert-butoxycarbonyl)(methyl)amino)ethoxy)-6-chloro-3',6'-dihydro-[3,4'-bipyridine]-1'(2'H)-carboxylate (249 mg, 532 μmol), (2-ethoxypyridin-3-yl)boronic acid (133 mg, 797 μmol), Pd(amphos)Cl₂ (18.8 mg, 26.6 μmol), and potassium carbonate (221 mg, 1.60 mmol) under nitrogen was added 1,4-dioxane (4 mL) and H₂O (0.4 mL). The resulting mixture was heated at 100° C. for 1.5 h. The crude mixture was concentrated in vacuo and the residue was purified by silica gel CC to give the title compound (210 mg, 71.2%) as a yellow solid. LCMS (M+H)⁺=555.4.

Step 15-4, preparation of tert-butyl 4-(6-(2-((tert-butoxycarbonyl)(methyl)amino)ethoxy)-2'-ethoxy-[2,3'-bipyridin]-5-yl)piperidine-1-carboxylate: To a solution of tert-butyl 6'-(2-((tert-butoxycarbonyl)(methyl)amino)ethoxy)-2-ethoxy-3'',6''-dihydro-[3,2':5',4''-terpyridine]-1''(2''H)-carboxylate (210 mg, 379 μmol) in MeOH under nitrogen was added 10% wet palladium on carbon (20 mg) and Pd(OH)₂ (20 mg). The reaction mixture was then charged with hydrogen. The resulting solution was stirred at rt for 4 h. The solid was filtered out and the filtrate was concentrated in vacuo to dryness to give the title compound (190 mg, 90.1%) as a yellow solid. LCMS (M+H)⁺=557.4.

Step 15-5, preparation of 2-((2'-ethoxy-5-(piperidin-4-yl)-[2,3'-bipyridin]-6-yl)oxy)-N-methylethan-1-amine bis(2,2,2-trifluoroacetate): To a solution of tert-butyl 4-(6-(2-((tert-butoxycarbonyl)(methyl)amino)ethoxy)-2'-ethoxy-[2,3'-bipyridin]-5-yl)piperidine-1-carboxylate (190 mg, 341 μmol) in DCM (2 mL) was added TFA (0.4 mL). The resulting solution was stirred at rt for 1 h. The mixture was concentrated to dryness to give the title compound (190 mg, 95.2%) as yellow oil. LCMS (M+H)⁺=357.2.

Step 15-6, preparation of 2-(4-(2'-ethoxy-6-(2-(methylamino)ethoxy)-[2,3'-bipyridin]-5-yl)piperidin-1-yl)-5-(trifluoromethyl)benzonitrile bis(2,2,2-trifluoroacetate): To a solution of 2-((2'-ethoxy-5-(piperidin-4-yl)-[2,3'-bipyridin]-6-yl)oxy)-N-methylethan-1-amine bis(2,2,2-trifluoroacetate)(60 mg, 0.10 mmol) in DMF (0.3 mL) was added DIEA (80 mg, 0.62 mmol) and 2-fluoro-5-(trifluoromethyl) benzonitrile (12 mg, 63 μmol). The resulting solution was heated at 60° C. for 19 h. The crude product was purified by reversed-phased CC to give the title compound (22 mg, 28%) as a yellow solid. LCMS (M+H)⁺=526.3.

The following compounds were prepared similarly to Example 15 with appropriate substituting reagents and substrates at different steps:

| Compound no. | MS (M + H)+ |
|---|---|
| 3-2 | 527.3 |

Example 16: 5-[rac-(2R,4R)-4-[4-chloro-2-(trifluoromethyl)phenoxy]-2-ethylpiperidin-1-yl]-2'-ethoxy-6-{[(3R)-1-methylpyrrolidin-3-yl]oxy}-2,3'-bipyridine (Cpd 3-9)

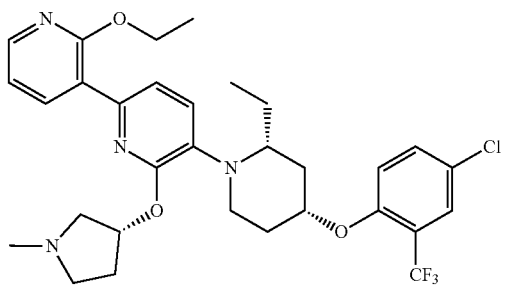 [SMILES: CCOc1ncccc1-c1ccc(N2CC[C@@H](Oc3ccc(Cl)cc3C(F)(F)F)C[C@H]2CC)c(O[C@@H]2CCN(C)C2)n1]

Step 16-1, preparation of rac-2-ethyl-1-(2-nitropyridin-3-yl)piperidin-4-ol: To a solution of rac-2-ethylpiperidin-4-ol hydrochloride (700 mg, 4.23 mmol) and 3-fluoro-2-nitropyridine (1.3 g, 9.1 mmol) in DMSO (10 mL) was added DIEA (3.4 mL, 19 mmol). The mixture was heated at 90° C. for 30 h. The resulting solution was diluted with water (30 mL) and extracted with EtOAc (3×). The combined organic layers were washed with brine, dried over anhydrous sodium sulfate, and concentrated in vacuo to dryness. The residue was purified by silica gel CC to give the title compound (950 mg, 89.5%) as colorless oil. LCMS (M+H)+=252.2.

Step 16-2, preparation of 3-(rac-(2R,4R)-4-(4-chloro-2-(trifluoromethyl)phenoxy)-2-ethylpiperidin-1-yl)-2-nitropyridine: To a solution rac-2-ethyl-1-(2-nitropyridin-3-yl)piperidin-4-ol (50 mg, 0.20 mmol) and 4-chloro-1-fluoro-2-(trifluoromethyl)benzene (50 mg, 0.25 mmol) in DMF (3 mL) at 0° C. was added 60 wt % sodium hydride in mineral oil (25 mg, 0.63 mmol). The mixture was stirred at rt for 1 h. The crude mixture was used in the next step. LCMS (M+H)+=430.2.

Step 16-3, preparation of 3-(rac-(2R,4R)-4-(4-chloro-2-(trifluoromethyl)phenoxy)-2-ethylpiperidin-1-yl)-2-(((R)-1-methylpyrrolidin-3-yl)oxy)pyridine: To a solution of (R)-1-methylpyrrolidin-3-ol (60 mg, 0.59 mmol) in DMF (2 mL) at 0° C. was added 60 wt % sodium hydride in mineral oil (25 mg, 0.63 mmol). The mixture was stirred at 0° C. for 0.5 h and then was added to the reaction solution of 3-(rac-(2R,4R)-4-(4-chloro-2-(trifluoromethyl)phenoxy)-2-ethylpiperidin-1-yl)-2-nitropyridine (86 mg, 0.20 mmol) from Step 16-1. The mixture was stirred at rt for 1 h. The resulting solution was quenched with NH4Cl (aq)(20 mL) and extracted with EtOAc (3×). The combined organic layers were washed with brine, dried over anhydrous sodium sulfate, and concentrated in vacuo to dryness. The crude product was purified by reversed-phase CC to give the title (65 mg, 67%) as a yellow solid. LCMS (M+H)+=484.2.

Step 16-4, preparation of 6-bromo-3-(rac-(2R,4R)-4-(4-chloro-2-(trifluoromethyl)phenoxy)-2-ethylpiperidin-1-yl)-2-(((R)-1-methylpyrrolidin-3-yl)oxy)pyridine: To a solution of 3-(rac-(2R,4R)-4-(4-chloro-2-(trifluoromethyl)phenoxy)-2-ethylpiperidin-1-yl)-2-(((R)-1-methylpyrrolidin-3-yl)oxy) pyridine (50 mg, 0.10 mmol) in DMF (2 mL) was added NBS (22 mg, 0.12 mmol). The mixture was stirred at rt for 1 h. The crude product was purified by reversed-phase CC to give the title compound (50 mg, 86%) as a yellow solid. LCMS (M+H)+=562.1.

Step 16-5, preparation of 5-[rac-(2R,4R)-4-[4-chloro-2-(trifluoromethyl)phenoxy]-2-ethylpiperidin-1-yl]-2'-ethoxy-6-{[(3R)-1-methylpyrrolidin-3-yl]oxy}-2,3'-bipyridine: To a mixture of 6-bromo-3-(rac-(2R,4R)-4-(4-chloro-2-(trifluoromethyl)phenoxy)-2-ethylpiperidin-1-yl)-2-(((R)-1-methylpyrrolidin-3-yl)oxy)pyridine (45 mg, 80 µmol), (2-ethoxypyridin-3-yl)boronic acid (18 mg, 0.11 mmol), K2CO3 (35 mg, 0.25 mmol), and Pd(dtbpf)Cl2 (6.0 mg, 9.2 µmol) under nitrogen was added 1,4-dioxane (1.5 mL) and H2O (0.15 mL). The resulting solution was heated at 70° C. for 2 h. The reaction mixture was concentrated in vacuo and the residue was purified by reversed-phase CC to give the title compound (10.3 mg, 15%) as an off-white solid. LCMS (M+H)+=605.2.

The following compounds were prepared similarly to Example 16 with appropriate substituting reagents and substrates at different steps:

| Compound no. | MS (M + H)+ |
|---|---|
| 3-8 | 596.3 |

Example 17: 1-(5-{5-[(2R)-4-(2-chloro-4-fluorobenzoyl)-2-ethylpiperazin-1-yl]-2'-ethoxy-[2,3'-bipyridin]-6-yl}-4H-1,2,4-triazol-3-yl)methanamine (Cpd 4-2)

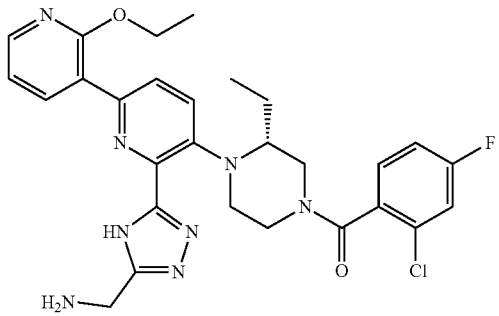 [SMILES: CCOc1ncccc1-c1ccc(N2CCN(C(=O)c3ccc(F)cc3Cl)C[C@H]2CC)c(-c2nnc(CN)[nH]2)n1]

Step 17-1, preparation of tert-butyl (R)-4-(6-bromo-2-cyanopyridin-3-yl)-3-ethylpiperazine-1-carboxylate: To a solution of 6-bromo-3-fluropicolinonitrile (50 g, 0.25 mmol) and tert-butyl (R)-3-ethylpiperazine-1-carboxylate (53 g, 0.25 mol) in DMSO (500 mL) was added N-ethyl-N-isopropylpropan-2-amine (96 g, 0.74 mol). The mixture was heated at 90° C. for 24 h. The mixture was quenched with water (500 mL) and extracted with EtOAc (3×). The combined organics were washed with brine, dried over anhydrous sodium sulfate, and concentrated in vacuo to dryness to give the title compound (88 g, 89% yield) as yellow oil. LCMS (M+H)+=460.1.

Step 17-2, preparation of tert-butyl (R)-4-(6-cyano-2'-ethoxy-[2,3'-bipyridin]-5-yl)-3-ethylpiperazine-1-carboxylate: To a mixture of tert-butyl (R)-4-(6-bromo-2-cyanopyridin-3-yl)-3-ethylpiperazine-1-carboxylate (54 g, 0.14 mol), (2-ethoxypyridin-3-yl)boronic acid (46 g, 0.28 mol), K2CO3

(57 g, 0.41 mol), and Pd(DTBPF)Cl$_2$ (8.9 g, 14 mmol) under nitrogen was added dioxane (500 mL) and water (50 mL). The resulting mixture was heated at 70° C. for 1 h. The mixture was diluted with water (500 mL) and extracted with DCM (1000 mL). The organic layer was concentrated in vacuo to dryness and the residue was purified by silica gel CC to give the title compound (26 g, 43% yield) as yellow oil. LCMS (M+H)$^+$=438.3.

Step 17-3, preparation of (R)-5-(4-(tert-butoxycarbonyl)-2-ethylpiperazin-1-yl)-2'-ethoxy-[2,3'-bipyridine]-6-carboxylic acid: To a solution of tert-butyl (R)-4-(6-cyano-2'-ethoxy-[2,3'-bipyridin]-5-yl)-3-ethylpiperazine-1-carboxylate (15 g, 34 mmol) in EtOH (80 mL) was added potassium hydroxide (19 g, 0.34 mol) and water (80 mL). The resulting mixture was heated at 100° C. for 18 h. The mixture was concentrated in vacuo to remove EtOH and the residue was diluted with water (100 mL), acidified with 1N HCl (aq) to pH 3, and extracted with EtOAc (3×). The combined organics were washed with brine, dried over anhydrous sodium sulfate, and concentrated in vacuo to dryness to give the title compound (14 g, 89% yield) as yellow oil. LCMS (M+H)$^+$=457.3.

Step 17-4, preparation of methyl (R)-2'-ethoxy-5-(2-ethylpiperazin-1-yl)-[2,3-bipyridine]-6-carboxylate: To a solution of methyl (R)-5-(4-(tert-butoxycarbonyl)-2-ethylpiperazin-1-yl)-2'-ethoxy-[2,3'-bipyridine]-6-carboxylate (400 mg, 850 μmol) in DCM (6 mL) was added TFA (1 mL). The resulting solution was stirred at rt for 2 h. The mixture was concentrated in vacuo, diluted with water (20 mL), and neutralized with saturated NaHCO$_3$ (aq). The resulting mixture was extracted with EtOAc (3×) and the combined organics were washed with brine, dried over anhydrous sodium sulfate, and concentrated in vacuo to dryness to give the title compound (304 mg, 96.5% yield) as a yellow solid. LCMS (M+H)$^+$=371.0.

Step 17-5, preparation of methyl (R)-5-(4-(2-chloro-4-fluorobenzoyl)-2-ethylpiperazin-1-yl)-2'-ethoxy-[2,3'-bipyridine]-6-carboxylate. To a solution methyl (R)-2'-ethoxy-5-(2-ethylpiperazin-1-yl)-[2,3'-bipyridine]-6-carboxylate (304 mg, 821 μmol) in DMF (5 mL) under nitrogen was added HATU (374 mg, 984 μmol), N-ethyl-N-isopropylpropan-2-amine (318 mg, 2.46 mmol), and 2-chloro-4-fluorobenzoic acid (150 mg, 859 μmol). The resulting solution was stirred at rt for 1 h. The mixture was quenched with water (20 mL) and extracted with EtOAc (3×) The combined organics were washed with brine, dried over anhydrous sodium sulfate, and concentrated in vacuo to dryness. The residue was purified by silica gel CC to give the title compound (350 mg, 80.9% yield) as a yellow solid. LCMS (M+H)$^+$=527.1.

Step 17-6, preparation of (R)-5-(4-(2-chloro-4-fluorobenzoyl)-2-ethylpiperazin-1-yl)-2'-ethoxy-[2,3'-bipyridine]-6-carbohydrazide: To a solution of methyl (R)-5-(4-(2-chloro-4-fluorobenzoyl)-2-ethylpiperazin-1-yl)-2'-ethoxy-[2,3'-bipyridine]-6-carboxylate (200 mg, 380 μmol) in EtOH (2 mL) was added hydrazinehydrate (190 mg, 3.80 mmol). The resulting solution was heated at 70° C. for 2 h. The mixture was quenched with water (20 mL) and extracted with EtOAc (3×). The combined organics were washed with brine, dried over anhydrous sodium sulfate, and concentrated in vacuo to dryness to give the title compound (200 mg, 100% yield) as a yellow solid. LCMS (M+H)$^+$=526.9.

Step 17-7, preparation of tert-butyl (R)-(5-(5-(4-(2-chloro-4-fluorobenzoyl)-2-ethylpiperazin-1-yl-2'-ethoxy-[2,3'-bipyridin]-6-yl)-4H-1,2,4-triazol-3-yl)methyl)carbamate: To a solution of (R)-5-(4-(2-chloro-4-fluorobenzoyl)-2-ethylpiperazin-1-yl)-2'-ethoxy-[2,3'-bipyridine]-6-carbohydrazide (90 mg, 0.17 mmol) in toluene (1.2 mL) and DMF (0.2 mL) under nitrogen was added N-ethyl-N-isopropylpropan-2-amine (0.13 g, 1.0 mmol) and methyl 2-((tert-butoxycarbonyl)amino)ethanimidothioate hydroiodide (0.11 g, 0.33 mmol). The resulting solution was heated at 80° C. for 40 h. The crude mixture was purified by reversed-phase CC to give the title compound (54 mg, 48% yield) as a yellow solid. LCMS (M+H)$^+$=664.9.

Step 17-8, preparation of methyl 2-((tertbutoxycarbonyl)amino)ethanimidothioate hydroiodide: To a solution of tert-butyl (2 amino-2-thioxoethyl)carbamate (500 mg, 2.63 mmol) in acetone (6 mL) was added iodomethane (560 mg, 3.95 mmol). The resulting solution was stirred at rt for 18 h. The mixture was diluted with ether (6 mL) and the solid was collected by vacuum filtration to give the title compound (610 mg, 69.9% yield) as a white solid. LCMS (M+H)$^+$=205.1.

Step 17-9 preparation of (R)-(4-(6-(5-(aminomethyl)-4H-1,2,4-triazol-3-yl-2'-ethoxy-[2,3'-bipyridin]-5-yl-3-ethylpiperazin-1-yl)(2-chloro-4-fluorophenyl)methanone formate: To a solution of tert-butyl (R)-((5-(5-(4-(2-chloro-4-fluorobenzoyl)-2-ethylpiperazin-1-yl)-2'-ethoxy-[2,3'-bipyridin]-6-yl)-4H-1,2,4-triazol-3-yl)methyl)carbamate (50 mg, 75 μmol) in DCM (2 mL) was added TFA (0.4 mL) dropwise. The mixture was stirred at rt for 1 h. The mixture was concentrated in vacuo and the residue was diluted with water (10 mL), neutralized with saturated NaHCO$_3$ (aq), and extracted with EtOAc (3×). The combined organics were washed with brine, dried over anhydrous sodium sulfate, and concentrated in vacuo to dryness. The residue was purified by reversed-phase CC to give the title compound (35 mg, 76% yield) as a white solid. LCMS (M+H)$^+$=565.2.

Example 18: (R)-(4-(6-(5-amino-4H-1,2,4-triazol-3-yl)-2'-ethoxy-[2,3'-bipyridin]-5-yl)-3-ethylpiperazin-1-yl)(2-chloro-4-fluorophenyl)methanone (Cpd 4-3)

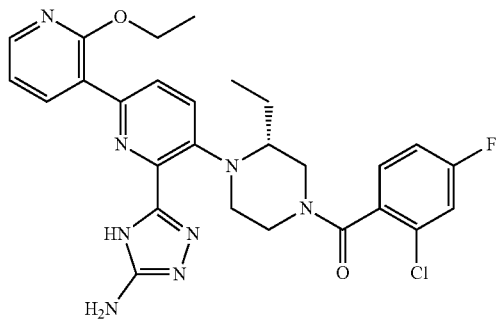 [SMILES: CCOc1ncccc1-c1ccc(N2CCN(C(=O)c3ccc(F)cc3Cl)C[C@H]2CC)c(-c2nnc(N)[nH]2)n1]

Step 18-1, preparation of (R)-2-(5-(4-(2-chloro-4-fluorobenzoyl)-2-ethylpiperazin-1-yl)-2'-ethoxy-[2,3'-bipyridine]-6-carbonyl)hydrazine-1-carboximidamide: To a mixture of (R)-5-(4-(2-chloro-4-fluorobenzoyl)-2-ethylpiperazin-1-yl)-2'-ethoxy-[2,3'-bipyridine]-6-carbohydrazide (100 mg, 190 μmol) from Step 17-6 and methyl carbamimidothioate hydrochloride (72 mg, 0.57 mmol) was added pyridine (2 mL). The resulting mixture was heated at 80° C. for 16 h and then concentrated in vacuo. The crude product was used in the next step without purification. LCMS (M+H)$^+$=569.2.

Step 18-2, preparation of (R)-(4-(6-(5-amino-4H-1,2,4-triazol-3-yl)-2'-ethoxy-[2,3'-bipyridin]-5-yl)-3-ethylpiperazin-1-yl)(2-chloro-4-fluorophenyl)methanone bis(2,2,2-trifluoroacetate): A solution of (R)-2-(5-(4-(2-chloro-4-fluorobenzoyl)-2-ethylpiperazin-1-yl)-2'-ethoxy-[2,3'-bipyridine]-6-carbonyl)hydrazine-1-carboximidamide (100 mg, 176 μmol) in DMF (1 mL) and water (1 mL) was heated at 120° C. for 16 h. The mixture was purified by reversed-phase CC to give the title compound (25.8 mg, 18.8%) as a white solid. LCMS (M+H)$^+$=551.2.

Example 19: rac-2'-ethoxy-5-((2R,4S)-2-ethyl-4-((2-(trifluoromethyl)phenyl)thio)piperidin-1-yl)-N—((R)-1-methylpyrrolidin-3-yl)-[2,3'-bipyridine]-6-carboxamide (Cpd 4-2)

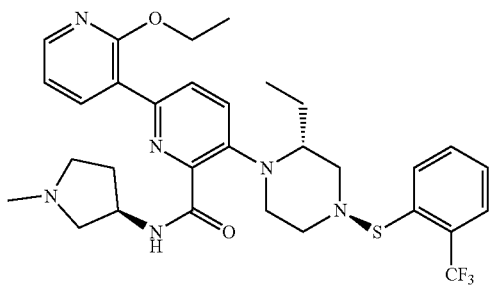

Step 19-1, preparation of rac-(2R,4R)-1-(2'-ethoxy-6-(((R)-1-methylpyrrolidin-3-yl)carbamoyl)-[2,3'-bipyridin]-5-yl)-2-ethylpiperidin-4-yl methanesulfonate: To a solution of rac-2'-ethoxy-5-((2R,4S)-2-ethyl-4-hydroxypiperidin-1-yl)-N—((R)-1-methylpyrrolidin-3-yl)-[2,3'-bipyridine]-6-carboxamide (90 mg, 0.20 mmol) from Step 7-2 in DCM (2 mL) was added triethylamine (60 mg, 0.59 mmol) and methanesulfonyl chloride (27 mg, 0.24 mmol). The resulting solution was stirred at rt for 2 h. The mixture was quenched with water (20 mL) and extracted with DCM (3×). The combined organics were washed with brine, dried over anhydrous sodium sulfate, and concentrated in vacuo to dryness to give the title compound (90 mg, 85% yield) as a yellow solid. LCMS (M+H)$^+$=532.0.

Step 19-2, preparation of rac-2'-ethoxy-5-((2R,4S)-2-ethyl-4-((2-(trifluoromethyl)phenyl)thio)piperidin-1-yl)-N—((R)-1-methylpyrrolidin-3-yl)-[2,3'-bipyridine]-6-carboxamide formate: To a solution of rac-(2R,4R)-1-(2'-ethoxy-6-(((R)-1-methylpyrrolidin-3-yl)carbamoyl)-[2,3'-bipyridin]-5-yl)-2-ethylpiperidin-4-yl methanesulfonate (60 mg, 0.11 mmol) in DMF (0.7 mL) was added 6-(trifluoromethyl)cyclohexa-2,4-diene-1-thiol (31 mg, 0.17 mmol) and potassium carbonate (47 mg, 0.34 mmol). The resulting mixture was heated at 80° C. for 5 h. The crude mixture was purified by reversed-phase CC to give the title compound (10 mg, 13% yield) as a light yellow solid. LCMS (M+H)$^+$=614.2.

Example 20: rac-2'-ethoxy-5-((2R,4S)-2-ethyl-4-((2-(trifluoromethyl)phenyl)sulfonyl)piperidin-1-yl)-N—((R)-1-methylpyrrolidin-3-yl)-[2,3'-bipyridine]-6-carboxamide (Cpd 4-3)

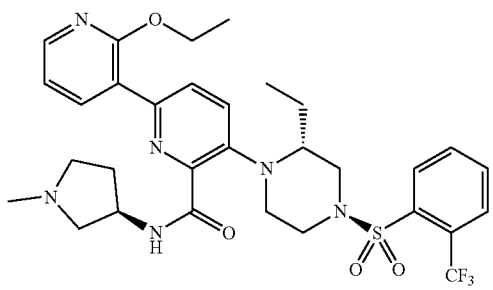

Step 20-1, preparation of rac-2'-ethoxy-5-((2R,4S)-2-ethyl-4-((2-(trifluoromethyl)phenyl)sulfonyl)piperidin-1-yl)-N—((R)-1-methylpyrrolidin-3-yl)-[2,3'-bipyridine]-6-carboxamide: To a solution of rac-2'-ethoxy-5-((2R,4S)-2-ethyl-4-((2-(trifluoromethyl)phenyl)thio)piperidin-1-yl)-N—((R)-1-methylpyrrolidin-3-yl)-[2,3'-bipyridine]-6-carboxamide (65 mg, 0.11 mmol) from Step 19-2 in DCM (2 mL) was added mCPBA (27 mg, 0.16 mmol). The resulting solution was stirred at rt for 2 h. The crude mixture was purified by reversed-phase CC to give the title compound (12.0 mg, 18% yield) as a light yellow solid. LCMS (M+H)$^+$=646.2.

Example A-1: Parenteral Pharmaceutical Composition

To prepare a parenteral pharmaceutical composition suitable for administration by injection (subcutaneous, intravenous), 1-100 mg of a water-soluble salt of a compound Formula (I), or a pharmaceutically acceptable salt or solvate thereof, is dissolved in sterile water and then mixed with 10 mL of 0.9% sterile saline. A suitable buffer is optionally added as well as optional acid or base to adjust the pH. The mixture is incorporated into a dosage unit form suitable for administration by injection Example A-2: Oral Solution To prepare a pharmaceutical composition for oral delivery, a sufficient amount of a compound of Formula (I), or a pharmaceutically acceptable salt thereof, is added to water (with optional solubilizer(s), optional buffer(s) and taste masking excipients) to provide a 20 mg/mL solution.

Example A-3: Oral Tablet

A tablet is prepared by mixing 20-50% by weight of a compound of Formula (I), or a pharmaceutically acceptable salt thereof, 20-50% by weight of microcrystalline cellulose, 1-10% by weight of low-substituted hydroxypropyl celluose, and 1-10% by weight of magnesium stearate or other appropriate excipients. Tablets are prepared by direct compression. The total weight of the compressed tablets is maintained at 100-500 mg.

Example A-4: Oral Capsule

To prepare a pharmaceutical composition for oral delivery, 10-500 mg of a compound of Formula (I), or a pharmaceutically acceptable salt thereof, is mixed with starch or other suitable powder blend. The mixture is incorporated into an oral dosage unit such as a hard gelatin capsule, which is suitable for oral administration.

In another embodiment, 10-500 mg of a compound of Formula (I), or a pharmaceutically acceptable salt thereof, is placed into Size 4 capsule, or size 1 capsule (hypromellose or hard gelatin) and the capsule is closed.

Example A-5: Topical Gel Composition

To prepare a pharmaceutical topical gel composition, a compound of Formula (I), or a pharmaceutically acceptable salt thereof, is mixed with hydroxypropyl celluose, propylene glycol, isopropyl myristate and purified alcohol USP. The resulting gel mixture is then incorporated into containers, such as tubes, which are suitable for topical administration.

Example B-1: MC2R Assays

Membrane Preparation:

Crude membrane fractions are prepared from CRE-bla-CHO-K1 cells stably expressing hMC2 receptor and hMRAP accessory protein (Thermo Fisher). The cells are grown to 85-100% confluence on standard tissue culture dishes in GlutaMax DMEM growth media (Gibco) with following additives: 10% dialyzed FBS (Gemini), 0.1 mM NEAA (Gibco), 25 mM HEPES (Gibco), 5 µg/mL blasticidin (Goldbio), 100 µg/mL zeocin (Invitrogen), 600 µg/mL hygromycin (Goldbio). To prepare membranes, cells are scraped and collected in 1× Dulbecco's phosphate buffered saline (Corning) and then pelleted at 1000 RPM's. The cell pellet is reconstituted in membrane preparation buffer (20 mM HEPES, 6 mM $MgCl_2$ and 1 mM EGTA, protease inhibitor tablets (Pierce) adjusted to pH 7.4), homogenized using a dounce homogenizer, and the resulting membrane fraction is pelleted by centrifugation at 12,000 RPM's. The membrane pellet is resuspended in membrane preparation buffer, snap freezed and stored at −80° C. for later use.

Binding Assay for hMC2 Antagonists:

The hMC2 membrane binding assay utilizes the following components: radiolabel [$^{125}$I]ACTH (1-39) Tyr23 (PerkinElmer), wheat germ agglutinin coated PVT SPA beads (PerkinElmer), crude hMC2R membranes, and compounds. Briefly hMC2R membranes are incubated with SPA beads in binding assay buffer (50 mM HEPES, 5 mM $MgCl_2$, 1 mM $CaCl_2$, 0.2% BSA, protease inhibitor tablets (Pierce) adjusted to pH7.4) prior to assay initiation. A dose response of compound (the final concentration of compound is typically 0-10,000 nM), SPA membranes, and [$^{125}$I]ACTH (1-39) Tyr23 at a final concentration of 0.2 nM is plated in a 96-well assay plate and allowed to incubate 1.5 hours at room temperature. Assay plates are read using a Top Count NXT and $K_i$ values for compounds are determined using a GraphPad Prism 6 non-linear regression analysis.

Illustrative binding affinities of selective compounds are described in Table A. The potencies are divided into four criteria: + means that $K_i$ is between 1,000 nM and 10,000 nM; ++ means that $K_i$ is between 100 nM and 1,000 nM; +++ means $K_i$ is between 10 nM and 100 nM; ++++ means $K_i$ is below 10 nM.

TABLE A

| Cpd. No. | MC2R binding potency |
|---|---|
| 1-3 | +++ |
| 1-4 | +++ |
| 1-5 | ++++ |
| 1-6 | ++++ |
| 1-7 | ++++ |
| 1-8 | ++++ |
| 1-9 | ++++ |
| 1-10 | ++++ |
| 1-11 | ++++ |
| 1-12 | ++++ |
| 1-13 | ++++ |
| 1-14 | ++++ |
| 1-15 | ++++ |
| 1-16 | ++++ |
| 1-17 | ++++ |
| 1-18 | ++++ |
| 1-19 | ++++ |
| 1-20 | ++++ |
| 1-21 | ++++ |
| 1-22 | ++++ |
| 1-23 | ++++ |

TABLE A-continued

| Cpd. No. | MC2R binding potency |
|---|---|
| 1-24 | ++++ |
| 1-25 | ++++ |
| 1-26 | ++++ |
| 1-27 | ++++ |
| 1-28 | ++++ |
| 1-29 | ++++ |
| 1-30 | ++++ |
| 2-1 | +++ |
| 2-2 | ++++ |
| 2-3 | +++ |
| 2-4 | ++++ |
| 2-5 | ++++ |
| 2-6 | ++++ |
| 2-7 | ++++ |
| 2-8 | ++++ |
| 2-9 | ++++ |
| 2-10 | +++ |
| 2-11 | ++++ |
| 2-12 | +++ |
| 2-13 | ++++ |
| 2-14 | ++++ |
| 2-15 | ++++ |
| 2-16 | ++++ |
| 2-17 | ++++ |
| 2-18 | ++++ |
| 2-19 | ++++ |
| 2-20 | ++++ |
| 2-21 | ++++ |
| 2-22 | ++++ |
| 2-23 | ++++ |
| 2-24 | ++++ |
| 2-25 | ++++ |
| 3-1 | ++++ |
| 3-2 | ++++ |
| 3-8 | +++ |
| 3-9 | +++ |
| 4-2 | +++ |
| 4-3 | ++ |
| 5-1 | ++++ |
| 5-2 | ++ |

The examples and embodiments described herein are for illustrative purposes only and various modifications or changes suggested to persons skilled in the art are to be included within the spirit and purview of this application and scope of the appended claims.

What is claimed is:

1. A compound of Formula (I), or a pharmaceutically acceptable salt, or solvate thereof:

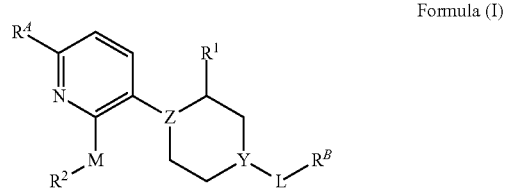

Formula (I)

wherein:
$R^A$ is unsubstituted or substituted phenyl or unsubstituted or substituted monocyclic heteroaryl, wherein if $R^A$ is substituted then $R^A$ is substituted with $R^a$, $R^b$ and $R^c$;
$R^a$, $R^b$ and $R^c$ are independently selected from the group consisting of hydrogen, halogen, —$OR^5$, —CN, —$N(R^5)_2$, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, unsubstituted or substituted $C_2$-$C_7$ heterocycloalkyl, unsubstituted or substituted phenyl, and unsubstituted or substituted monocyclic heteroaryl, wherein any substituted group of $R^a$, $R^b$ and $R^c$ is substituted with one or more $R^7$ groups;

L is —O—, —C(=O)—, —S—, —SO$_2$—, 5-membered heteroaryl, or a bond;

M is —O—, —C(O)NR$^4$—, —S—, —SO$_2$—, —S(=O)NR$^4$—, 5-membered heteroaryl, or a bond;

$R^B$ is unsubstituted or substituted carbocycle, unsubstituted or substituted heterocycle, unsubstituted or substituted $C_1$-$C_7$ alkyl, unsubstituted or substituted $C_1$-$C_7$ fluoroalkyl, or unsubstituted or substituted $C_1$-$C_6$ heteroalkyl, wherein if $R^B$ is substituted then $R^B$ is substituted with $R^d$, $R^e$ and $R^f$;

or $R^B$ and $R^4$ are taken together with the nitrogen atom to which they are attached to form an unsubstituted or substituted 3- to 7-membered heterocycle, wherein if the 3- to 7-membered heterocycle is substituted then the 3- to 7-membered heterocycle is substituted with $R^d$, $R^e$ and $R^f$;

$R^d$, $R^e$ and $R^f$ are independently selected from the group consisting of hydrogen, halogen, —OR$^5$, —CN, —N(R$^5$)$_2$, unsubstituted or substituted $C_1$-$C_6$ alkyl, unsubstituted or substituted $C_1$-$C_6$ fluoroalkyl, unsubstituted or substituted $C_1$-$C_6$ heteroalkyl, unsubstituted or substituted $C_3$-$C_6$ cycloalkyl, unsubstituted or substituted $C_2$-$C_7$ heterocycloalkyl, unsubstituted or substituted phenyl, and unsubstituted or substituted monocyclic heteroaryl, wherein any substituted group of $R^d$, $R^e$ and $R^f$ is substituted with one or more $R^7$ groups;

Y is CR$^3$ or N; wherein when Y is N; L is —C(=O)—, —SO$_2$—, 5-membered heterocycle, or a bond;

Z is CR$^3$ or N;

$R^1$ is an unsubstituted or substituted $C_1$-$C_6$ alkyl or unsubstituted or substituted $C_3$-$C_6$ cycloalkyl, wherein if $R^1$ is substituted then $R^1$ is substituted with hydrogen, —OR$^6$, halogen, —N(R$^5$)$_2$, or —CN;

$R^2$ is hydrogen, unsubstituted or substituted $C_1$-$C_2$ alkyl, unsubstituted or substituted monocyclic carbocycle, unsubstituted or substituted bridged carbocycle, unsubstituted or substituted spirocyclic carbocycle, unsubstituted or substituted monocyclic heterocycle, unsubstituted or substituted bridged heterocycle, unsubstituted or substituted spirocyclic heterocycle, unsubstituted or substituted —($C_1$-$C_6$ alkyl)-carbocycle, or unsubstituted or substituted —($C_1$-$C_6$ alkyl)-heterocycle, wherein any substituted group of $R^2$ is substituted with one or more halogen, unsubstituted or substituted $C_1$-$C_6$ alkyl, unsubstituted or substituted monocyclic heterocycle, —N(R$^5$)$_2$, —OR$^6$, —CN, —CO$_2$R$^6$, —C(=O)N(R$^5$)$_2$, —SR$^6$, —S(=O)R$^8$, —S(=O)$_2$R$^8$, —NR$^5$C(=O)R$^6$, —NR$^5$SO$_2$R$^8$, —SO$_2$R$^8$, or —SO$_2$N(R$^5$)$_2$;

each $R^3$ is independently hydrogen, unsubstituted or substituted $C_1$-$C_6$ alkyl, or unsubstituted or substituted $C_1$-$C_6$fluoroalkyl;

$R^4$ is hydrogen, substituted $C_1$-$C_6$ alkyl, unsubstituted or substituted $C_3$-$C_6$ cycloalkyl, unsubstituted or substituted $C_1$-$C_6$fluoroalkyl, unsubstituted or substituted aryl, or unsubstituted or substituted heteroaryl;

each $R^5$ is independently hydrogen, substituted $C_1$-$C_6$ alkyl, unsubstituted or substituted $C_3$-$C_6$ cycloalkyl, unsubstituted or substituted $C_1$-$C_6$fluoroalkyl, unsubstituted or substituted aryl, or unsubstituted or substituted heteroaryl;

or two $R^5$ on the same nitrogen atom are taken together with the nitrogen atom to which they are attached to form an unsubstituted or substituted 3- to 6-membered monocyclic heterocycle;

each $R^6$ is independently hydrogen, substituted $C_1$-$C_6$ alkyl, unsubstituted or substituted $C_3$-$C_6$ cycloalkyl, unsubstituted or substituted $C_1$-$C_6$fluoroalkyl, unsubstituted or substituted aryl, or unsubstituted or substituted heteroaryl;

each $R^7$ is independently hydrogen, halogen, unsubstituted or substituted $C_1$-$C_4$alkyl, unsubstituted or substituted $C_1$-$C_4$alkoxy, unsubstituted or substituted $C_1$-$C_6$fluoroalkyl, unsubstituted or substituted $C_1$-$C_4$fluoroalkoxy, unsubstituted or substituted monocyclic carbocycle, unsubstituted or substituted monocyclic heterocycle, —CN, —OH, —CO$_2$R$^6$, —CH$_2$CO$_2$R$^6$, —C(=O)N(R$^5$)$_2$, —C(=O)N(R$^5$)OR$^6$, —CH$_2$C(=O)N(R$^5$)$_2$, —N(R$^5$)$_2$, —CH$_2$N(R$^5$)$_2$, —C(R$^6$)$_2$N(R$^5$)$_2$, —NR$^5$C(=O)R$^6$, —CH$_2$NR$^5$C(=O)R$^6$, —NR$^5$C(=O)N(R$^6$)$_2$, —NR$^5$C(=O)N(R$^6$)$_2$, C(R$^6$)=N(R$^5$)—OR$^6$, —SR$^6$, —S(=O)R$^8$, —SO$_2$R$^8$, or —SO$_2$N(R$^5$)$_2$;

each $R^8$ is independently substituted $C_1$-$C_6$ alkyl, unsubstituted or substituted $C_3$-$C_6$ cycloalkyl, unsubstituted or substituted $C_1$-$C_6$fluoroalkyl, unsubstituted or substituted phenyl, or unsubstituted or substituted heteroaryl;

wherein at least one of L and M is —O—.

2. The compound of claim 1, or a pharmaceutically acceptable salt, or solvate thereof, wherein:

L is —O—, —C(=O)—, 5-membered heteroaryl, or a bond; and M is —O—;

or L is —C(=O)—; M is —O—; Y is N; and Z is N;

or L is —O— or 5-membered heteroaryl; M is —O—; Y is CR$^3$; and Z is N;

or L is a bond; M is —O—; Y is N; and Z is CR$^3$;

or L is —O—; M is —C(=O)NR$^4$—; Y is CR$^3$; and Z is N;

and each $R^3$ is hydrogen.

3. The compound of claim 1, or a pharmaceutically acceptable salt, or solvate thereof, wherein:

$R^A$ is unsubstituted or substituted phenyl, unsubstituted or substituted monocyclic 6-membered heteroaryl, or unsubstituted or substituted monocyclic 5-membered heteroaryl, wherein if $R^A$ is substituted then $R^A$ is substituted with $R^a$, $R^b$ and $R^c$; and $R^B$ is an unsubstituted or substituted phenyl, unsubstituted or substituted naphthyl, unsubstituted or substituted monocyclic 6-membered heteroaryl, unsubstituted or substituted monocyclic 5-membered heteroaryl, unsubstituted or substituted bicyclic heteroaryl, monocyclic $C_3$-$C_8$cycloalkyl, unsubstituted or substituted bridged $C_5$-$C_{10}$cycloalkyl, unsubstituted or substituted spiro $C_5$-$C_{10}$cycloalkyl, unsubstituted or substituted monocyclic $C_2$-$C_8$heterocycloalkyl, unsubstituted or substituted bridged $C_5$-$C_{10}$heterocycloalkyl, or unsubstituted or substituted spiro $C_5$-$C_{10}$heterocycloalkyl, wherein if $R^B$ is substituted then $R^B$ is substituted with $R^d$, $R^e$ and $R^f$.

4. The compound of claim 3, or a pharmaceutically acceptable salt, or solvate thereof, wherein:

$R^A$ is unsubstituted or substituted phenyl or unsubstituted or substituted pyridinyl, wherein if $R^A$ is substituted then $R^A$ is substituted with $R^a$, $R^b$ and $R^c$; and $R^B$ is unsubstituted or substituted phenyl or unsubstituted or substituted pyridinyl, wherein if $R^B$ is substituted then $R^B$ is substituted with $R^d$, $R^e$ and $R^f$.

5. The compound of claim 3, or a pharmaceutically acceptable salt, or solvate thereof, wherein:

$R^A$ is

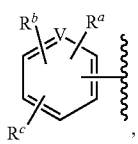

where V is CH or N; and $R^B$ is

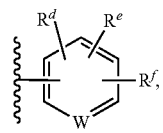

where W is CH or N;

or $R^B$ is

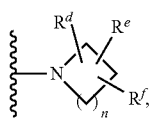

where n is 0, 1, 2, or 3.

6. The compound of claim 1, or a pharmaceutically acceptable salt, or solvate thereof, wherein the compound has the structure of Formula (III), or a pharmaceutically acceptable salt, or solvate thereof:

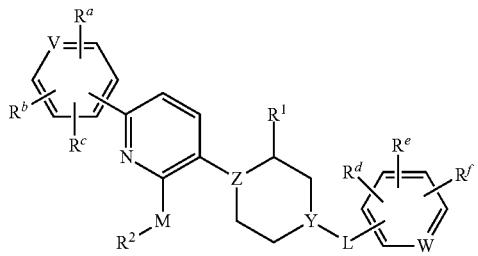

Formula (III)

wherein V is CH or N; and W is CH or N.

7. The compound of claim 1, or a pharmaceutically acceptable salt, or solvate thereof, wherein the compound has the structure of Formula (IVa) or Formula (IVb), or a pharmaceutically acceptable salt, or solvate thereof:

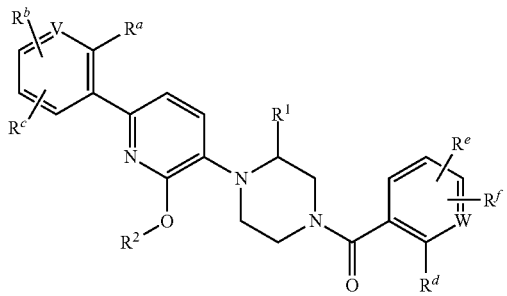

Formula (IVa)

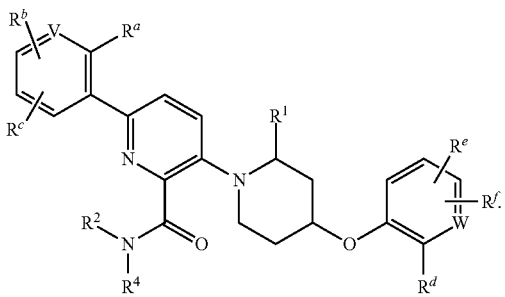

Formula (IVb)

8. The compound of claim 1, or a pharmaceutically acceptable salt, or solvate thereof, wherein:

$R^1$ is —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)(CH$_2$CH$_3$), —C(CH$_3$)$_3$, —CH$_2$OH, —CH$_2$CN, —CH$_2$F, —CHF$_2$, —CF$_3$, —CH$_2$CH$_2$OH, —CH$_2$CH$_2$CN, —CH$_2$CH$_2$F, —CH$_2$CHF$_2$, —CH$_2$CF$_3$, —CH$_2$OCH$_3$, —CH$_2$CH$_2$OCH$_3$, —CH$_2$NH$_2$, —CH$_2$NHCH$_3$, —CH$_2$N(CH$_3$)$_2$, —CH$_2$CH$_2$NH$_2$, —CH$_2$CH$_2$NHCH$_3$, —CH$_2$CH$_2$N(CH$_3$)$_2$, cyclopropyl, cyclobutyl, cyclopentyl, or cyclohexyl; and $R^4$ is hydrogen or C$_1$-C$_6$ alkyl.

9. The compound of claim 1, or a pharmaceutically acceptable salt, or solvate thereof, wherein:

$R^2$ is unsubstituted or substituted C$_1$-C$_6$ alkyl, unsubstituted or substituted monocyclic carbocycle, or unsubstituted or substituted monocyclic 4-, 5- or 6-membered heterocycle containing 1-4 N atoms and 0 or 1 O or S atoms, wherein any substituted group of $R^2$ is substituted with one or more halogen, unsubstituted or substituted C$_1$-C$_6$ alkyl, unsubstituted or substituted monocyclic heterocycle, —N(R$^5$)$_2$, —OR$^6$, —CN, —CO$_2$R$^6$, —C(=O)N(R$^5$)$_2$, —SR$^6$, —S(=O)R$^8$, —S(=O)$_2$R$^8$, —NR$^5$C(=O)R$^6$, —NR$^5$SO$_2$R$^8$, —SO$_2$R$^8$, or —SO$_2$N(R$^5$)$_2$.

10. The compound of claim 9, or a pharmaceutically acceptable salt, or solvate thereof, wherein:

$R^2$ is C$_1$-C$_6$ alkyl substituted by one —N(R$^5$)$_2$ group and is further substituted by zero or more halogen, unsubstituted or substituted C$_1$-C$_6$ alkyl, unsubstituted or substituted monocyclic heterocycle, —N(R$^5$)$_2$, —OR$^6$, —CN, —CO$_2$R$^6$, —C(=O)N(R$^5$)$_2$, —SR$^6$, —S(=O)R$^8$, —S(=O)$_2$R$^8$, —NR$^5$C(=O)R$^6$, —NR$^5$O$_2$R$^8$, —SO$_2$R$^8$, or —SO$_2$N(R$^5$)$_2$;

or R² is unsubstituted or substituted monocyclic 4-, 5- or 6-membered heterocycle containing 1-4 N atoms and 0 or 1 O or S atoms;

or R² is unsubstituted or substituted bridged heterocycle containing 1-4 N atoms and 0 or 1 O or S atoms;

or R² is —(C₁-C₆ alkyl)-heterocycle, wherein the heterocycle is an unsubstituted or substituted monocyclic 4-, 5- or 6-membered heterocycle containing 1-4 N atoms and 0 or 1 O or S atoms.

11. The compound of claim 9, or a pharmaceutically acceptable salt, or solvate thereof, wherein:

R² is C₁-C₆ alkyl substituted by a —N(R⁵)₂ group;

or R² is unsubstituted or substituted monocyclic 4-, 5- or 6-membered heterocycle containing 1-4 N atoms and 0 or 1 O or S atoms;

or R² is —(C₁-C₆ alkyl)-heterocycle, wherein the heterocycle is an unsubstituted or substituted monocyclic 4-, 5- or 6-membered heterocycle containing 1-4 N atoms and 0 or 1 O or S atoms.

12. The compound of claim 1, or a pharmaceutically acceptable salt, or solvate thereof, wherein the compound has the structure of Formula (VIa) or Formula (VIb), or a pharmaceutically acceptable salt, or solvate thereof:

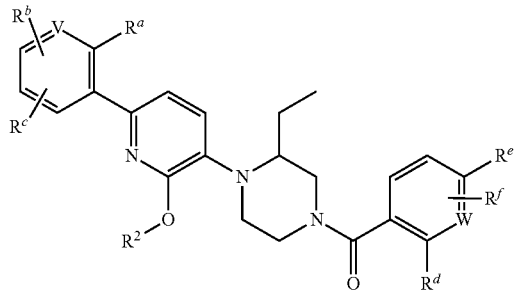

Formula (VIa)

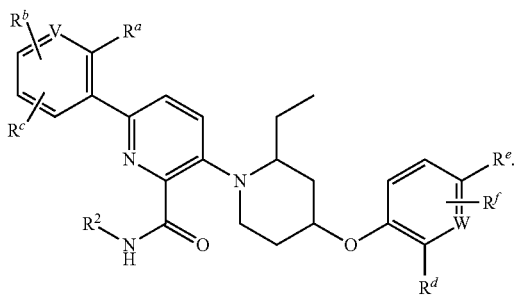

Formula (VIb)

13. The compound of claim 1, or a pharmaceutically acceptable salt, or solvate thereof, wherein the compound has the structure of Formula (VII), or a pharmaceutically acceptable salt, or solvate thereof:

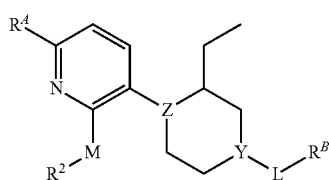

Formula (VII)

wherein:

R^A is unsubstituted or substituted phenyl, or unsubstituted or substituted pyridinyl, wherein if R^A is substituted then R^A is substituted with R^a, R^b and R^c;

L is —C(=O)—; M is —O—; Y is N; and Z is N; or
L is —O—; M is —C(=O)NR⁴—; Y is CH; and Z is N;

R^B is unsubstituted or substituted carbocycle or unsubstituted or substituted heterocycle, wherein if R^B is substituted then R^B is substituted with R^d, R^e and R^f R² is C₁-C₆ alkyl substituted by a —N(R⁵)₂ group;

or R² is unsubstituted or substituted monocyclic 4-, 5- or 6-membered heterocycle containing 1-4 N atoms and 0 or 1 O or S atoms;

or R² is —(C₁-C₆ alkyl)-heterocycle, wherein the heterocycle is an unsubstituted or substituted monocyclic 4-, 5- or 6-membered heterocycle containing 1-4 N atoms and 0 or 1 O or S atoms;

R^a is selected from the group consisting of hydrogen, Cl, Br, —CN, —OH, —OCH₃, —OCH₂CH₃, —CH₃, —CH₂CH₃, —CH₂CH₂CH₃, —CH(CH₃)₂, —CH₂CH₂CH₂CH₃, —CH₂CH(CH₃)₂, —CH(CH₃)(CH₂CH₃), —C(CH₃)₃, —CH₂OH, —CH₂CN, —CH₂F, —CHF₂, —CF₃, —CH₂CH₂OH, —CH₂CH₂CN, —CH₂CH₂F, —CH₂CHF₂, —CH₂CF₃, —CH₂OCH₃, —CH₂CH₂OCH₃, —CH₂NH₂, —CH₂NHCH₃, —CH₂N(CH₃)₂, —CH₂CH₂NH₂, —CH₂CH₂NHCH₃, —CH₂CH₂N(CH₃)₂, cyclopropyl, cyclobutyl, cyclopentyl, and cyclohexyl;

R^b and R^c are independently selected from the group consisting of hydrogen, Cl, Br, —CN, —OH, —OCH₃, —OCH₂CH₃, —CH₃, —CH₂CH₃, —CH₂CH₂CH₃, —CH(CH₃)₂, —CH₂CH₂CH₂CH₃, —CH₂CH(CH₃)₂, —CH(CH₃)(CH₂CH₃), —C(CH₃)₃, —CH₂OH, —CH₂CN, —CH₂F, —CHF₂, —CF₃, —CH₂CH₂OH, —CH₂CH₂CN, —CH₂CH₂F, —CH₂CF₂, —CH₂CF₃, —CH₂OCH₃, —CH₂CH₂OCH₃, —CH₂NH₂, —CH₂NHCH₃, —CH₂N(CH₃)₂, —CH₂CH₂NH₂, —CH₂CH₂NHCH₃, and —CH₂CH₂N(CH₃)₂;

R^d is selected from the group consisting of hydrogen, Cl, Br, —CN, —OH, —OCH₃, —OCH₂CH₃, —CH₃, —CH₂CH₃, —CH₂CH₂CH₃, —CH(CH₃)₂, —CH₂CH₂CH₂CH₃, —CH₂CH(CH₃)₂, —CH(CH₃)(CH₂CH₃), —C(CH₃)₃, —CH₂OH, —CH₂CN, —CH₂F, —CHF₂, —CF₃, —CH₂CH₂OH, —CH₂CH₂CN, —CH₂CH₂F, —CH₂CHF₂, —CH₂CF₃, —CH₂OCH₃, —CH₂CH₂OCH₃, —CH₂NH₂, —CH₂NHCH₃, —CH₂N(CH₃)₂, —CH₂CH₂NH₂, —CH₂CH₂NHCH₃, —CH₂CH₂N(CH₃)₂, unsubstituted or substituted cyclopropyl, unsubstituted or substituted cyclobutyl, unsubstituted or substituted cyclopentyl, unsubstituted or substituted cyclohexyl, unsubstituted or substituted C₂-C₇ heterocycloalkyl, unsubstituted or substituted phenyl, and unsubstituted or substituted monocyclic heteroaryl, wherein any substituted group of R^d is substituted with one or more R⁷ groups; and $R^e$ and $R^f$ are independently selected from the group consisting of F, Cl, Br, —CH$_3$, —CH$_2$CH$_3$, —CH$_2$CH$_2$CH$_3$, —CH(CH$_3$)$_2$, —CH$_2$CH$_2$CH$_2$CH$_3$, —CH$_2$CH(CH$_3$)$_2$, —CH(CH$_3$)(CH$_2$CH$_3$), —C(CH$_3$)$_3$, —CH$_2$OH, ~CH$_2$CN, —CH$_2$F, —CHF$_2$, —CF$_3$, —CN, —OH, —OCH$_3$, and —OCH$_2$CH$_3$.

14. The compound of claim 13, or a pharmaceutically acceptable salt, or solvate thereof, wherein the compound has the structure of Formula (VIIa) or Formula (VIIb), or a pharmaceutically acceptable salt, or solvate thereof:

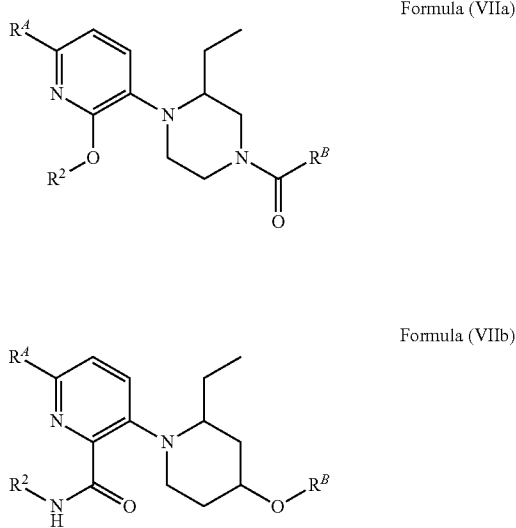

Formula (VIIa)

Formula (VIIb)

wherein $R^A$ is

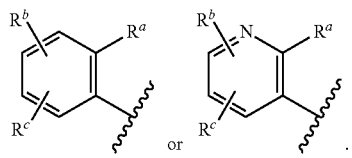

15. The compound of claim 1, or a pharmaceutically acceptable salt, or solvate thereof, wherein:
$R^a$ is selected from the group consisting of hydrogen, halogen, —OR$^6$, —CN, —N(R$^5$)$_2$, unsubstituted or substituted C$_1$-C$_6$ alkyl, unsubstituted or substituted C$_1$-C$_6$ fluoroalkyl, unsubstituted or substituted C$_1$-C$_6$ heteroalkyl, and unsubstituted or substituted C$_3$-C$_6$ cycloalkyl, wherein any substituted group of R$^a$ is substituted with one or more R$^7$ groups;
$R^b$ and $R^c$ are independently selected from the group consisting of hydrogen, halogen, —OR$^6$, —CN, —N(R$^5$)$_2$, unsubstituted or substituted C$_1$-C$_6$ alkyl, unsubstituted or substituted C$_1$-C$_6$ fluoroalkyl, and unsubstituted or substituted C$_1$-C$_6$ heteroalkyl, wherein any substituted group of R$^b$ and R$^c$ is substituted with one or more R$^7$ groups;
$R^d$ is selected from the group consisting of hydrogen, halogen, —OR$^6$, —CN, —N(R$^5$)$_2$, unsubstituted or substituted C$_1$-C$_6$ alkyl, unsubstituted or substituted C$_1$-C$_6$ fluoroalkyl, unsubstituted or substituted C$_1$-C$_6$ heteroalkyl, unsubstituted or substituted C$_3$-C$_6$ cycloalkyl, unsubstituted or substituted C$_2$-C$_7$ heterocycloalkyl, unsubstituted or substituted phenyl, and unsubstituted or substituted monocyclic heteroaryl, wherein any substituted group of R$^d$ is substituted with one or more R$^7$ groups; and
$R^e$ and $R^f$ are independently selected from the group consisting of hydrogen, halogen, —OR$^6$, —CN, —N(R$^5$)$_2$, unsubstituted or substituted C$_1$-C$_6$ alkyl, unsubstituted or substituted C$_1$-C$_6$ fluoroalkyl, and unsubstituted or substituted C$_1$-C$_6$ heteroalkyl.

16. A compound that is:
5-[(2R)-4-[4-chloro-2-(trifluoromethyl)benzoyl]-2-ethylpiperazin-1-yl]-2'-ethoxy-6-{[(3R)-1-methylpyrrolidin-3-yl]oxy}-2,3'-bipyridine;
2'-ethoxy-5-[(2R)-2-ethyl-4-[1-(trifluoromethyl)cyclopentanecarbonyl]piperazin-1-yl]-6-{[(3R)-1-methylpyrrolidin-3-yl]oxy}-2,3'-bipyridine;
2'-ethoxy-5-[(2R)-2-ethyl-4-[(2S)-2-(trifluoromethyl)pyrrolidine-1-carbonyl]piperazin-1-yl]-6-{[(3R)-1-methylpyrrolidin-3-yl]oxy}-2,3'-bipyridine;
2'-ethoxy-5-[(2R)-4-[6-ethoxy-2-(trifluoromethyl)pyridine-3-carbonyl]-2-ethylpiperazin-1-yl]-6-[(3R)-pyrrolidin-3-yloxy]-2,3'-bipyridine;
5-[(2R)-4-[2-(difluoromethyl)-4-fluorobenzoyl]-2-ethylpiperazin-1-yl]-2'-ethoxy-6-[(3R)-pyrrolidin-3-yloxy]-2,3'-bipyridine;
5-[(2R)-4-[4-chloro-2-(trifluoromethyl)benzoyl]-2-ethylpiperazin-1-yl]-2'-ethoxy-6-[(3R)-pyrrolidin-3-yloxy]-2,3'-bipyridine;
2'-ethoxy-5-[(2R)-2-ethyl-4-[(2S)-2-(trifluoromethyl)pyrrolidine-1-carbonyl]piperazin-1-yl]-6-[(3R)-pyrrolidin-3-yloxy]-2,3'-bipyridine;
[2-({2'-ethoxy-5-[(2R)-4-[6-ethoxy-2-(trifluoromethyl)pyridine-3-carbonyl]-2-ethylpiperazin-1-yl]-[2,3'-bipyridin]-6-yl}oxy)ethyl](methyl)amine;
[2-({5-[(2R)-4-[2-(difluoromethyl)-4-fluorobenzoyl]-2-ethylpiperazin-1-yl]-2'-ethoxy-[2,3'-bipyridin]-6-yl}oxy)ethyl](methyl)amine;
[2-({2'-ethoxy-5-[(2R)-2-ethyl-4-[(2S)-2-(trifluoromethyl)pyrrolidine-1-carbonyl]piperazin-1-yl]-[2,3'-bipyridin]-6-yl}oxy)ethyl](methyl)amine;
2-({2'-ethoxy-5-[(2R)-4-[6-ethoxy-2-(trifluoromethyl)pyridine-3-carbonyl]-2-ethylpiperazin-1-yl]-[2,3'-bipyridin]-6-yl}oxy) ethan-1-amine;
2-({5-[(2R)-4-[2-(difluoromethyl)-4-fluorobenzoyl]-2-ethylpiperazin-1-yl]-2'-ethoxy-[2,3'-bipyridin]-6-yl}oxy) ethan-1-amine;
2-({2'-ethoxy-5-[(2R)-2-ethyl-4-[(2S)-2-(trifluoromethyl)pyrrolidine-1-carbonyl]piperazin-1-yl]-[2,3'-bipyridin]-6-yl}oxy) ethan-1-amine;
[2-({5-[(2R)-4-[4-chloro-2-(trifluoromethyl)benzoyl]-2-ethylpiperazin-1-yl]-2'-ethoxy-[2,3'-bipyridin]-6-yl}oxy)ethyl](methyl)amine;
2-({5-[(2R)-4-[4-chloro-2-(trifluoromethyl)benzoyl]-2-ethylpiperazin-1-yl]-2'-ethoxy-[2,3'-bipyridin]-6-yl}oxy) ethan-1-amine;
[2-({2'-ethoxy-5-[(2R)-4-[6-ethoxy-2-(trifluoromethyl)pyridine-3-carbonyl]-2-ethylpiperazin-1-yl]-[2,3'-bipyridin]-6-yl}oxy)ethyl]dimethylamine;
2'-ethoxy-5-[(2R)-4-[6-ethoxy-2-(trifluoromethyl)pyridine-3-carbonyl]-2-ethylpiperazin-1-yl]-6-[(3S)-pyrrolidin-3-yloxy]-2,3'-bipyridine;
(2R)-1-({2'-ethoxy-5-[(2R)-4-[6-ethoxy-2-(trifluoromethyl)pyridine-3-carbonyl]-2-ethylpiperazin-1-yl]-[2,3'-bipyridin]-6-yl}oxy)propan-2-amine;
(2S)-1-({2'-ethoxy-5-[(2R)-4-[6-ethoxy-2-(trifluoromethyl)pyridine-3-carbonyl]-2-ethylpiperazin-1-yl]-[2,3'-bipyridin]-6-yl}oxy)propan-2-amine;

(2R)-2-({2'-ethoxy-5-[(2R)-4-[6-ethoxy-2-(trifluoromethyl)pyridine-3-carbonyl]-2-ethylpiperazin-1-yl]-[2,3'-bipyridin]-6-yl}oxy)propan-1-amine;

(2S)-2-({2'-ethoxy-5-[(2R)-4-[6-ethoxy-2-(trifluoromethyl)pyridine-3-carbonyl]-2-ethylpiperazin-1-yl]-[2,3'-bipyridin]-6-yl}oxy)propan-1-amine;

1-[(3R)-4-{2'-ethoxy-6-[2-(methylamino)ethoxy]-[2,3'-bipyridin]-5-yl}-3-ethylpiperazine-1-carbonyl]-2,3-dihydro-1H-indole-7-carbonitrile;

1-[(3R)-4-[6-(2-aminoethoxy)-2'-ethoxy-[2,3'-bipyridin]-5-yl]-3-ethylpiperazine-1-carbonyl]-2,3-dihydro-1H-indole-7-carbonitrile;

1-[(3R)-4-[6-(2-aminoethoxy)-2'-ethoxy-[2,3'-bipyridin]-5-yl]-3-ethylpiperazine-1-carbonyl]-5-chloro-2,3-dihydro-1H-indole-7-carbonitrile;

5-chloro-1-[(3R)-4-{2'-ethoxy-6-[2-(methylamino)ethoxy]-[2,3'-bipyridin]-5-yl}-3-ethylpiperazine-1-carbonyl]-2,3-dihydro-1H-indole-7-carbonitrile;

[2-({2'-ethoxy-5-[(2R)-2-ethyl-4-[4-fluoro-2-(trifluoromethyl)benzoyl]piperazin-1-yl]-[2,3'-bipyridin]-6-yl}oxy)ethyl](methyl)amine;

[2-({5-[(2R)-4-(2,4-dichlorobenzoyl)-2-ethylpiperazin-1-yl]-2'-ethoxy-[2,3'-bipyridin]-6-yl}oxy)ethyl](methyl)amine;

[2-({5-[(2R)-4-(2-chloro-4-fluorobenzoyl)-2-ethylpiperazin-1-yl]-2'-ethoxy-[2,3'-bipyridin]-6-yl}oxy)ethyl](methyl)amine;

[2-({2'-ethoxy-5-[(2R)-2-ethyl-4-[6-methoxy-2-(trifluoromethyl)pyridine-3-carbonyl]piperazin-1-yl]-[2,3'-bipyridin]-6-yl}oxy)ethyl](methyl)amine;

N-(3-aminopropyl)-4-{4-[2-cyano-4-(trifluoromethyl)phenoxy]piperidin-1-yl}-2'-ethoxy-[1,1'-biphenyl]-3-carboxamide;

5-{cis-4-[2-cyano-4-(trifluoromethyl)phenoxy]-2-ethylpiperidin-1-yl}-2'-ethoxy-N-[(3R)-1-methylpyrrolidin-3-yl]-[2,3'-bipyridine]-6-carboxamide;

5-{trans-4-[2-cyano-4-(trifluoromethyl)phenoxy]-2-cyclopropylpiperidin-1-yl}-2'-ethoxy-N-[(3R)-pyrrolidin-3-yl]-[2,3'-bipyridine]-6-carboxamide;

5-{trans-4-[2-cyano-4-(trifluoromethyl)phenoxy]-2-cyclopropylpiperidin-1-yl}-2'-ethoxy-N-[(3R)-1-methylpyrrolidin-3-yl]-[2,3'-bipyridine]-6-carboxamide;

5-{cis-4-[2-cyano-4-(trifluoromethyl)phenoxy]-2-cyclopropylpiperidin-1-yl}-2'-ethoxy-N-[(3R)-pyrrolidin-3-yl]-[2,3'-bipyridine]-6-carboxamide;

5-{cis-4-[2-cyano-4-(trifluoromethyl)phenoxy]-2-cyclopropylpiperidin-1-yl}-2'-ethoxy-N-[(3R)-1-methylpyrrolidin-3-yl]-[2,3' bipyridine]-6-carboxamide;

5-{cis-4-[4-chloro-2-(difluoromethyl)phenoxy]-2-cyclopropylpiperidin-1-yl}-2'-ethoxy-N-[(3R)-1-methylpyrrolidin-3-yl]-[2,3'-bipyridine]-6-carboxamide;

5-cis-(4-{[6-chloro-2-(trifluoromethyl)pyridin-3-yl]oxy}-2-cyclopropylpiperidin-1-yl)-2'-ethoxy-N-[(3R)-1-methylpyrrolidin-3-yl]-[2,3'-bipyridine]-6-carboxamide;

5-[(2R,4R)-4-[4-chloro-2-(trifluoromethyl)phenoxy]-2-ethylpiperidin-1-yl]-2'-ethoxy-N-[(3R)-1-methylpyrrolidin-3-yl]-[2,3'-bipyridine]-6-carboxamide;

5-[(2S,4S)-4-[4-chloro-2-(trifluoromethyl)phenoxy]-2-ethylpiperidin-1-yl]-2'-ethoxy-N-[(3R)-1-methylpyrrolidin-3-yl]-[2,3'-bipyridine]-6-carboxamide;

5-[(2R,4R)-4-[2-cyano-4-(trifluoromethyl)phenoxy]-2-ethylpiperidin-1-yl]-2'-ethoxy-N-[(3R)-1-methylpyrrolidin-3-yl]-[2,3'-bipyridine]-6-carboxamide;

5-[(2S,4S)-4-[2-cyano-4-(trifluoromethyl)phenoxy]-2-ethylpiperidin-1-yl]-2'-ethoxy-N-[(3R)-1-methylpyrrolidin-3-yl]-[2,3'-bipyridine]-6-carboxamide;

5-(cis-2-cyclopropyl-4-{[6-ethoxy-2-(trifluoromethyl)pyridin-3-yl]oxy}piperidin-1-yl)-2'-ethoxy-N-[(3R)-1-methylpyrrolidin-3-yl]-[2,3'-bipyridine]-6-carboxamide;

5-(cis-4-{[2-cyano-6-(trifluoromethyl)pyridin-3-yl]oxy}-2-cyclopropylpiperidin-1-yl)-2'-ethoxy-N-[(3R)-1-methylpyrrolidin-3-yl]-[2,3'-bipyridine]-6-carboxamide;

5-(cis-4-{[2-cyano-6-(trifluoromethyl)pyridin-3-yl]oxy}-2-ethylpiperidin-1-yl)-2'-ethoxy-N-[(3R)-1-methylpyrrolidin-3-yl]-[2,3'-bipyridine]-6-carboxamide;

5-[cis-4-(2-cyano-4-methylphenoxy)-2-cyclopropylpiperidin-1-yl]-2'-ethoxy-N-[(3R)-1-methylpyrrolidin-3-yl]-[2,3'-bipyridine]-6-carboxamide;

5-[cis-4-(2-cyano-4-methylphenoxy)-2-ethylpiperidin-1-yl]-2'-ethoxy-N-[(3R)-1-methylpyrrolidin-3-yl]-[2,3'-bipyridine]-6-carboxamide;

5-[(2R,4R)-4-{[2-cyano-6-(trifluoromethyl)pyridin-3-yl]oxy}-2-ethylpiperidin-1-yl]-2'-ethoxy-N-[(3R)-1-methylpyrrolidin-3-yl]-[2,3'-bipyridine]-6-carboxamide;

N-[(3S)-1-azabicyclo [2.2.2]octan-3-yl]-5-(cis-4-{[2-cyano-6-(trifluoromethyl)pyridin-3-yl]oxy}-2-ethylpiperidin-1-yl)-2'-ethoxy-[2,3'-bipyridine]-6-carboxamide;

N-[(3S)-1-azabicyclo [2.2.2]octan-3-yl]-5-{cis-4-[2-cyano-4-(trifluoromethyl)phenoxy]-2-ethylpiperidin-1-yl}-2'-ethoxy-[2,3'-bipyridine]-6-carboxamide;

5-[(2R,4R)-4-(4-chloro-2-cyanophenoxy)-2-ethylpiperidin-1-yl]-2'-ethoxy-N-[(3R)-1-methylpyrrolidin-3-yl]-[2,3'-bipyridine]-6-carboxamide;

5-[(2R,4R)-4-{[2-cyano-6-(trifluoromethyl)pyridin-3-yl]oxy}-2-ethylpiperidin-1-yl]-2'-ethoxy-N-[(3S)-1-methylpyrrolidin-3-yl]-[2,3'-bipyridine]-6-carboxamide;

3-(cis-4-{[2-cyano-6-(trifluoromethyl)pyridin-3-yl]oxy}-2-methylpiperidin-1-yl)-6-(2-ethoxyphenyl)-N-[(3R)-1-methylpyrrolidin-3-yl]pyridine-2-carboxamide;

3-[cis-4-(4-chloro-2-cyanophenoxy)-2-methylpiperidin-1-yl]-6-(2-ethoxyphenyl)-N-[(3R)-1-methylpyrrolidin-3-yl]pyridine-2-carboxamide;

5-[cis-4-(2-cyano-4-fluorophenoxy)-2-cyclopropylpiperidin-1-yl]-2'-ethoxy-N-[(3R)-1-methylpyrrolidin-3-yl]-[2,3'-bipyridine]-6-carboxamide;

2-(4-(2'-ethoxy-6-(2-(methylamino)ethoxy)-[2,3'-bipyridin]-5-yl) piperidin-1-yl)-5-(trifluoromethyl)benzonitrile;

3-(4-{2'-ethoxy-6-[2-(methylamino)ethoxy]-[2,3'-bipyridin]-5-yl}piperidin-1-yl)-6-(trifluoromethyl)pyridine-2-carbonitrile;

2-{[(2R)-1-{2'-ethoxy-6-[2-(methylamino)ethoxy]-[2,3'-bipyridin]-5-yl}-2-ethylpiperidin-4-yl]oxy}-5-(trifluoromethyl)benzonitrile;

[2-({2'-ethoxy-5-[(2R)-2-ethyl-4-{1-[4-fluoro-2-(trifluoromethyl)phenyl]-1H-imidazol-2-yl}piperidin-1-yl]-[2,3'-bipyridin]-6-yl}oxy)ethyl](methyl)amine;

[2-({2'-ethoxy-5-[(2R)-2-ethyl-4-{1-[1-(trifluoromethyl)cyclobutyl]-1H-imidazol-2-yl}piperidin-1-yl]-[2,3'-bipyridin]-6-yl}oxy)ethyl](methyl)amine;

[2-({2'-ethoxy-5-[(2R)-2-ethyl-4-{5-[1-(trifluoromethyl)cyclobutyl]-4H-1$\lambda^3$,2,4-oxadiazol-3-yl}piperidin-1-yl]-[2,3'-bipyridin]-6-yl}oxy)ethyl](methyl)amine;

[2-({2'-ethoxy-5-[(2R)-2-ethyl-4-{3-[1-(trifluoromethyl)cyclobutyl]-4H-1$\lambda^3$,2,4-oxadiazol-5-yl}piperidin-1-yl]-[2,3'-bipyridin]-6-yl}oxy)ethyl](methyl)amine;

2-{[rac-(2R,4R)-1-(2'-ethoxy-6-{[(3R)-1-methylpyrrolidin-3-yl]oxy}-[2,3'-bipyridin]-5-yl)-2-ethylpiperidin-4-yl]oxy}-5-(trifluoromethyl)benzonitrile;

5-[rac-(2R,4R)-4-[4-chloro-2-(trifluoromethyl)phenoxy]-2-ethylpiperidin-1-yl]-2'-ethoxy-6-{[(3R)-1-methylpyrrolidin-3-yl]oxy}-2,3'-bipyridine;

1-(2-{5-[(2R)-4-(2-chloro-4-fluorobenzoyl)-2-ethylpiperazin-1-yl]-2'-ethoxy-[2,3'-bipyridin]-6-yl}-1H-imidazol-4-yl)methanamine;

1-(5-{5-[(2R)-4-(2-chloro-4-fluorobenzoyl)-2-ethylpiperazin-1-yl]-2'-ethoxy-[2,3'-bipyridin]-6-yl}-4H-1,2,4-triazol-3-yl)methanamine;

5-{5-[(2R)-4-(2-chloro-4-fluorobenzoyl)-2-ethylpiperazin-1-yl]-2'-ethoxy-[2,3'-bipyridin]-6-yl}-4H-1,2,4-triazol-3-amine;

5-{5-[(2R)-4-(4-fluoro-2-trifluoro-benzoyl)-2-ethylpiperazin-1-yl]-2'-ethoxy-[2,3'-bipyridin]-6-yl}-1H-1,2,4-triazol-3-amine;

2-(5-{3-[(2R)-4-(2,4-dichlorobenzoyl)-2-ethylpiperazin-1-yl]-6-(2-ethoxyphenyl)pyridin-2-yl}-1H-1,2,4-triazol-1-yl) ethan-1-amine;

2-(2-{2-[(2R)-4-[4-chloro-2-(trifluoromethyl)benzoyl]-2-ethylpiperazin-1-yl]-5-(2-ethoxypyridin-3-yl)phenyl}-1H-imidazol-1-yl) ethan-1-amine;

2-(5-{5-[(2R)-4-(2-chloro-4-fluorobenzoyl)-2-ethylpiperazin-1-yl]-2'-ethoxy-[2,3'-bipyridin]-6-yl}-1,3-oxazol-4-yl) ethan-1-amine;

N-(2-aminoethyl)-3-[(2R)-4-(2-chloro-4-fluorobenzoyl)-2-ethylpiperazin-1-yl]-6-(2-ethoxyphenyl)pyridine-2-sulfonamide;

N-(2-aminoethyl)-2'-ethoxy-5-[(2R)-2-ethyl-4-[4-fluoro-2-(trifluoromethyl)benzoyl]piperazin-1-yl]-[2,3'-bipyridine]-6-sulfonamide;

2-[(2R)-4-(2-chloro-4-fluorobenzoyl)-2-ethylpiperazin-1-yl]-5-(2-ethoxypyridin-3-yl)-N-[(3R)-1-methylpyrrolidin-3-yl]benzene-1-sulfonamide;

5-[(2R)-4-(2-chloro-4-fluorobenzoyl)-2-ethylpiperazin-1-yl]-2'-ethoxy-N-[(3R)-1-methylpyrrolidin-3-yl]-[2,3'-bipyridine]-6-sulfonamide;

[2-({5-[(2R)-4-[4-chloro-2-(trifluoromethyl)benzoyl]-2-ethylpiperazin-1-yl]-2'-ethoxy-[2,3'-bipyridin]-6-yl}sulfanyl)ethyl]dimethylamine;

[2-({5-[(2R)-4-[4-chloro-2-(trifluoromethyl)benzoyl]-2-ethylpiperazin-1-yl]-2'-ethoxy-[2,3'-bipyridin]-6-yl}sulfonyl)ethyl]dimethylamine;

rac-2'-ethoxy-5-[(2R,4S)-2-ethyl-4-{[2-(trifluoromethyl)phenyl]sulfanyl}piperidin-1-yl]-N-[(3R)-1-methylpyrrolidin-3-yl]-[2,3'-bipyridine]-6-carboxamide;

rac-2'-ethoxy-5-[(2R,4S)-2-ethyl-4-[2-(trifluoromethyl)benzenesulfonyl]piperidin-1-yl]-N-[(3R)-1-methylpyrrolidin-3-yl]-[2,3'-bipyridine]-6-carboxamide; and 2'-ethoxy-5-[(2R)-2-ethyl-4-[4-fluoro-2-(trifluoromethyl)benzenesulfonyl]piperidin-1-yl]-N-[(3R)-1-methylpyrrolidin-3-yl]-[2,3'-bipyridine]-6-carboxamide;

or a pharmaceutically acceptable salt, or solvate thereof.

17. A pharmaceutical composition comprising a compound of claim 1, or a pharmaceutically acceptable salt, or solvate thereof, and at least one pharmaceutically acceptable excipient.

18. A method of treating Cushing's syndrome, ectopic Cushing's syndrome, or congenital adrenal hyperplasia (CAH) in a mammal comprising administering a compound of claim 1, or a pharmaceutically acceptable salt, or solvate thereof, to the mammal in need thereof.

19. A method of reducing the secretion of adrenocorticotropic hormone (ACTH) in a mammal comprising administering a compound of claim 1, or a pharmaceutically acceptable salt, or solvate thereof to the mammal in need thereof.

* * * * *